(12) United States Patent
Okumura et al.

(10) Patent No.: US 7,834,958 B2
(45) Date of Patent: *Nov. 16, 2010

(54) REFLECTIVE TYPE COLOR LIQUID CRYSTAL DEVICE AND AN ELECTRONIC APPARATUS USING THIS

(75) Inventors: Osamu Okumura, Suwa (JP); Eiji Okamoto, Suwa (JP); Tsuyoshi Maeda, Suwa (JP); Toshiharu Matsushima, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 640 days.

This patent is subject to a terminal disclaimer.

(21) Appl. No.: 11/790,397

(22) Filed: Apr. 25, 2007

(65) Prior Publication Data

US 2007/0200982 A1 Aug. 30, 2007

Related U.S. Application Data

(62) Division of application No. 09/671,354, filed on Sep. 27, 2000, now Pat. No. 7,289,174, which is a division of application No. 08/809,487, filed as application No. PCT/JP96/01983 on Jul. 17, 1996, now Pat. No. 6,147,728.

(30) Foreign Application Priority Data

| Jul. 17, 1995 | (JP) | ................................ 7-180481 |
| Oct. 17, 1995 | (JP) | ................................ 7-268899 |
| Feb. 9, 1996 | (JP) | .................................. 8-24515 |
| Apr. 16, 1996 | (JP) | .................................. 8-94551 |
| Apr. 16, 1996 | (JP) | .................................. 8-94552 |

(51) Int. Cl.
*G02F 1/1335* (2006.01)

(52) U.S. Cl. ........................ 349/106; 349/113

(58) Field of Classification Search .................. None
See application file for complete search history.

(56) References Cited

U.S. PATENT DOCUMENTS

| 4,560,241 A | 12/1985 | Stolov et al. |
| 4,964,702 A | 10/1990 | Sugimoto et al. |

(Continued)

FOREIGN PATENT DOCUMENTS

GB 2139372 A 11/1984

(Continued)

OTHER PUBLICATIONS

A,G, Chen et al.; "Late-News Paper: Holographic Reflective Liquid-Crystal Display," pp. 176-179 SID 95 Digest.

(Continued)

*Primary Examiner*—Sung H Pak
(74) *Attorney, Agent, or Firm*—Oliff & Berridge, PLC

(57) ABSTRACT

A liquid crystal device includes a pair of substrates and a liquid crystal layer between the pair of substrates. In addition, the device includes a plurality of dots capable of independently applying voltage to the liquid crystal layer, each dot having a dot area that includes a first section and a second section. A color filter is arranged in the first section of at least one of the dots. A substantially transparent area is arranged in the at least one of the dots in the second section where the color filter is not arranged.

20 Claims, 73 Drawing Sheets

U.S. PATENT DOCUMENTS

| | | | |
|---|---|---|---|
| 5,122,887 | A | 6/1992 | Mathewson |
| 5,124,818 | A | 6/1992 | Conner et al. |
| 5,365,357 | A | 11/1994 | Ohgawara et al. |
| 5,508,831 | A | 4/1996 | Nakamura et al. |
| 5,587,819 | A | 12/1996 | Sunohara et al. |
| 5,736,278 | A | 4/1998 | Nakazawa et al. |
| 5,870,157 | A | 2/1999 | Shimada et al. |
| RE36,161 | E | 3/1999 | Okubo et al. |
| 5,948,576 | A | 9/1999 | Shirota et al. |
| 6,084,650 | A | 7/2000 | Sekiguchi |
| 6,140,988 | A | 10/2000 | Yamada |
| 6,147,728 | A | 11/2000 | Okumura et al. |
| 7,158,197 | B2 * | 1/2007 | Okumura et al. ............ 349/106 |
| 7,209,197 | B2 | 4/2007 | Okumura et al. |
| 7,286,194 | B2 | 10/2007 | Okumura et al. |
| 7,289,174 | B1 * | 10/2007 | Okumura et al. ............ 349/106 |
| 7,304,701 | B2 | 12/2007 | Okumura et al. |

FOREIGN PATENT DOCUMENTS

| | | |
|---|---|---|
| JP | 50-80799 | 7/1975 |
| JP | 1-13666 | 5/1976 |
| JP | A-56-50369 | 5/1981 |
| JP | 3-64850 | 8/1982 |
| JP | 57-190923 A | 11/1982 |
| JP | A-59-36282 | 2/1984 |
| JP | 59-198489 A | 11/1984 |
| JP | 60-059322 | 4/1985 |
| JP | 60-59322 A | 4/1985 |
| JP | 60-73618 A | 4/1985 |
| JP | A-60-214342 | 10/1985 |
| JP | 60-237403 A | 11/1985 |
| JP | 60-238888 A | 11/1985 |
| JP | 61-143791 A | 7/1986 |
| JP | 61-166586 A | 7/1986 |
| JP | 7-62723 | 10/1986 |
| JP | 61-230101 | 10/1986 |
| JP | 62-79402 A | 4/1987 |
| JP | 01-259396 | 10/1989 |
| JP | 1-277283 A | 11/1989 |
| JP | 2-12 | 1/1990 |
| JP | 3-50249 | 5/1990 |
| JP | 3-84520 A | 4/1991 |
| JP | A-03-167524 | 7/1991 |
| JP | 3-223715 | 10/1991 |
| JP | A-4-282613 | 10/1992 |
| JP | A-4-289818 | 10/1992 |
| JP | 4-348323 | 12/1992 |
| JP | 5-83608 A | 4/1993 |
| JP | 5-88011 A | 4/1993 |
| JP | 5-100112 A | 4/1993 |
| JP | 05173158 | 7/1993 |
| JP | 5-241143 | 9/1993 |
| JP | A-05-232463 | 9/1993 |
| JP | 6-235920 | 8/1994 |
| JP | A-06-337432 | 12/1994 |
| JP | 7-13147 A | 1/1995 |
| JP | 07036029 | 2/1995 |
| JP | A-7-36029 | 2/1995 |
| JP | 7-104272 A | 4/1995 |
| JP | 7-29532 U | 6/1995 |
| JP | 7-140447 A | 6/1995 |
| JP | 07-62723 B | 7/1995 |
| JP | 7-239649 | 9/1995 |
| JP | 7-253510 | 10/1995 |
| JP | 8-87009 | 4/1996 |
| JP | 08-286178 | 11/1996 |
| JP | 2000-311938 | 5/2002 |
| JP | 2000-311939 | 5/2002 |
| JP | 2000-311940 | 5/2002 |
| JP | 2000-311941 | 5/2002 |
| JP | 2000-311942 | 5/2002 |

OTHER PUBLICATIONS

S. Mitsui et al., "Late-News Paper: Bright Reflective Multicolor LCDs Addressed by a-Si TFTs," pp. 437-440 SID 92 Digest.
T. Uchida et al., "Reflective Multicolor Liquid-Crystal Display," pp. 1207-1211 IEEE Transactions on Electron devices, vol. ED-33 No. 8, Aug. 1986.
"Color LCD Structure", IBM Technical Disclosure Bulletin, vol. 33, No. 7, Dec. 1, 1990, p. 340.
Sep. 18, 1998 Office Action in U.S. Appl. No. 08/809,487.
Jun. 10, 1999 Office Action in U.S. Appl. No. 08/809,487.
Apr. 24, 2000 Notice of Allowance in U.S. Appl. No. 08/809,487.
Aug. 15, 2001 Office Action in U.S. Appl. No. 09/671,354.
Feb. 13, 2002 Office Action in U.S. Appl. No. 09/671,354.
May 21, 2002 Office Action in U.S. Appl. No. 09/671,354.
Apr. 14, 2003 Office Action in U.S. Appl. No. 09/671,354.
Sep. 24, 2003 Office Action in U.S. Appl. No. 09/671,354.
Mar. 19, 2004 Notice of Allowance in U.S. Appl. No. 09/671,354.
Aug. 23, 2004 Notice of Allowance in U.S. Appl. No. 09/671,354.
Dec. 22, 2005 Office Action in U.S. Appl. No. 09/671,354.
Mar. 16, 2006 Notice of Allowance in U.S. Appl. No. 09/671,354.
Sep. 19, 2006 Office Action in U.S. Appl. No. 09,671,354.
Mar. 13, 2007 Notice of Allowance in U.S. Appl. No. 09/671,354.
Oct. 18, 2005 Office Action in U.S. Appl. No. 10/828,331.
Apr. 5, 2006 Office Action in U.S. Appl. No. 10/828,331.
Jul. 27, 2006 Office Action in U.S. Appl. No. 10/828,331.
Jan. 10, 2007 Notice of Allowance in U.S. Appl. No. 10/828,331.
Dec. 16, 2005 Office Action in U.S. Appl. No. 10/995,176.
May 19, 2006 Office Action in U.S. Appl. No. 10/995,176.
Sep. 28, 2006 Notice of Allowance in U.S. Appl. No. 10/995,176.
Mar. 6, 2007 Office Action in U.S. Appl. No. 11/492,885.
Sep. 12, 2007 Notice of Allowance in U.S. Appl. No. 11/492,885.
Jul. 27, 2007 Notice of Allowance in U.S. Appl. No. 11/649,854.

* cited by examiner

REFLECTIVE TYPE COLOR LIQUID CRYSTAL DEVICE AND AN ELECTRONIC APPARATUS USING THIS

This is a Divisional of U.S. patent application Ser. No. 09/671,354 filed Sep. 27, 2000, now U.S. Pat. No. 7,289,174 which is a Divisional of U.S. patent application Ser. No. 08/809,487 filed Mar. 17, 1997 (now U.S. Pat. No. 6,147,728), which is the U.S. National Stage of International Application No. PCT/JP96/01983 filed Jul. 17, 1996. The entire disclosure of each of the prior applications is hereby incorporated by reference herein in their entireties.

BACKGROUND

1. Field of the Invention

The present invention concerns a reflective type color liquid crystal device and an electronic apparatus using this.

2. Prior Art

The display mounted on a portable information terminal first must be low in power consumption. Consequently, reflective type liquid crystal devices not requiring backlights are optimal for this purpose. Nevertheless, the conventional reflective type liquid crystal device was mainly a monochrome display, and a good reflective type color liquid crystal device is yet to be obtained.

The development of the reflective type color liquid crystal device appears to have been started in earnest from the middle of the 1980s. Before that, for example, as in the publication of Japanese Laid-Open Patent No. 50-80799, it was not recognized that if the backlights of a transmissive type color liquid crystal device were replaced with a reflection plate, that was equivalent to saying a reflective type color liquid crystal device may be possible. Nevertheless, it is clear if actually test created, but with such a configuration it is dark and unusable. There are three causes: (1) ½ or more of the light is lost with the filter, (2) ⅔ or more of the light is further lost due to the color filter, and (3) the problems of parallax. The problems of parallax cannot be avoided with the TN (twisted nematic) mode and STN (super twisted nematic) mode in a transmissive liquid crystal device. The reason is because, since these modes necessarily use two polarizing plates, as long as the polarizing plates cannot be built into the cell, there occurs a gap that cannot be ignored between the reflective plate and the liquid crystal layer. The problems of parallax mentioned here are not only the problem of double reflection of the display as was the case with the conventional reflective type monochrome liquid crystal device, but it indicates a problem inherent in the reflective type color liquid crystal device.

The problems of parallax are explained using drawings. FIGS. 77(a) and (b) are cross section drawings of a reflective type color liquid crystal device using either the TN mode or the STN mode. This liquid crystal device is composed of an upper polarizing plate 7701, an upper glass substrate 7702, a liquid crystal layer 7703, a lower glass substrate 7704, a lower polarizing plate 7705, a light reflecting plate 7706, and a red-green-blue (RGB) tricolor filter 7707. Between the upper and lower glass substrates are additionally present a transparent electrode, an orientation film, and an insulating film, but they are omitted as they are not needed in explaining the problems of parallax. There are two problems of parallax. One of these is the mutual cancellation of the colors. In FIG. 77(a), the observer 7712 sees the reflected light 7711 emanating through the green filter, but this light is a blend of the introduced light 7713 passing through the red, green, and blue filters, and being scattered and reflected by the light reflecting plate. If the thickness of the lower glass substrate is sufficiently thick in comparison to the pitch of the color filters, the light passing through any colored filters will blend at equal probabilities. As a matter of fact, the light passing a course of red→green→blue, regardless of the wavelength of the light, is absorbed and becomes pitch black with any color filter, and only the light passing the course of green→green remains. Since the same can be said about the reflected light passing through a blue and a red filter, it becomes a problem that the brightness finally ends up ⅓ of that of a white display having no parallax. Another problem is that the color display becomes dark. FIG. 77(b) shows the status of a green display. Also, the part having applied a matrix-like hatching on the liquid crystal layer 7703 indicates that it is in the unlit status (dark status). The introduced light 7713 passes through red, green, and blue dots at equal probabilities, and ⅔ is absorbed by the red and blue dots being in the off status. Furthermore, after having been scattered and blended by the light reflection plate, ⅔ is again absorbed by the red and blue dots being in the off status, and the remainder reaches the observer 7712. Consequently, the green display becomes ⅑ the brightness of a white display minus the portion absorbed by the green filter, and becomes very dark. The use of the TN mode and the STN mode having such problems of parallax in a reflective type color liquid crystal device is very difficult.

Thus, in the past, there have been made attempts to obtain a bright reflective type color liquid crystal device by varying the liquid crystal mode. For example, in the article by Mr. Tatsuo UCHIDA, et al. (IEEE Transactions on Electron Devices, Vol. ED-33, No. 8, pp. 1207-1211 (1986)), the PCGH (phase change guest host) mode not requiring a polarizing plate was used upon having performed a comparison of the brightness of various liquid crystal modes in FIG. 2 of the report. Also, in the publication of Japanese Laid-Open Patent No. 5-241143, the PDLC (polymer distributed type liquid crystal) mode not requiring a polarizing plate was used in order to realize a reflective type color liquid crystal device. When a liquid crystal mode not requiring a polarizing plate is used, not only does the absorption of the light due to the polarizing plate disappear, there is also the benefit of being able to eliminate fundamentally the problems of parallax by providing a reflecting plate next to the liquid crystal layer. Nevertheless, on the other hand, the liquid crystal mode not requiring a polarizing plate has the problems that the contrast in general is low, and in particular the PCGH mode has hysteresis in the voltage transmissivity properties and intermediate tone displays are not possible. Also, the liquid crystal modes adding other substances into the liquid crystals have many problems in the aspect of reliability. Consequently, if the TN mode and STN mode are used, having been used widely from the past and showing satisfactory results, these have not been surpassed.

Also, there have been performed tests to obtain a bright reflective type color display using bright color filters. Generally, the color filters used in a transmissive type color liquid crystal device have spectral properties as shown in FIG. 78. The horizontal axis of FIG. 78 is the wavelength of the light, and the vertical axis is the transmissivity. 7801 is the spectrum of a red filter, 7802 is the spectrum of a green filter, and 7803 is the spectrum of a blue filter. The light that can be seen by a human has individual differences, but it is generally within the wavelength range of 380 nm to 780 nm, and in particular, the sensitivity is high within the range from 450 nm to 660 nm. All the color filters of FIG. 78 have wavelengths whereby the transmissivity becomes 10% or less in this range, and most of the light is rendered useless. Also, if the value having simply averaged the transmissivity in this range of wavelengths is defined as the average transmissivity, the average transmissivity of the red filter was 28%, the green filter was 33%, and the blue filter was 30%. For use in a reflective type liquid crystal device, brighter color filters are required. Thus, in the aforementioned article by Mr. Tatsuo UCHIDA, et al., it was proposed that by using bicolor filters having mutually complementing colors as shown in FIG. 8 of the report, it is brighter than the case of tricolor filters. Their spectral properties are shown in FIG. 79. The horizontal axis of FIG. 79 is the wavelength of the light, and the vertical axis is the reflectivity. 7901 is the spectrum of a green filter, and 7902 is the spectrum of a magenta filter. It is necessary to pay attention in the comparison because the vertical axis is displayed as reflectivity, but still, within the 450 nm to 660 nm wavelength range, both color filters have wavelengths whereby the transmissivity becomes 10% or less. The average transmissivity of the green filter was 41% and the magenta filter was 48%. Also, an article by Mr. Seiichi MITSUI, et al. (SID92 Digest, pp. 437-440 (1992)) also relates to a reflective type color liquid crystal device having used the same PCGH mode, but they use bright bicolor color filters such as in FIG. 2 of the report. The spectral properties are shown in FIG. 80. The horizontal axis of FIG. 80 is the wavelength of the light, and the vertical axis is the reflectivity. 8001 is the spectrum of the green filter, and 8002 is the spectrum of the magenta filter. The vertical axis displays reflectivity, but if the square root of the reflectivity at each wavelength is hypothesized as the transmissivity, at least the transmissivity of the green filter is smaller than 50% at wavelengths of 470 nm or less. The average transmissivity of the green filter was 68%, and the magenta filter was 67%. In both patent publications, there was no problem of parallax because a reflective plate is provided in a position near the liquid crystal layer, sandwiching a color filter. Consequently, because the light necessarily passes through the color filter two times, it is possible to secure sufficient coloration even when using such a bright color filter. Also, the color filter proposed in FIGS. 2(*a*), (*b*), and (*c*) of the previous publication of Japanese Laid-Open Patent No. 5-241143 is made brighter by using the three colors, yellow, cyan, magenta rather than the three colors, red, green, blue filter. Their spectral properties are shown in FIG. 81. The horizontal axis of FIG. 81 is the wavelength, and the vertical axis is the reflectivity. 8101 is the spectrum of the yellow, 8102 is the spectrum of the cyan filter, and 8103 is the spectrum of the magenta filter. The vertical axis is represented by reflectivity, and because there are no graduations on the axis, it is difficult to compare, but undoubtedly, within the range of 450 nm to 660 nm, all the color filters have wavelengths whereby the transmissivity is 10% or less. When roughly estimating the average transmissivity, the yellow filter was 0% the cyan filter was about 60%, and the magenta filter was about 50%.

Thus, the struggle of the conventional development of a reflective type color liquid crystal device was based on the starting point of trying to obtain a bright display by combining bright liquid crystal modes not using a polarizing plate and bright color filters. However, despite being bright color filters, the use of color filters having wavelengths whereby the transmissivity in the 450 nm to 660 nm wavelength range stopped at 10% was common.

The present invention aims to provide a reflective type color liquid crystal device that can display colors brighter and more brilliant than the prior art by using a liquid crystal mode that uses a polarizing plate such as TN mode and STN mode, having great merit while tackling the various problems of brightness and parallax, and to provide an electronic apparatus using this.

DISCLOSURE OF THE INVENTION

In order to solve the problems mentioned above, the present invention comprises a pair of substrates having electrodes on the opposing inner faces and having formed matrix-like dot groups, a liquid crystal sandwiched between said substrates, at least two colors of color filters, and at least one polarizing plate. By being configured in this manner, the reflective type liquid crystal device has the advantages of having a higher contrast and being able to display colors more brilliantly compared with the conventional reflective type liquid crystal devices that use a liquid crystal mode not having a polarizing plate.

Also, the invention is characterized by the substrate on the side of the reflective plate among said pair of substrates having a thickness of 200 μm or more. More preferably, it is characterized by the substrate on the side of the reflective plate having a thickness of 700 μm or more. In other words, it is characterized by the thickness of the substrate on the side of the reflective plate being at least 1.25 times the horizontal or vertical dot pitch, whichever is the shorter, and more preferably at least 4 times. By being configured in this manner, it has the advantage that a high contrast can be secured due to the parallax effect even at the smallest drive surface area ratio. In the past, for example in the publication of Japanese Laid-Open Patent No. 3-64850, it is proposed to make the thickness of the lower substrate of a reflective type monochrome liquid crystal device 300 μm or less. Certainly in a reflective type monochrome liquid crystal device it is better to make the lower substrate as thin as possible from the viewpoint of reducing double-images (reflections). Nevertheless, in a reflective type color display, it is desirable to make the dot intervals wider from the viewpoint of making the color display brighter. When making the dot intervals wider, the contrast necessarily decreases, but if the lower substrate is thick enough, a high contrast can be secured by the reflective effect of the adjoining pixels.

Also, the invention is characterized by at least one color of said color filters having a transmissivity of 50% or more for the light of all the wavelengths in the range of 450 nm to 660 nm. More preferably, it is characterized by at least two colors of said color filters having a transmissivity of 50% or more for the light of all the wavelengths in the range of 450 nm to 660 nm. Further preferably, it is characterized by all of the color filters having a transmissivity of 50% or more for the light of all the wavelengths in the range of 450 nm to 660 nm. Most preferably, it is characterized by all of the color filters having a transmissivity of 60% or more for the light of all the wavelengths in the range of 450 nm to 660 nm. To express this in other words, it is characterized by all of the color filters having an average transmissivity of 70% or more for the light of all the wavelengths in the range of 450 nm to 660 nm. More preferably, it is characterized by all of the color filters having an average transmissivity of 70% to 90% for the light of all the wavelengths in the range of 450 nm to 660 nm. The transmissivity of the color filters mentioned here does not include the transmissivity of the glass substrates and the transparent electrodes, overcoats, and undercoats, and it is the transmissivity of the color filter unit. Also, when there is a distribution in the density of the color filters, or when color filters are provided having dots only on a part, the average transmissivity within the dots is made the transmissivity of the color filters. By being configured in this manner, the reflective type color liquid crystal device has the advantage of being able to display bright colors. In the past, for example in the claims of the publication of Japanese Laid-Open Patent No. 7-239469, it has all the color filters having the transmissivity of the light-transmitting areas at or above 80%, and the transmissivity of the light-absorbing areas at or below 50%. Also, in its preferred embodiments, the transmissivity of the light-absorbing areas was only 20-30%. With such color filters, if a liquid crystal mode using a polarizing plate is used, the display becomes dark and is not practical.

Also, the invention is characterized by said color filters comprising three colors, being a red system, a green system, and a blue system, moreover, either of said red system or said blue system color filters being orange or cyan. However, orange filters are characterized by having a transmissivity of 70% for the light in the wavelength range of 570 nm to 660 nm, desirably at or above 75%. Also, cyan filters are characterized by having a transmissivity of 70% for the light in the wavelength range of 450 nm to 520 nm, desirably at or above 75%. By being configured in this manner, the reflective type color liquid crystal device has the advantage of being able to display bright white and bright colors.

Also, the invention is characterized by said color filters comprising three colors, being a red system, a green system, and a blue system, moreover, the smallest transmissivity for the light of the red system color filters in the 450 nm to 660 nm range of wavelengths is smaller than the smallest transmissivity for the light of the green system color filters in the 450 nm to 660 nm range of wavelengths. More preferably, it is characterized by the red system and green system color filters having a transmissivity of 50% or more for the light of the 450 nm to 660 nm range of wavelengths. By being configured in this manner, the reflective type color liquid crystal device has the advantages of being able to display bright white having small color tainting, and being able to display brilliant red. Since red is the most appealing color stimulus for the human eyes, it is extremely preferable to display by accenting the red.

Also, the invention is characterized by said color filters being provided only on a part of the light polarizable areas within each dot. By being configured in this manner, the reflective type color liquid crystal device of the present invention has the advantages of being able to use the color filter fabrication technology as conventionally, and the color blending due to parallax is smaller. Also, when the color filters are provided in the positions between the electrodes and the liquid crystals, it has the advantages of a wide visual angle being obtained, and the color purity in the intermediate tones being improved. In the past, for example, even in the publication of Japanese Laid-Open Patent No. 7-62723, it was proposed to provide the color filters on a part of the dots, but these are transmissive type liquid crystal devices, and moreover, they differ from the present invention from the point that they are limited to dyeing color filters, and from the point that the area providing the color filters is large, being 67% to 91% of the dots. (The expression of the publication of Japanese Laid-Open Patent No. 7-62723 is "the non-colored area is 10-50% the area of the colored portion." Consequently, the area of the colored portion of the dots is 100/150=67% and 100/110=91%.)

Also, the invention is characterized by the layers transparent in the visible light regions being formed at substantially the same thickness as said color filters in the areas not having color filters provided in said light polarizable areas and the areas not light polarizable. By being configured in this manner, the reflective type color liquid crystal device has the advantage of being capable of a high image quality display without disturbance of the liquid crystal orientation.

Also, the invention is characterized by said color filters being provided only on ¾ of the total number of dots. More preferably, it is characterized by the filters being provided only on ⅔ of the total number of dots. By being configured in this manner, it has the advantages of being capable of a bright display, as well as being able to display usually brilliant colors by adjusting the brightness where there is no color filter when performing display of intermediate tone colors. Conventionally, formation of one pixel with four dots, being red, green, blue, and white, has been carried out partially for transmissive type liquid crystal devices, but it has not been proposed for reflective type color liquid crystal devices. Particularly with reflective type liquid crystal devices using the TN mode and the STN mode, the problems of parallax cannot be avoided, and it becomes very dark when performing color display, but bright color display is possible by providing dots not having color filters.

Also, the invention is characterized by said color filters being arranged such that colors of the neighboring dots are different. This indicates the so-called mosaic orientation and triangle orientation, and conversely, the stripe orientation does not enter into this scope. By being configured in this manner, it has the advantage of alleviating the phenomenon of the appearance of the coloration being different according to the visual angle, particularly when there is a parallax. In the past, for example in the publication of Japanese Laid-Open Patent No. 8-87009, a vertical stripe arrangement was recommended in claim 6 of the publication. Also, in the Specification of Japanese Laid-Open Patent No. 5-241143, page 6, right column, lines 17-18, it was explained that there is no theoretical difference between the stripe arrangement and the zigzag arrangement. Also, in FIG. 1 of the article by Mr. Tatsuo UCHIDA, et al. (IEEE Transactions on Electron Devices, Vol. ED-33, No. 8, pp. 1207-1211 (1986)), mosaic oriented color filters are used, but this is a case having provided the reflecting electrodes inside the cells, and it differs with the present invention in that there is no parallax.

Also, the invention is characterized by said color filters being provided on the entirety of the effective display areas. By being configured in this manner, it has the advantage of the display being clearly visible. "Effective display areas" is defined in the Electronic Industry Association of Japan (EIAJ) standard, ED-2511A, as "the effective areas as the drive display areas and the screens following that." Usually, in transmissive type color displays, the color filters are provided only on the drive display areas, and on the areas outside them are provided black masks made of metal or resin. As a matter of fact, in reflective type color displays, metallic black masks cannot be used because they cause glare. Also, resinous black masks increase costs because black masks originally were not provided on color filters. By way of explanation, if nothing is provided outside the drive display areas, the outsides become brighter, and the drive display areas become relatively dark. Thus, it is effective to provide the same color filters outside the drive display areas, and preferably with the same pattern.

Also, the invention is characterized by black masks not being provided in the areas outside said dots, but instead are provided color filters having the same extent of absorption or smaller than the areas inside the dots. This configuration implies that overlaying of black masks and color filters is not provided outside the required dots. Also, it implies not that nothing is provided outside the dots, but that color filters are provided on a part or the entirety thereof. By being configured in this manner, it has the advantage of a bright display being obtainable. This is because, particularly when there is a parallax, it becomes extremely dark if black masks are provided due to the brightness of the display being substantially proportional to the square of the aperture, and conversely, because the contrast is reduced markedly no color filters are provided whatsoever outside the dots. In the past, for example in the publication of Japanese Laid-Open Patent No. 59-198489, color filters are provided only on the pixel electrodes, and nothing is provided outside them. Also, in the publication of Japanese Laid-Open Patent No. 5-241143, cases having and not having black masks are explained, but there is nothing between those.

Also, the invention is characterized by color filters being provided on the outer surface of the substrate on the side of the reflective plate of said pair of substrates. By being configured in this manner, it has the advantage of being able to be provided cheaply. Also, it has the advantages of the assembly margin being expanded, and the visual angle being widened.

Also, the invention is characterized by nonlinear elements being provided for each dot on the inner surface of the substrate on the side of the reflective plate of said pair of substrates. By being configured in this manner, it has the advantages of needless surface reflection being reduced, and high contrast being obtainable.

Also, the invention is characterized by nonlinear elements being provided for each dot on the inner surface of one substrate of said pair of substrates, and these being wired in the direction parallel to the short edges of the dots. Usually, in a data display intended for a PC, because the dots are usually vertically long, the direction parallel to the short edges of the dots is horizontal (level). By being configured in this manner, it has the advantages of the aperture increasing, and a bright display being obtainable. This is particularly effective when black masks are not provided, and when it is a reflective type configuration having parallax.

Also, the invention is characterized by the drive surface area ratio being from 60% to 85%. The drive surface area ratio here is defined as the percentage occupied by the areas driven by the liquid crystals among the areas excluding the non-transparent parts such as the metal wiring and MIM elements among the pixels. By being configured in this manner, it has the advantages of having secured contrast, as well as a bright-colored display being obtainable.

Also, the invention is characterized by said reflective plate having scattering properties such that 80% or more of the light is reflected in a 30° cone centered on its positive direction of reflection when a light beam is projected onto it. Preferably, it is characterized by having scattering properties such that 95% or more of the light is reflected in the 30° cone. By being configured in this manner, it has the advantage of a bright display being obtainable. In the past, for example in the Specification of Japanese Laid-Open Patent No. 8-87009, page 6, lines 43-44, a reflective plate having a directionality of half-extent 30°. Being half-extent 30°, it is a scattering property such that, calculated roughly, about 30% of the light is reflected in a 30° cone, and the scattering is too much compared to the invention of the present invention. With such a configuration, the display becomes dark and cannot stand to practical use.

Also, the invention is characterized by said liquid crystals being nematic liquid crystals twisted about 90°, and the two polarizing plates are positioned such that their transmissive axes are perpendicular to the rubbing directions of the respectively adjacent substrates. This has applied the reflective type color liquid crystal device the TN mode proposed in the publication of Japanese Laid-Open Patent No. 51-013666. By being configured in this manner, the reflective type color liquid crystal device has the advantages of being brighter, having higher contrast, and having a wider visual angle.

Also, the invention is characterized by the product $\Delta n \times d$ of the multiple refraction $\Delta n$ of the liquid crystals and the thickness d of the liquid crystal layer is from 0.34 µm to 0.52 µm. More preferably, it is characterized by $\Delta n \times d$ being from 0.40 µm to 0.52 µm. Most preferably, it is characterized by $\Delta n \times d$ being 0.40 µm. By being configured in this manner, the reflective type color liquid crystal device has the advantages of being brighter and having a wider visual angle. The conventional reflective type monochrome liquid crystal device used the second minimum condition whereby coloration is slight, that is, is used the condition whereby $\Delta n \times d$ was 1.1 µm-1.3 µm. However, with a reflective type color liquid crystal device, there is no need to use the second minimum condition because slight coloration can be guaranteed by the color filters. Also, in the Specification of Japanese Laid-Open Patent No. 8-87009, page 5, lines 25-29, a condition of $\Delta n \times d = 0.55$ µm was used. However, compared to aspects of the invention, this condition is darker, and moreover the coloration is great.

Also, the invention is characterized by said liquid crystals being nematic liquid crystals twisted 90° or more, and at least one phase variation film is placed with the two polarizing plates are oriented. If possible, it is desirable to perform multiple-line simultaneous selective driving according to the method disclosed in the publication of Japanese Laid-Open Patent No. 6-348230. By being configured in this manner, it has the advantages of being low-cost and bright.

Also, the invention is characterized by said reflective plate being provided between the pair of substrates, and only one polarizing plate being placed. This has applied to the reflective type color liquid crystal device the nematic liquid crystals having one polarizing plate proposed in the publication of Japanese Laid-Open Patent No. 3-223715. By being configured in this manner, it has the advantages of being bright and being able to display colors of high color purity.

Also, the invention is characterized by said reflection plate being a mirror face reflection plate, and a scattering plate being provided on the outer surface of the substrate on the side of the introduced light. By being configured in this manner, it has the advantages of being bright and being able to display colors of high color purity.

Also, the invention is characterized by the liquid crystals on the metal wiring being oriented in the same manner as the liquid crystals on the pixel portion. By being configured in this manner, it has the advantage of being bright.

Also, the invention is characterized by the display being a normally white type. By being configured in this manner, it has the advantage of being bright.

Also, the invention is characterized by one pixel being composed of one bit. By being configured in this manner, it has the advantage of being able to increase the resolution during monochrome display.

Also, the electronic apparatus of the present invention comprises a reflective type color liquid crystal device as the display. By being configured in this manner, the electronic apparatus has the advantages of being low in power consumption, thin and light-weight, and having good visual recognition even when under direct sunlight.

Also, the apparatus is characterized by the display being attached so as to be moveable against the main body so that the peripheral light can be reflected efficiently to the observer.

By being configured in this manner, it has the advantage of a bright display being obtainable.

SUMMARY

The present invention uses a liquid crystal mode having a polarizing plate, and is characterized in that this is combined with color filters. There are numerous LCD modes having polarizing plates, but for the purpose of the present invention, an LCD mode capable of bright black and white display is suitable, such as the TN mode proposed in the publication of Japanese Laid-Open Patent No. 51-013666, the phase variation plate compensated type STN mode proposed in the publication of Japanese Laid-Open Patent No. 3-50249, the single polarizing plate type nematic liquid crystal mode proposed in the publication of Japanese Laid-Open Patent No. 3-223715, the nematic liquid crystal mode performing doubly stable switching proposed in the publication of Japanese Laid-Open Patent No. 6-235920, and the like.

A liquid crystal mode having a polarizing plate loses ½ or more of the light just by the presence of the polarizing plate. Consequently, in a reflective type color liquid crystal device, it should be more suitable to use a liquid crystal mode not having a polarizing plate. As a matter of fact, a liquid crystal mode not having a polarizing plate generally has low contrast, even when being the PCGH mode or PDLC mode. Consequently, when the pixels are composed of RGB dots, even when for green display the green dots are in the bright state and the blue and red pixels are in the dark state, if the contrast is insufficient, the blue and the red get mixed into the green display and the color purity decreases. As a matter of fact, in a liquid crystal mode having a polarizing plate, such phenomena does not occur because the contrast is high. Consequently, if the same color is displayed, it is a liquid crystal mode having a polarizing plate that can use color filters having low color purity. Since filters having low color purity are bright color filters, their portions should become bright displays. Also, because PCGH in particular is a normally black display, the areas between the dots are dark and may not contribute to the brightness, and the light from the visual angles other than the normal line direction of the panel may be absorbed by the pigment, and despite that a polarizing plate is not used, only a brightness to the extent of a 20% increase over the TN mode can be achieved. As long as the difference of brightness is to this extent, it can be overcome easily by the color design of the color filters.

Another problem in using a liquid crystal mode having a polarizing plate is the problem of parallax. When only one polarizing plate is used, this problem too can be avoided by building the polarizing plate into the cell, but it is unavoidable in the TN mode and STN mode using two polarizing plates. Regarding parallax, it was already discussed in detail in the paragraphs, "Problems the Invention Tries to Solve," but there are two problems. One is the problem of the mutual cancellation of colors, and the other is that the color display becomes dark.

The problem of the mutual cancellation of colors, in short, is that if the colors of the color filters passed through during introduction and the colors of the color filters passed through during emission differ, the brightness of a white display becomes ⅓ that of the case of no parallax because cancel each other and become pitch black. Such a problem occurs due to the use of the color filters alone in the transmissive type as shown in FIG. 78. If bright color filters are used, there is no turning pitch black even when passing through color filters of different colors.

Also, the problem of the color display becoming dark, in short, is that when displaying certain single colors, because ⅔ of the entirety of the dots are in the dark state, ⅔ during introduction is absorbed and ⅔ is further absorbed during emission, and only ⅑ of the light can be used. This is ⅓ the brightness of the case having no parallax. In order to solve this, first it is necessary to increase the aperture. Specifically, it takes a means whereby black masks are not provided outside the dots, MIM having metal wiring only on one side is used, the MIM is wired in the horizontal direction, and STN not requiring metal wiring is used. Moreover, by further reducing the drive surface area ratio, it is made such that an area far smaller than ⅔ the area of the entirety when displaying single colors (for example, about ½) goes into the dark state. By doing thus, a bright color display is possible even when there is a parallax. The means of making the drive surface area ratio smaller and not providing black masks is connected to the reduction of contrast, but by making the lower substrate thicker, it is possible to constrain to a minimum the reduction of contrast.

BRIEF DESCRIPTION OF THE DRAWINGS

FIG. 34 is a drawing showing the placement of the color filters of a reflective type color liquid crystal device in preferred embodiment 21 of the present invention.

FIG. 35 is a drawing showing the placement of the color filters of a reflective type color liquid crystal device in preferred embodiment 21 of the present invention.

FIG. 36 is a drawing showing the placement of the color filters of a reflective type color liquid crystal device in preferred embodiment 21 of the present invention.

DETAILED DESCRIPTION OF EMBODIMENTS

The present invention is explained below based on the drawings.

Preferred Embodiment 1

Figure 1:
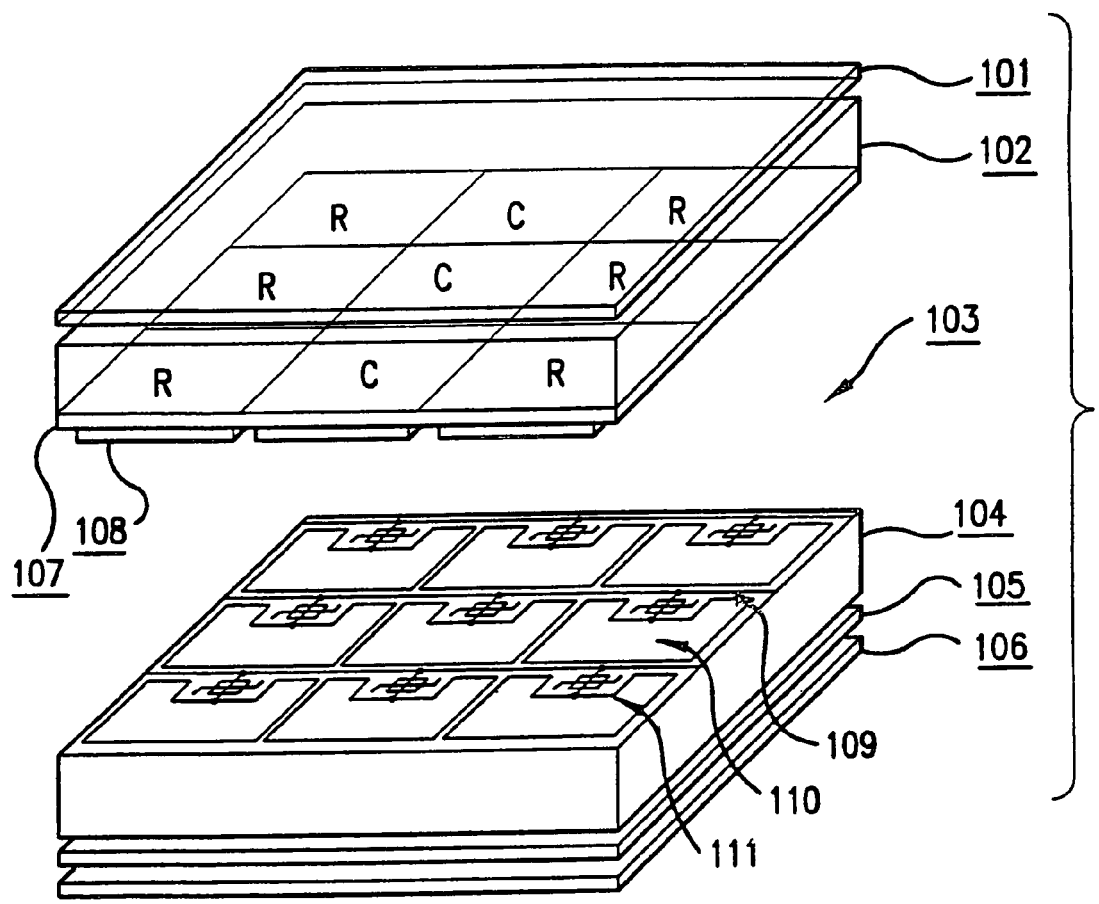
FIG. 1 is a drawing showing the essential components of the structure of a reflective type color liquid crystal device in preferred embodiments 1-4, 27, 29, and 33 of the present invention.

FIG. 1 is a drawing showing the essential components of the structure of a reflective type color liquid crystal device according to aspects of the present invention. First the configuration is explained. 101 is the upper polarizing plate, 102 is the opposing substrate, 103 is the liquid crystals, 104 is the element substrate, 105 is the lower polarizing plate, and 106 is the scattering reflective plate. On the opposing substrate 102 are provided the color filters 107 and the opposing electrodes (scanning wires) 108, and on the element substrate 104 are provided the signal wires 109, the pixel electrodes 110, and the MIM elements 111. Here, 101 and 102, 104 and 105, and 105 and 106 are drawn separated from each other, but this is in order to clarify the drawing, and in actuality they are adhered with glue. Also, the space between the opposing substrate 102 and the element substrate 104 is also drawn widely separated, but this is for the same reason, and in actuality there is only a gap of several μm to several tens of μm. Also, because FIG. 1 shows the essential components of a reflective type color liquid crystal device, only 3×3=9 dots are illustrated, but the present preferred embodiment has a higher number of dots than that, and it may have 480×640=307,200 dots or more.

The opposing electrodes 108 and the pixel electrodes 110 are composed of transparent ITO, and the signal wires are formed with metallic Ta. The MIM elements are of a structure having sandwiched an insulating film Ta2O5 with metallic Ta and metallic Cr. The liquid crystals 103 are nematic liquid crystals twisted 90°, and the upper and lower polarizing plates have their polarizing axes perpendicular to each other. This is the common TN mode configuration. Also, the color filters 107 are composed of the two colors, red ("R" in the drawing)

and cyan ("C" in the drawing), being in a mutually complementary relationship, and they are arranged in stripes.

Figure 2:
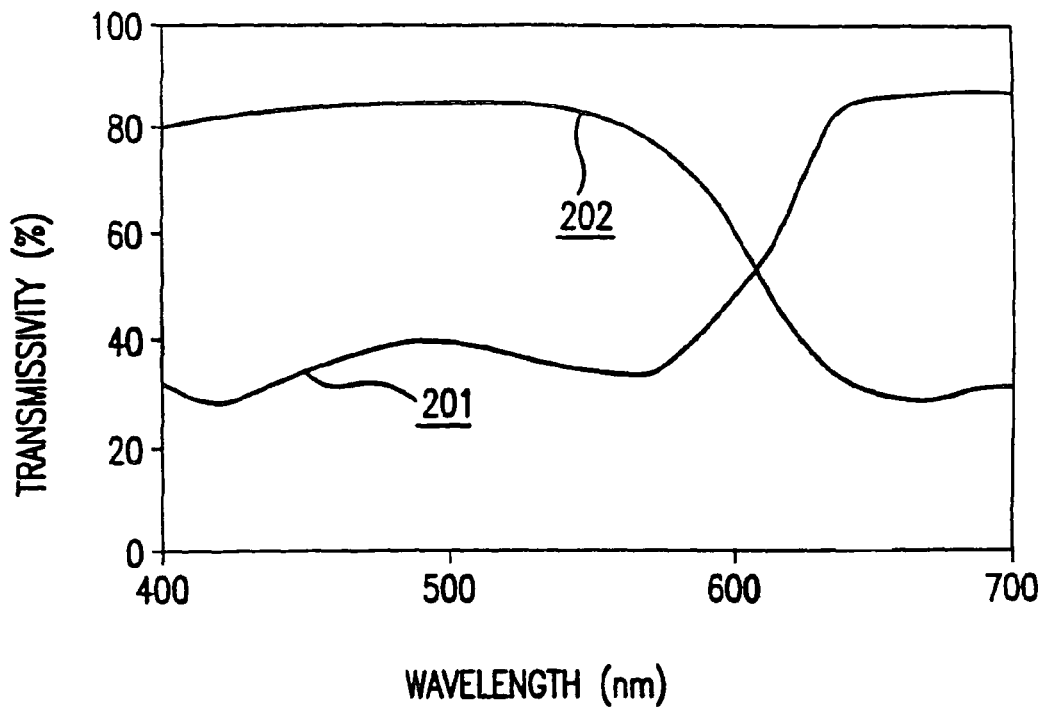
FIG. 2 is a drawing showing the spectral properties of the color filters of a reflective type color liquid crystal device in preferred embodiment 1 of the present invention.

FIG. 2 is a drawing showing the spectral properties of the color filters 107. The horizontal axis of FIG. 2 is the light wavelength, the vertical axis is the transmissivity, 201 shows the spectrum of the red filter, and 202 shows the spectrum of the cyan filter. The spectral measurement was performed for the opposing substrate unit using a microspectrometer, and the transmissivity was corrected to 100% by adding the glass substrates, the transmissive electrodes, and if present, the overcoats and undercoats. Consequently, they are the measurements of the spectral properties of the color filter units. All the properties of the color filters below were measured using this method. Also, the transmissivity in the claims is defined as the values measured by this method. Both the red filter and the cyan filter always show transmissivities of 30% or more within the wavelength range of 450 nm to 660 nm. Also, the average transmissivity within the same wavelength range was 52% for the red filter and 66% for the cyan filter. Since they are such extremely lightly colored color filters, it would be more correct to designate the "red" as "pink," but in order to avoid confusion, they are unified below by the expressions of pure colors.

The reflective type color liquid crystal device made in the above manner had a reflectivity of 24% and a contrast ratio of 1:15 during white display, it was capable of displaying the four colors, white, red, cyan, and black, the color of the red display was x=0.39, y=0.32, and the color of the cyan display was x=0.28, y=0.31. This is about 60 percent the brightness of the conventional reflective type monochrome liquid crystal device, an equivalent contrast ratio, and they are properties sufficient to be capable of use under normal indoor illumination or during the daytime outside.

A reflective type color liquid crystal device having color filters showing transmissivities not meeting 30% within even one part of the range of 450 nm to 660 nm cannot stand to normal use either for the reason that the display is dark and special illumination is necessary, or the white balance goes awry and white cannot be displayed.

In Preferred Embodiment 1, a structure was taken having provided transparent electrodes on the color filters, but there is no particular obstruction to providing the color filters on top of the transparent electrodes. Also, MIM elements were used as the active elements, but this was because they are useful in increasing the aperture, but if the aperture is the same, there is no change in the effect of the present invention even when using TFT elements.

Preferred Embodiment 2

Figure 3:
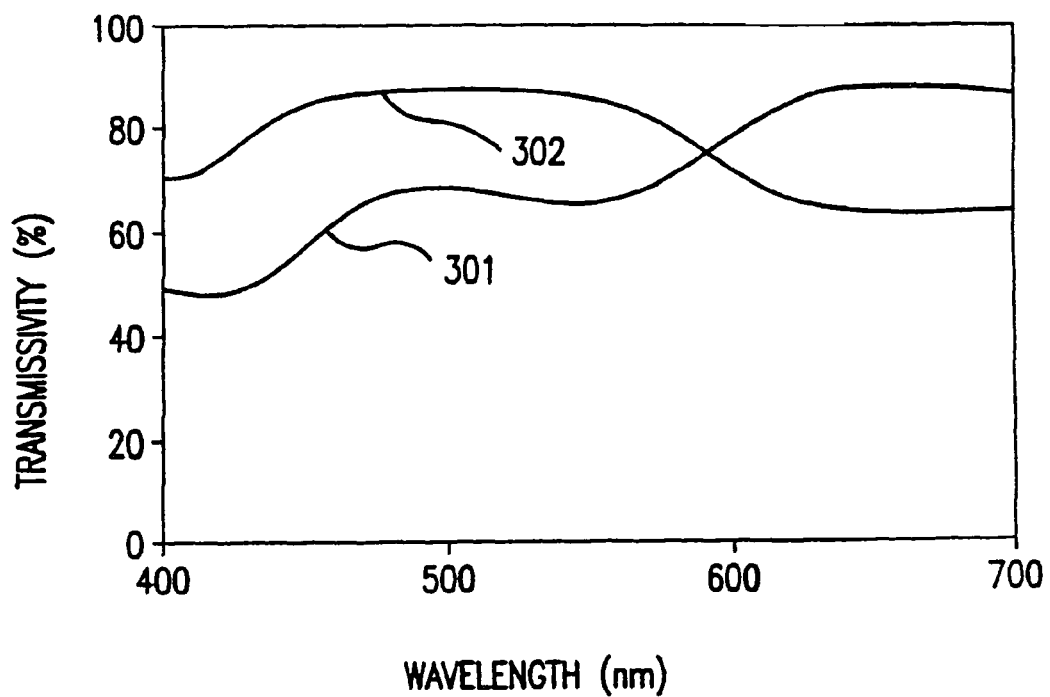
FIG. 3 is a drawing showing the spectral properties of the color filters of a reflective type color liquid crystal device in preferred embodiments 2, 3, 5, 23, 29, 31, 32, 34, 36, and 40 of the present invention.

FIG. 3 is a drawing showing the spectral properties of the color filters of the reflective type color liquid crystal device according to aspects of the present invention. The configuration of Preferred Embodiment 2 is similar to that of Preferred Embodiment 1 shown in FIG. 1, and color filters consisting of the two colors, red and cyan, still are provided. The horizontal axis of FIG. 2 is the light wavelength, the horizontal axis is the transmissivity, 301 shows the spectrum of the red filter, and 302 shows the spectrum of the cyan filter. Both colored color filters have transmissivities of 50% or more within the wavelength range of 450 nm to 660 nm. Also, the average transmissivity within the same wavelength range was 70% for the red filter and 78% for the cyan filter.

This reflective type color liquid crystal device had a reflectivity of 30% and a contrast ratio of 1:15 during white display, it was capable of displaying the four colors, white, red, cyan, and black, the color of the red display was x=0.34, y=0.32, and the color of the cyan display was x=0.29, y=0.31. This is about 70 percent the brightness of the conventional reflective type monochrome liquid crystal device, and an equivalent contrast ratio.

Thus, if at least one color of the color filters has a transmissivity of 50% or more for the light of all the wavelengths within the range of 450 nm to 660 nm, a bright reflective type color liquid crystal device can be obtained being usable under the substantially identical environments as the conventional reflective type monochrome liquid crystal device. When the color filters are constituted by two colors as in the present preferred embodiment, if one of the color filters has a transmissivity of 50% or more for the light of all wavelengths within the range of 450 nm to 660 nm, in addition to obtaining a good white balance, the other color filter also by necessity becomes such that it has a transmissivity of 50% or more in the same manner. Nevertheless, it is not necessarily so when using color filters of three colors or more. An example of that is introduced later in Preferred Embodiment 9.

Preferred Embodiment 3

FIG. 1 is a drawing showing the essential components of the structure of a reflective type color liquid crystal device according to aspects of the present invention. Also, FIG. 2 is a drawing showing the spectral properties of the color filters. Since the configuration of Preferred Embodiment 3 is fundamentally identical to the reflective type color liquid crystal device as defined in Preferred Embodiment 1, explanation of the various symbols is abridged. However, the Δnxd of the liquid crystals is set to 0.42 μm. Also, the dot pitch was made 160 μm horizontally and vertically, and the drive surface area ratio was made 75%.

Figure 4:
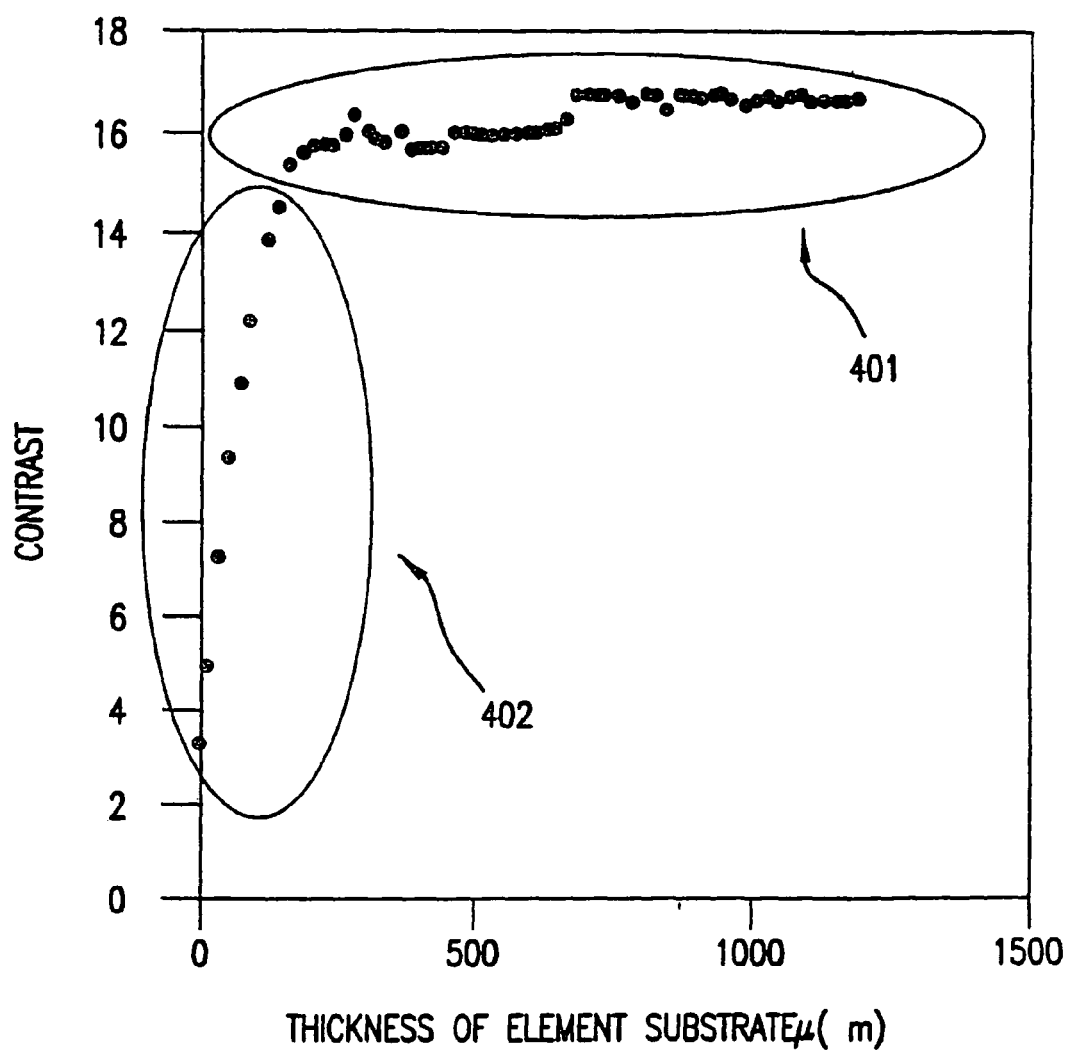
FIG. 4 is a drawing having plotted the change of contrast when having changed the thickness of the element substrate in a reflective type color liquid crystal device in preferred embodiment 3 of the present invention.

In Preferred Embodiment 3, the thicknesses of the lower substrates were changed variously. FIG. 4 shows the contrast when having changed the thickness of the element substrate 104. The horizontal axis in FIG. 4 is the thickness of the element substrate 104, the vertical axis is the contrast, 401 is the aggregation of the points indicating the contrast for each thickness of the element substrate 104 in Preferred Embodiment 3, and 402 is the aggregation of the points indicating the contrast for each thickness of the element substrate in a comparative example. The display colors when displaying colors was near x=0.39, y=0.32 for red, and x=0.28, y=0.31.

Since the drive surface area ratio is 75%, when the thickness of the element substrate is zero, the contrast can only reach at most 100/(100−75)=4. As a matter of fact, a good contrast of 1:15 or more was achieved by the parallax effect, that is, the reflections of the adjacent dots, alleviating the light loss between the dots. Also, an even higher contrast was obtainable by making the thickness of the element substrate 700 μm or more.

Because the optimum value of this thickness is in a close relationship with the dot pitch, the expressions 200 μm or more and 700 μm or more also may be expressed as 1.25 times or more the dot pitch of the shorter of either the horizontal or vertical and 4 times or more the same.

Preferred Embodiment 4

Figure 5:
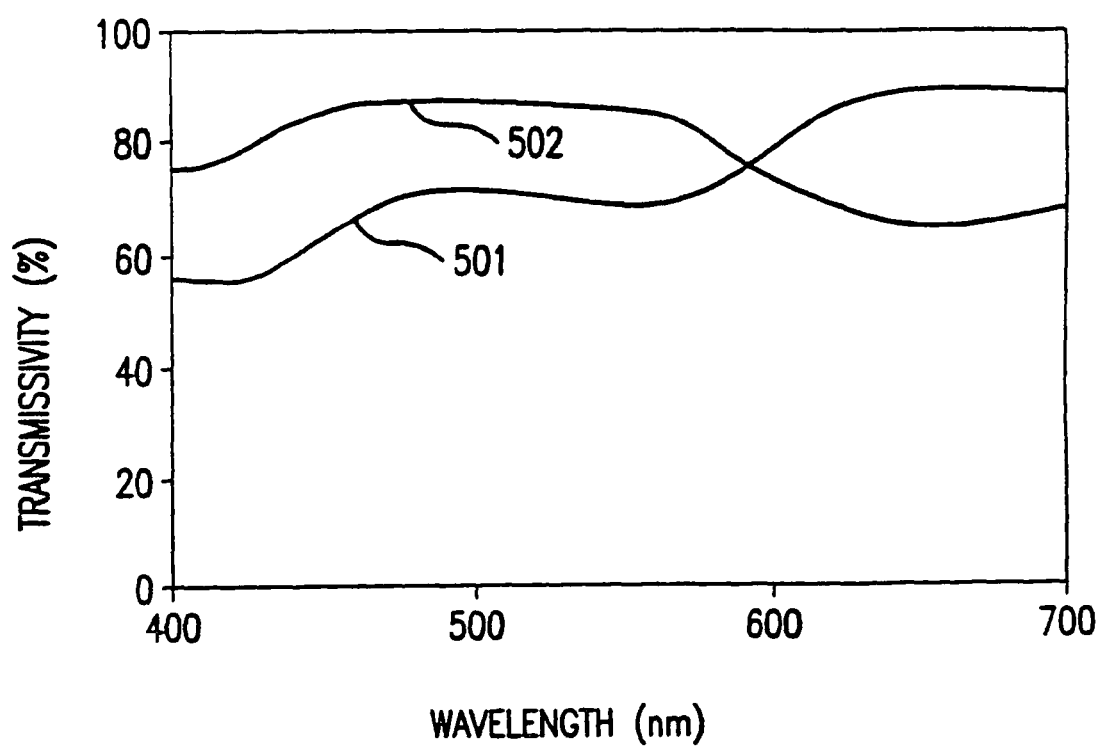
FIG. 5 is a drawing showing the spectral properties of the color filters of a reflective type color liquid crystal device in preferred embodiment 4 of the present invention.

FIG. 5 is a drawing showing the spectral properties of the color filters of a reflective type color liquid crystal device according to aspects of the present invention. The configuration of Preferred Embodiment 3 is identical to that of Preferred Embodiment 1 shown in FIG. 1, and color filters consisting of the two colors, red and cyan, still are provided. The horizontal axis of FIG. 5 is the light wavelength, the horizontal axis is the transmissivity, 501 shows the spectrum of the red filter, and 502 shows the spectrum of the cyan filter. Both colored color filters have transmissivities of 60% or more within the wavelength range of 450 nm to 660 nm. Also, the average transmissivity within the same wavelength range was 75% for the red filter and 80% for the cyan filter.

This reflective type color liquid crystal device had a reflectivity of 31% and a contrast ratio of 1:15 during white display, it was capable of displaying the four colors, white, red, cyan, and black, the color of the red display was x=0.33, y=0.33, and the color of the cyan display was x=0.30, y=0.31. This is about 80 percent the brightness of the conventional reflective type monochrome liquid crystal device, and an equivalent contrast ratio.

Thus, if both color filters have transmissivities of 60% or more for the light of all the wavelengths within the range of 450 nm to 660 nm, a bright reflective type color liquid crystal device usable without obstruction even when fixing an input means such as touch keys on the front surface of the liquid crystal device. However, if color filters are used not exceeding an average transmissivity of 90% within the same wavelength range, the display becomes extremely light and discrimination of the colors becomes difficult.

Preferred Embodiment 5

Figure 6:
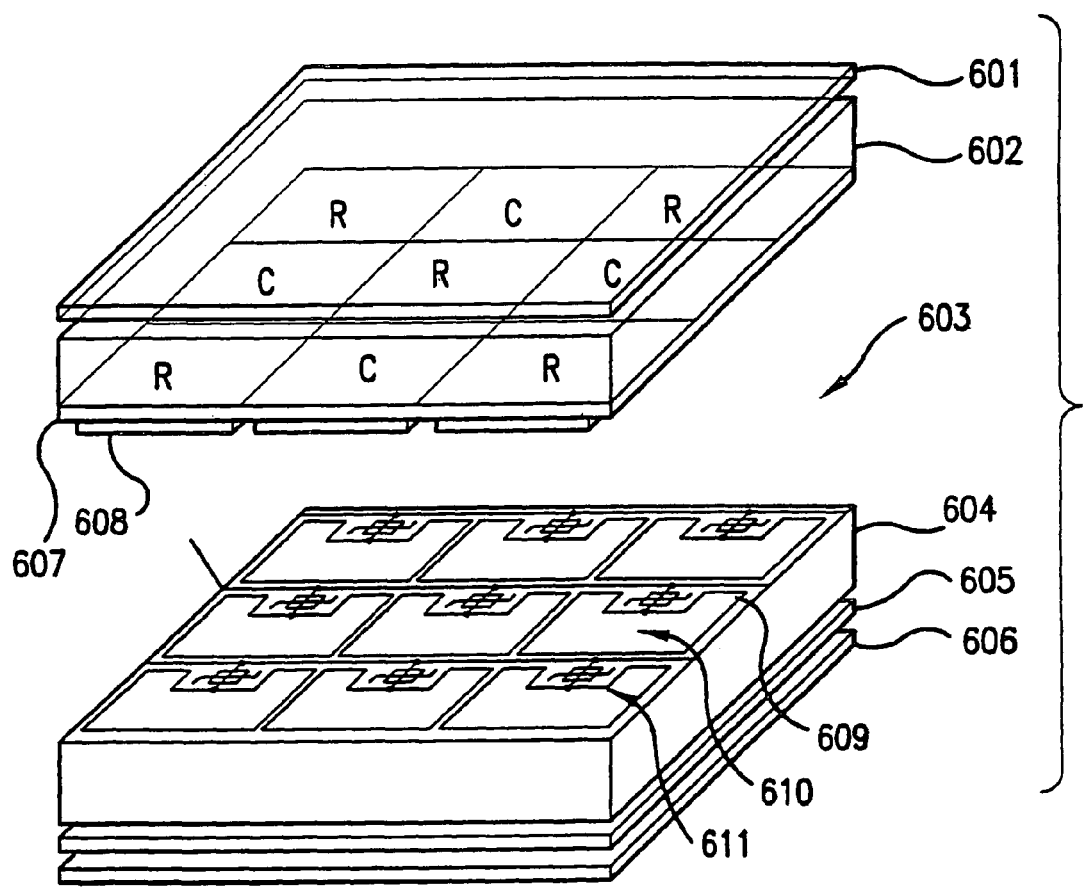
FIG. 6 is a drawing showing the essential components of the structure of a reflective type color liquid crystal device in preferred embodiments 5, 6, 23, 27, 32, and 40 of the present invention.

FIG. 6 is a drawing showing the essential elements of the structure of a reflective type color liquid crystal device according to aspects of the present invention. First the configuration is explained. 601 is the upper polarizing plate, 602 is the opposing substrate, 603 is the liquid crystals, 604 is the element substrate, 605 is the lower polarizing plate, and 606 is the scattering reflective plate. On the opposing substrate 602 are provided the color filters 607 and the opposing electrodes (scanning wires) 608, and on the element substrate 604 are provided the signal wires 609, the pixel electrodes 610, and the MIM elements 611.

Here, the color filters 7 are composed of the two colors, red ("R" in the drawing) and cyan ("C" in the drawing), being in a mutually complementary relationship, and they are arranged in mosaics so as to draw a checkered pattern. If the color filters are arranged in stripes as in FIG. 1, it will have extremely wide visual angle properties up and down, but it gets an alternating appearance of visual angles having coloration and visual angles losing color when moving the visual angle left and right. This is a phenomenon occurring because there is a distance only in the thickness of the lower substrate (the element substrate in this case) between the liquid crystal and color filter layers and the reflective plate. When arranged in mosaics so as to draw a checkered pattern as in FIG. 5, it is confirmed by experiment that such a phenomenon can be alleviated somewhat. It was also learned that the mixing of colors is good especially when the number of pixels is comparatively small. It is thought that this is due to the mixing of the visual angles having coloration and the visual angles losing colors in the case of mosaic arrangement, and that with at least one eye it appears as colored.

The color filters have the identical spectral properties as FIG. 3 of Preferred Embodiment 2, and the brightness and contrast ratio were also the same extent as Preferred Embodiment 2. Also, here was presented an example of mosaic arrangement, but if it is an arrangement in which the colors of the neighboring dots are different, other arrangements beginning with a triangle arrangement are also effective.

Preferred Embodiment 6

Figure 7:
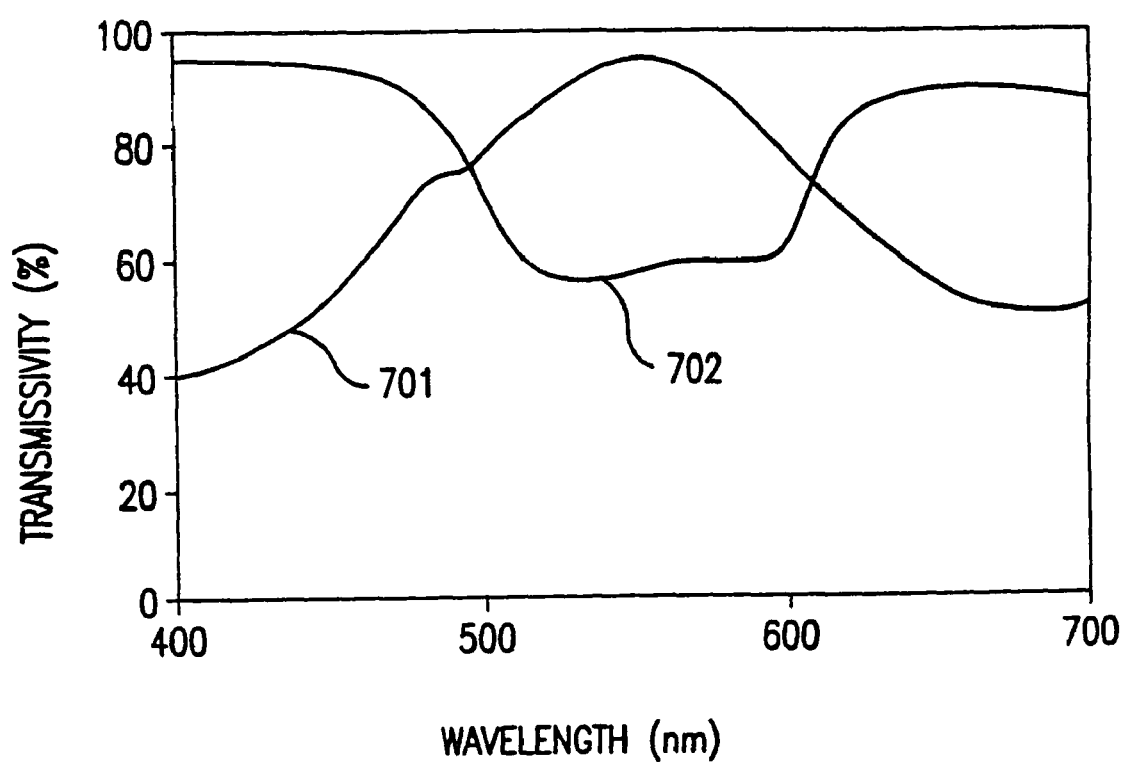
FIG. 7 is a drawing showing the spectral properties of the color filters of a reflective type color liquid crystal device in preferred embodiment 6 of the present invention.

FIG. 7 is a drawing showing the spectral properties of the color filters of the reflective type color liquid crystal device according to aspects of the present invention. The configuration of Preferred Embodiment 2 is identical to Preferred Embodiment 5 shown in FIG. 6, but color filters consisting of the two colors, green and magenta, are provided in place of the red and cyan. The horizontal axis of FIG. 7 is the light wavelength, the vertical axis is the transmissivity, 701 shows the spectrum of the green filter, and 702 shows the spectrum of the magenta filter. The color filters of both colors have transmissivities at 50% or more in the 450 nm to 660 nm wavelength ranges. Also, the average transmissivity in the same wavelength ranges is 76% for the green filter and 78% for the magenta filter.

This reflective type color liquid crystal device had a reflectivity of 31% and a contrast ratio of 1:17 during white display, it was capable of displaying the four colors, white, green, magenta, and black, the color of the green display was x=0.31, y=0.35, and the color of the magenta display was x=0.32, y=0.29. This is about 80 percent the brightness of the conventional reflective type monochrome liquid crystal device, and an equivalent contrast ratio.

As the two colors being in a mutually complementary relationship, other than red and cyan, and green and magenta, the combination of blue and yellow can be imagined, but from the standpoint of attractiveness, it is more desirable that colors of the red system can be displayed such as in the former two.

Preferred Embodiment 7

Figure 8:
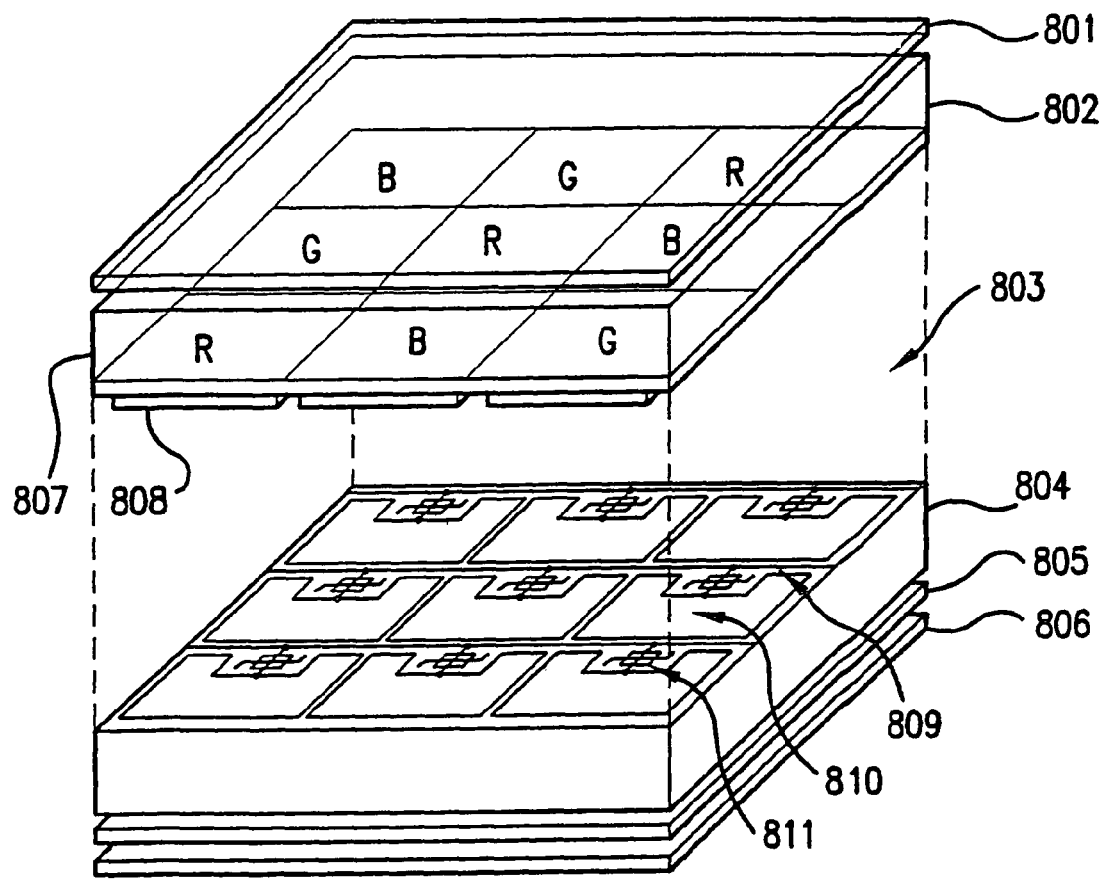
FIG. 8 is a drawing showing the essential components of the structure of a reflective type color liquid crystal device in preferred embodiments 7, 9, 24, 27, 28 of the present invention.

FIG. 8 is a drawing showing the essential elements of the structure of a reflective type color liquid crystal device according to aspects of the present invention. First the configuration is explained. 801 is the upper polarizing plate, 802 is the opposing substrate, 803 is the liquid crystals, 804 is the element substrate, 805 is the lower polarizing plate, and 806 is the scattering reflective plate. On the opposing substrate 802 are provided the color filters 807 and the opposing electrodes (scanning wires) 808, and on the element substrate 804 are provided the signal wires 809, the pixel electrodes 810, and the MIM elements 811. On top of the upper polarizing plate is applied a weak antiglare processing for the purpose of suppressing glare of the illuminating light.

Here, the color filters 807 are composed of the three colors, red ("R" in the drawing) green ("G" in the drawing), and blue ("B" in the drawing), and they are arranged in mosaics as in the drawing.

Figure 9:
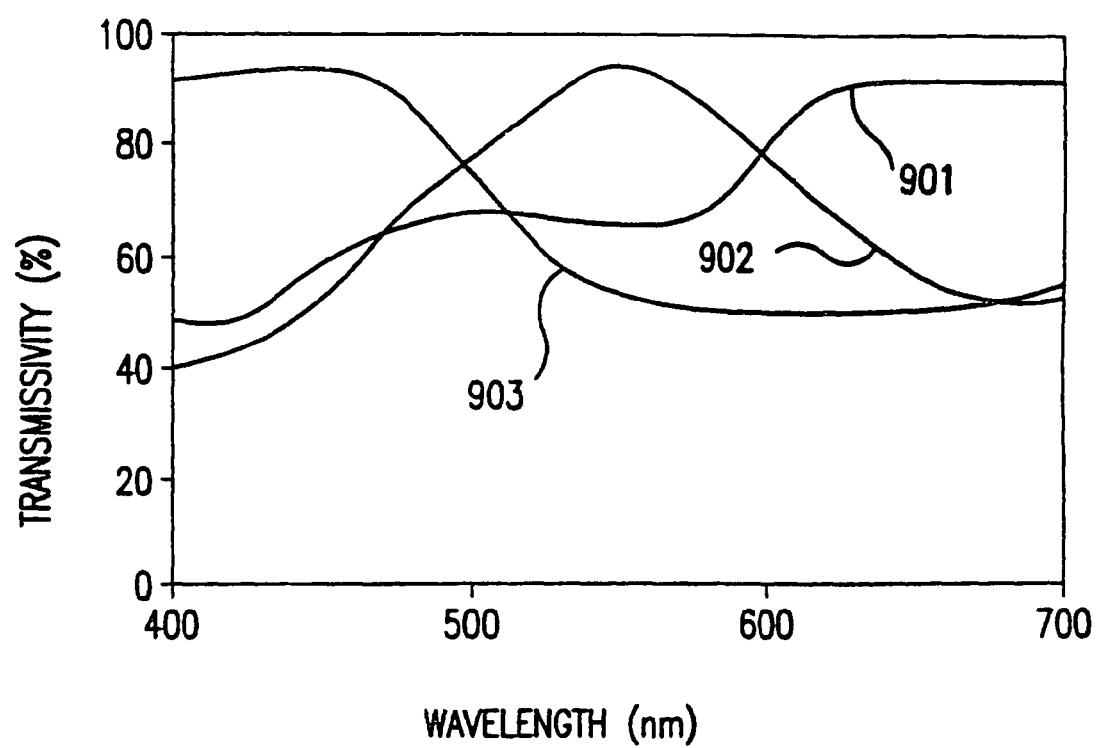
FIG. 9 is a drawing showing the spectral properties of the color filters of a reflective type color liquid crystal device in preferred embodiment 7 of the present invention.

FIG. 9 is a drawing showing the spectral properties of the color filters 807. The horizontal axis of FIG. 9 is the light wavelength, the vertical axis is the transmissivity, 901 shows the spectrum of the red filter, 902 shows the spectrum of the green filter, and 903 shows the spectrum of the blue filter. The color filters of all the colors have transmissivities at 50% or more in the 450 nm to 660 nm wavelength ranges. Also, the average transmissivity in the same wavelength ranges is 74% for the red filter, 75% for the green filter, and 64% for the blue filter.

The reflective type color liquid crystal device made in the above manner had a reflectivity of 28% and a contrast ratio of 1:14 during white display, it was capable of filtered display, the color of the red display was x=0.39, y=0.32, the color of the green display was x=0.31, y=0.35, and the color of the blue display was x=0.29, y=0.27. This is about 70 percent the brightness of the conventional reflective type monochrome liquid crystal device, and an equivalent contrast ratio, and it has properties for enjoying video images without needing special illumination.

Preferred Embodiment 8

Figure 10:
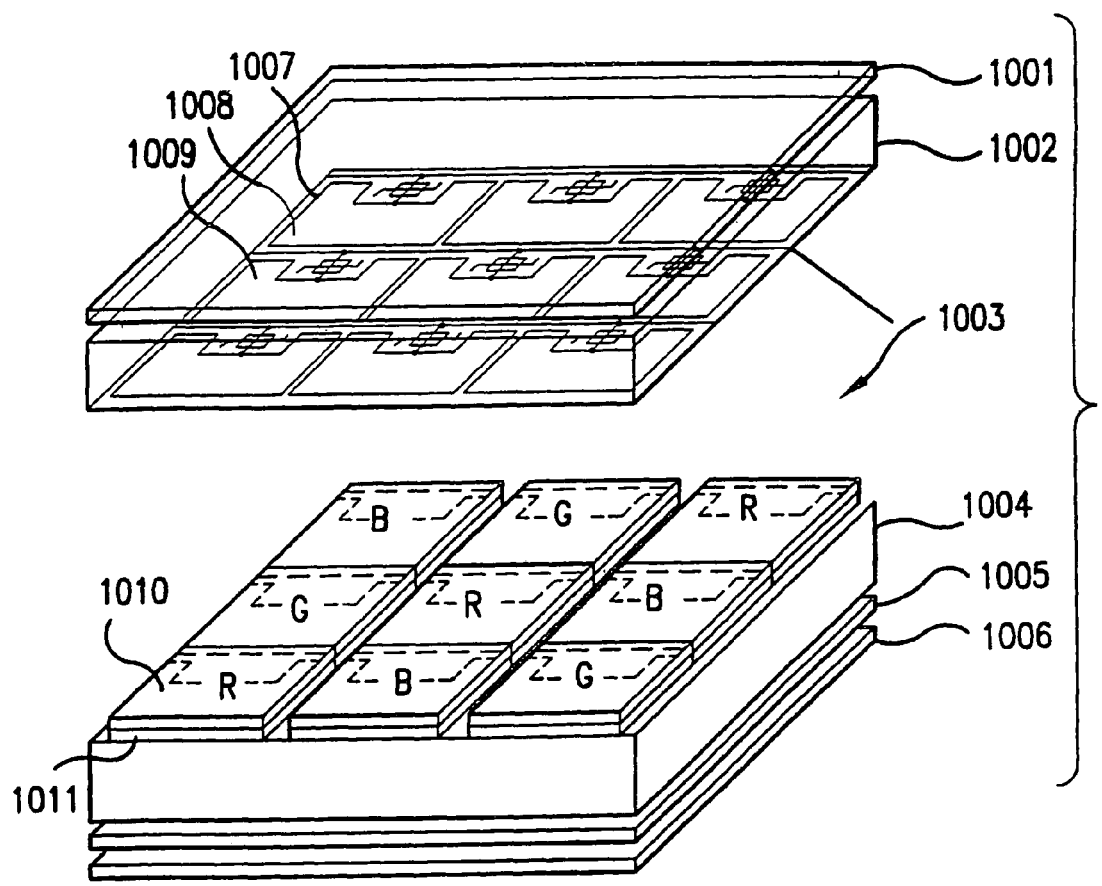
FIG. 10 is a drawing showing the essential components of the structure of a reflective type color liquid crystal device in preferred embodiments 8 and 10 of the present invention.

FIG. 10 is a drawing showing the essential elements of the structure of a reflective type color liquid crystal device according to aspects of the present invention. First the configuration is explained. 1001 is the upper polarizing plate, 1002 is the element substrate, 1003 is the liquid crystals, 1004 is the opposing substrate, 1005 is the lower polarizing plate, and 1006 is the scattering reflective plate. On the opposing substrate 1004 are provided the opposing electrodes (scanning wires) 1011 and the color filters 1010, and on the element substrate 1002 are provided the signal wires 1007, the MIM elements 1008, and the pixel electrodes 1009. The color filters 1010 are the dye scattering type, and they consist of the three colors, red ("R" in the drawing), green ("G" in the drawing), and blue ("B" in the drawing).

Figure 11:
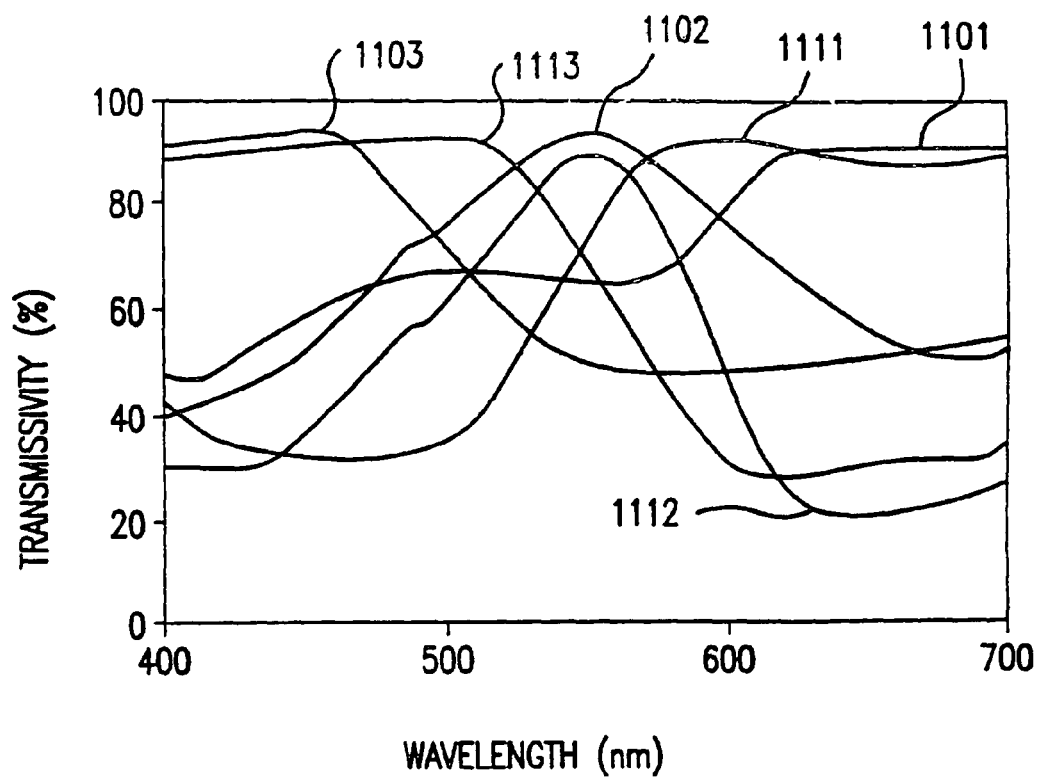
FIG. 11 is a drawing showing the spectral properties of the color filters of a reflective type color liquid crystal device in preferred embodiment 8 of the present invention.

FIG. 11 is a drawing showing the spectral properties of the color filters 1010. The horizontal axis of FIG. 11 is the light wavelength, the vertical axis is the transmissivity, 1101 shows the spectrum of the red filter, 1102 shows the spectrum of the green filter, and 1103 shows the spectrum of the blue filter. 1101, 1102, and 1103 are all light color filters, but the images displayed with such filters are light. The visibility of the red and blue may be particularly low, and discrimination of the colors is difficult. Thus, although the tinge is changed more or less, bright color filters transmitting a broader range of wavelengths were used.

When a red filter having lower color purity was used in place of the red filter, a rather orange-ish but very bright red could be displayed. The spectrum of this filter is shown in 1111. This filter is characterized by having a transmissivity of 70% or more, desirably 75% or more, for the light of the wavelengths in the range of 570 nm to 660 nm. Also, when a blue filter having lower color purity was used in place of the blue filter, a rather cyan-ish but very bright blue could be displayed. This filter is shown in 1114. This filter is characterized by having a transmissivity of 70% or more, desirably 75% or more, for the light of the wavelengths in the range of 450 nm to 520 nm. Nevertheless, if such color filters are used, the white display has a tendency toward becoming reddish or bluish. Thus, when using the above color filters, it is desirable to adjust the color balance by combining a green filter having a higher color purity. A green filter having a higher color purity is shown in 1112. This filter is characterized by having a transmissivity of 70% or more for the light of the wavelengths in the range of 510 nm to 590 nm.

Preferred Embodiment 9

Figure 12:
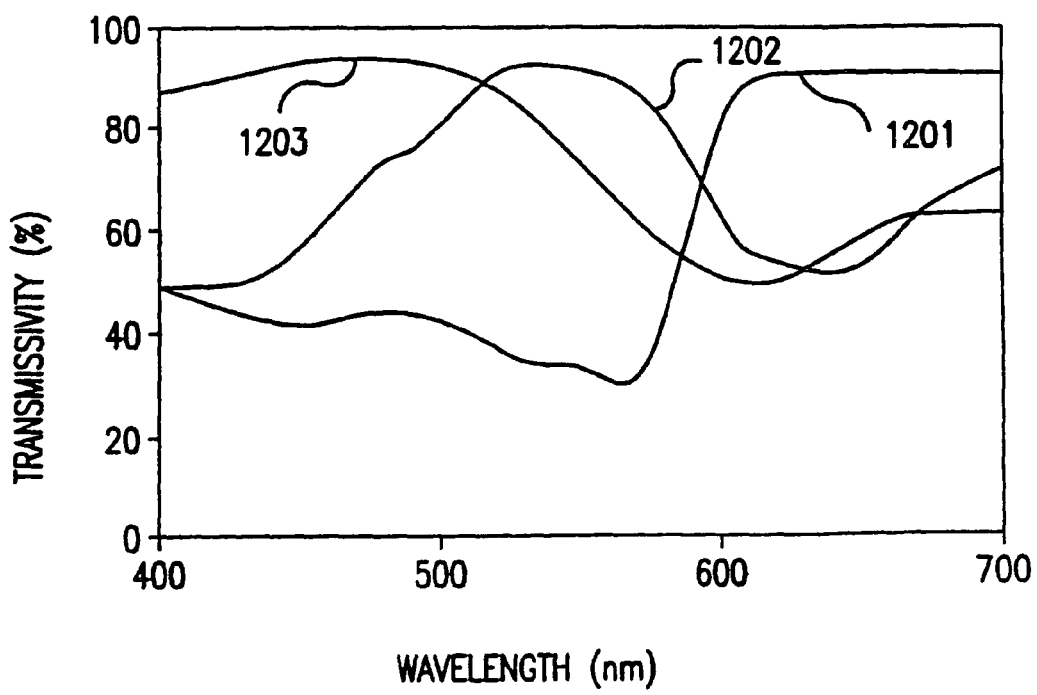
FIG. 12 is a drawing showing the spectral properties of the color filters of a reflective type color liquid crystal device in preferred embodiments 9, 24, 25, and 26 of the present invention.

FIG. 12 is a drawing showing the spectral properties of the color filters of a reflective type color liquid crystal device according to aspects of the present invention. The configuration of Preferred Embodiment 9 is similar to the case of Preferred Embodiment 7 shown in FIG. 8, and color filters consisting of the three colors, red, green, and blue, are still provided. The horizontal axis of FIG. 12 is the light wavelength, the vertical axis is the transmissivity, 1201 shows the spectrum of the red filter, 1202 shows the spectrum of the green filter, and 1203 shows the spectrum of the blue filter. Here, only the green filter has a transmissivity of 50% or more within the wavelength range of 450 nm to 660 nm. Also, the lowest transmissivity of the red filter for the light of the wavelengths in the range of 450 nm to 660 nm is clearly lower in comparison with the blue filter and the green filter. By having such a red filter, it is possible to display brilliantly the red that appeals most to the human eyes. Also, in the aim of compensate for the deepening of the red, the spectrum 1203 of the blue filter was made nearer to cyan. Therefore, bright colors having little coloration could be displayed.

The reflective type color liquid crystal device made in the above manner had a reflectivity of 26% and a contrast ratio of 1:13 during white display, it was capable of filtered display, the color of the red display was x=0.41, y=0.30, the color of the green display was x=0.31, y=0.36, and the color of the blue display was x=0.26, y=0.28. This is about 70 percent the brightness of the conventional reflective type monochrome liquid crystal device, and an equivalent contrast ratio. Because the red color is particularly highlighted, the color reproducibility is insufficient. Consequently, it is more suitable for the display of portable information machinery rather than the display of video images.

Preferred Embodiment 10

FIG. 10 is a drawing showing the essential components of the structure of a reflective type color liquid crystal device according to aspects of the present invention. The configuration is explained. 1001 is the upper polarizing plate, 1002 is the element substrate, 1003 is the liquid crystals, 1004 is the opposing substrate, 1005 is the lower polarizing plate, and 1006 is the scattering reflective plate. On the opposing plate 1004 are provided the opposing electrodes (scanning wires) 1011 and the color filters 1010, and on the element substrate 1002 are provided the signal wires 1007, the MIM elements 1008, and the pixel electrodes 1009. The color filters 1010 are the dye scattering type, and they consist of the three colors, red ("R" in the drawing), green ("G" in the drawing), and blue ("B" in the drawing).

Figure 13:
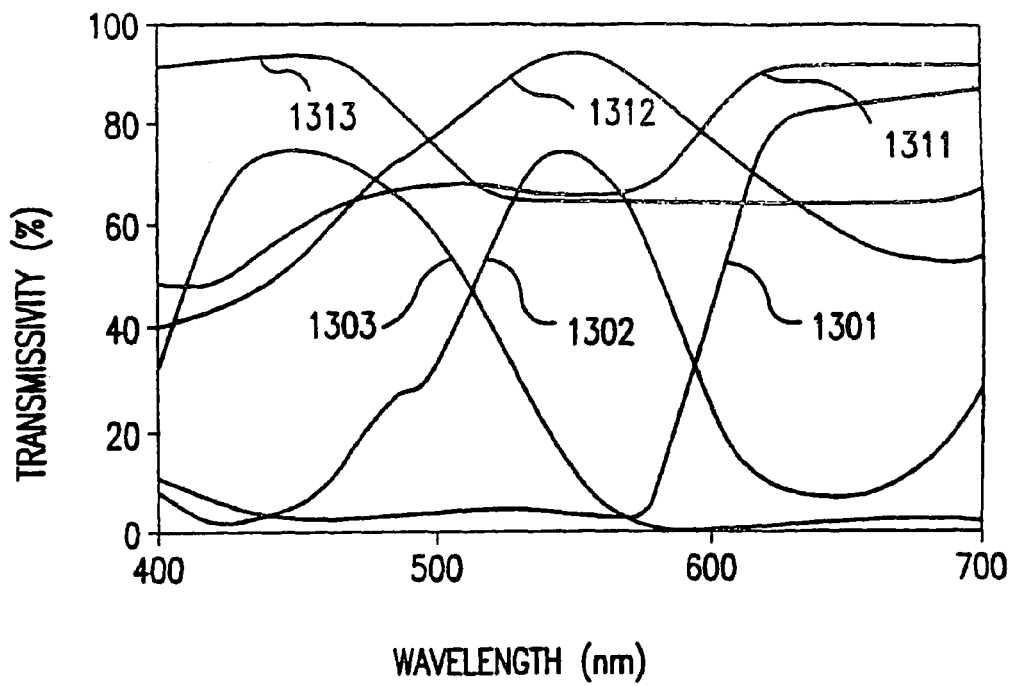
FIG. 13 is a drawing showing the spectral properties of the color filters of a reflective type color liquid crystal device in preferred embodiment 10 of the present invention.

FIG. 13 is a drawing showing the spectral properties of the color filters 1010. The horizontal axis of FIG. 13 is the light wavelength, the vertical axis is the transmissivity, 1301 and 1311 show the spectrum of the red filter, 1302 and 1312 show the spectrum of the green filter, and 1303 and 1313 show the spectrum of the blue filter. Also, 1301 and 1311, 1302 and 1312, and 1303 and 1313 variously have the same color filter material, but their thicknesses are different, the former of each being 0.8 μm and the latter being 0.2 μm. The average transmissivity of the red filters for the light in the 450 nm to 660 nm wavelength range was 28% when the thickness was 0.8 μm and 74% when the thickness was 0.2 μm. Also, the average transmissivity of the green filters was 33% when the thickness was 0.8 μm and 75% when the thickness was 0.2 μm. Also, the average transmissivity of the blue filters was 30% when the thickness was 0.8 μm and 74% when the thickness was 0.2 μm.

Figure 14:
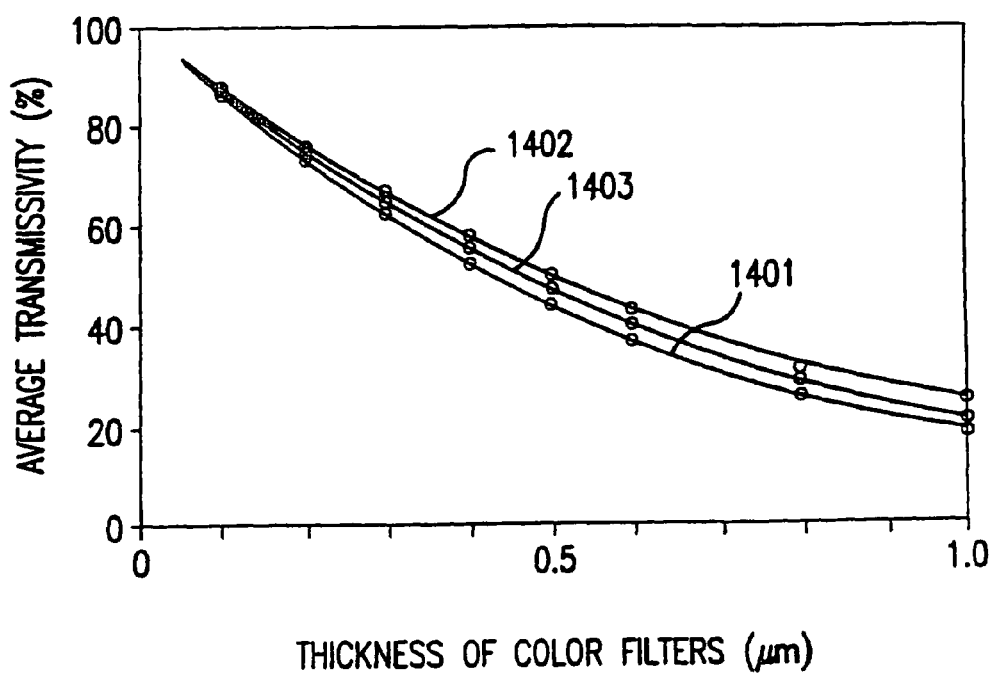
FIG. 14 is a drawing having plotted the change of average transmissivity when having changed the thickness of the color filters in a reflective type color liquid crystal device in preferred embodiment 10 of the present invention.

FIG. 14 is a drawing having plotted the average transmissivity when having variously changed the thickness of the color filters. In the drawing, 1401 is the case of the blue filter, 1402 is the case of the green filter, and 1403 is the case of the red filter. All of the color filters have a trend whereby the average transmissivity becomes higher as the filter becomes thinner. The thickness of an ordinary dye scattering type color filter used in transmissive types is about 0.8 μm, but when having used such a color filter, it could only display so dark that it couldn't be discriminated unless is under direct sunlight outdoors or unless special illumination was performed with such as a spotlight. When the thickness was 0.23 μm or less, that is, when the average transmissivity of all the color filters was 70% or more, a brightness was obtained being comfortable to use in a comparatively bright room of about 1000 lux brightness, for example, in an environment such as an office desk illuminated by a fluorescent lamp stand. When the thickness was 0.18 µm or less, that is, when each of the average transmissivity of all the color filters was 75% or more, a brightness was obtained being sufficient for use even under the ordinary room illumination of about 200 lux. Also, when the thickness was 0.08 µm or less, that is the average transmissivity of all the color filters was 90% or more, a display was possible such that the colors could be recognized clearly. Thus, for dye scattering type color filters, it is desirable that their thickness be 0.23 µm or less, more preferably 0.1 µm or less, and further preferably 0.08 µm or less.

Preferred Embodiment 11

Figure 15:
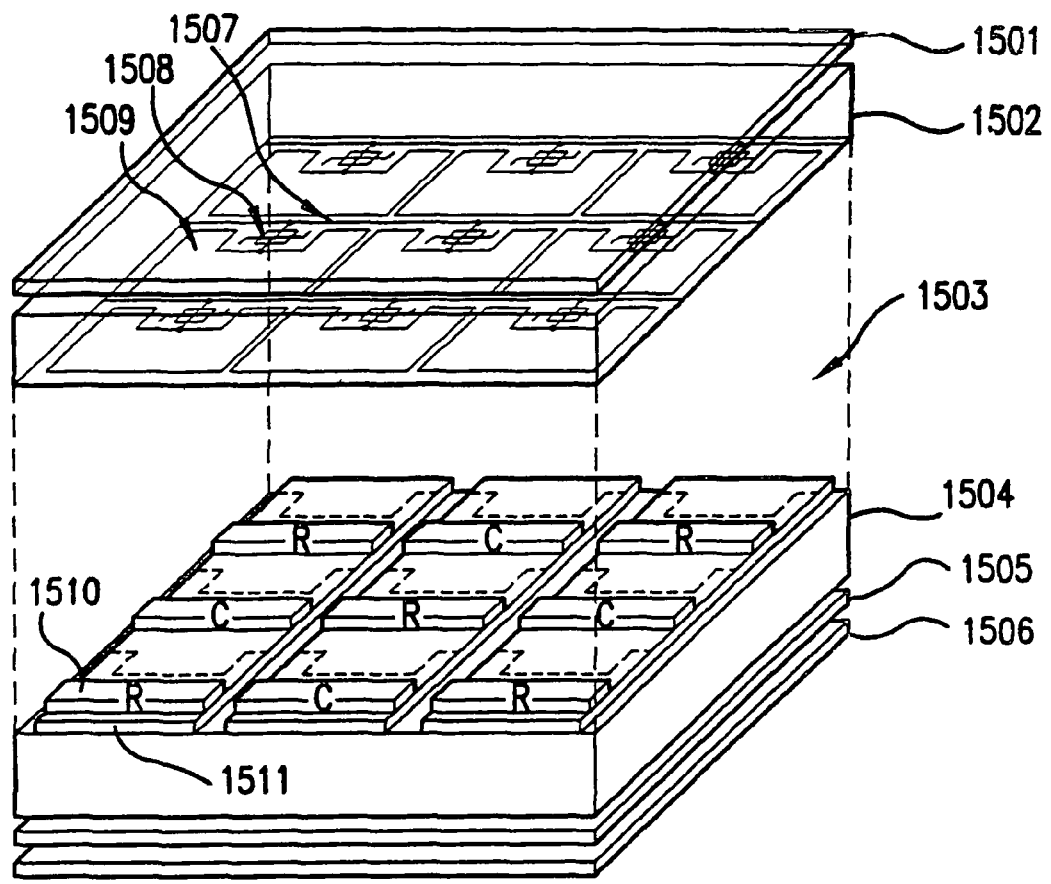
FIG. 15 is a drawing showing the essential components of the structure of a reflective type color liquid crystal device in preferred embodiments 11, 12, and 15 of the present invention.

FIG. 15 is a drawing showing the essential components of the structure of a reflective type color liquid crystal device according to aspects of the present invention. First the configuration is explained. 1501 is the upper polarizing plate, 1502 is the element substrate, 1503 is the liquid crystals, 1504 is the opposing substrate, 1505 is the lower polarizing plate, and 1506 is the scattering reflective plate. On the opposing plate 1504 are provided the opposing electrodes (scanning wires) 1511 and the color filters 1510, and on the element substrate 1502 are provided the signal wires 1507, the MIM elements 1508, and the pixel electrodes 1509. The light-variable area in one dot is an area in which a bump-shaped ITO on the element substrate overlaps with a bar-shaped ITO on the opposing substrate, and that outline is shown with a broken line on the ITO of the opposing substrate. (Although a part is overlaid by the color filters, please refer to FIG. 20, which shows the same outline.)

The opposing electrodes 1511 and the pixel electrodes 1509 are formed of transparent ITO, and the signal lines 1507 are formed of metallic Ta. The MIM elements are of a structure having sandwiched an insulating film Ta2O5 with metallic Ta and metallic Cr. The liquid crystals 1503 are nematic liquid crystals twisted 90°, and the Δn and cell gap d of the liquid crystal cells was selected such that the Δnxd of the liquid crystal cells becomes 1.34 µm. Also, the upper and lower polarizing plates were arranged such that their absorption axes become parallel with the rubbing axis of the adjacent substrate. This is the configuration of the TN mode being the brightest and having the least coloration. Also, the color filters 1510 are composed of the two colors, red ("R" in the drawing) and cyan ("C" in the drawing), being in a mutually complementary relationship, but they are provided only on a part of the light-variable area.

Figure 16:
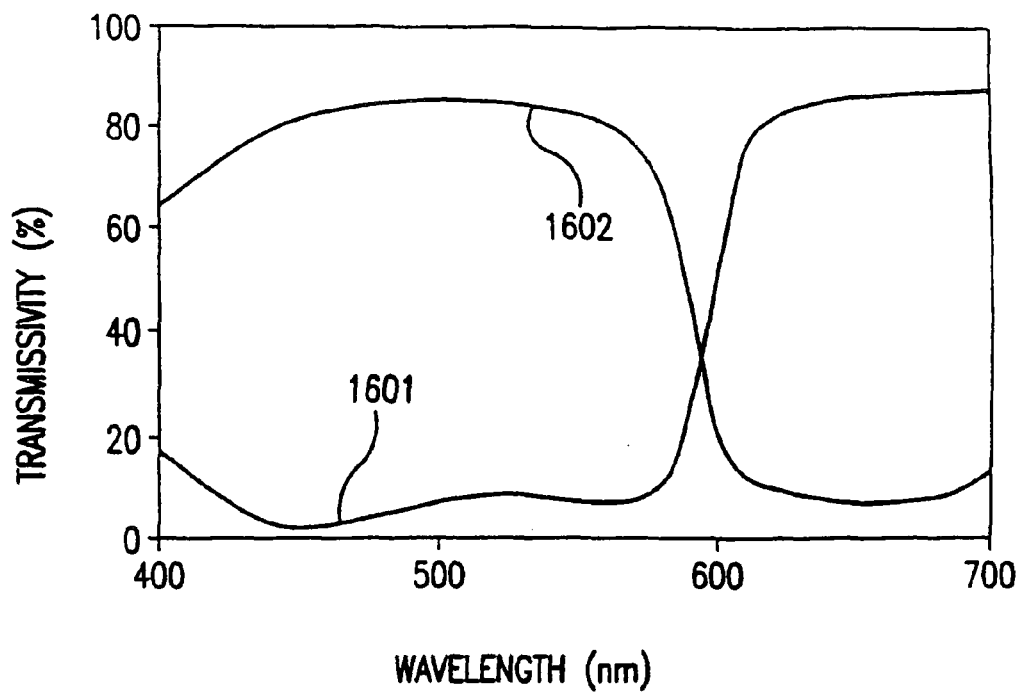
FIG. 16 is a drawing showing the spectral properties of the color filters of a reflective type color liquid crystal device in preferred embodiments 11, 21, and 26 of the present invention.

FIG. 16 is a drawing showing the spectral properties of the color filters 1510. The horizontal axis of FIG. 16 is the light wavelength, the vertical axis is the transmissivity, 1601 shows the spectrum of the red filter, and 1602 shows the spectrum of the cyan filter. The average transmissivity, having simply averaged the transmissivities in the 450 nm to 660 nm wavelength range, was 30% for the red filter, and 58% for the cyan filter. However, this is when the color filters are provided on the entire face, but when they are provided only on a part, the average value in the light-variable area shall be called the average transmissivity.

Figure 17:
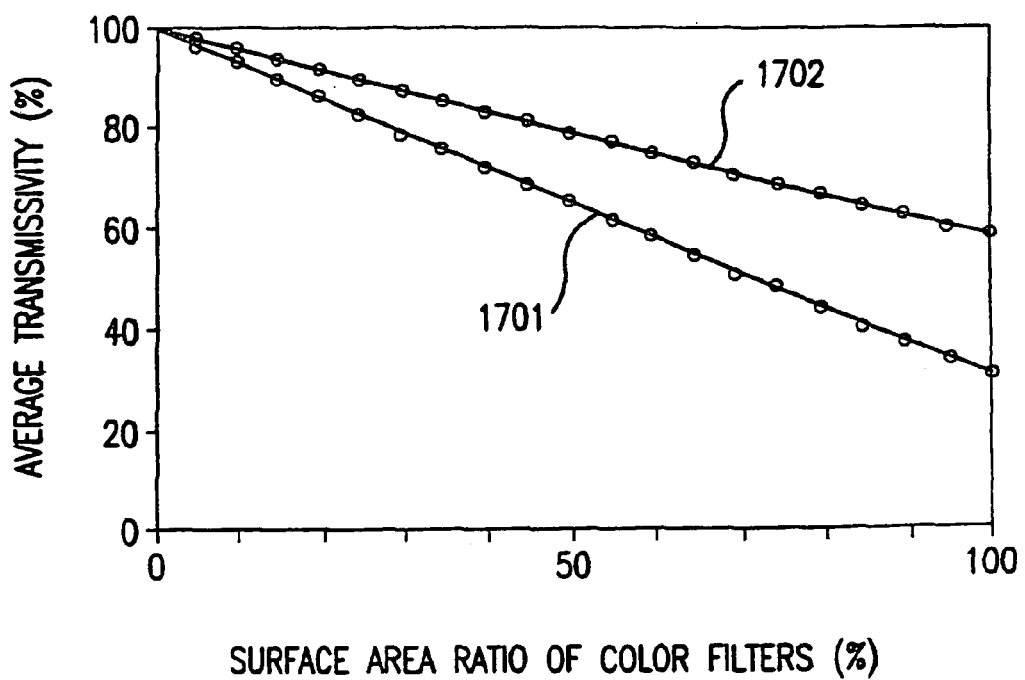
FIG. 17 is a drawing having plotted the change of average transmissivity when having changed the percentage of the area providing the color filters in a reflective type color liquid crystal device in preferred embodiment 11 of the present invention.

FIG. 17 is the results having sought the average transmissivity by variously changing the percentages of the areas providing the color filters within the light-variable area. 1701 is the average transmissivity in dots providing the red filter, and 1702 is the average transmissivity in the dots providing the cyan filter.

When the surface area ratio of the color filters was 100%, that is, when the color filters were provided on the entire face, the displays were dark such that they could not be discriminated unless under direct sunlight outdoors or unless special illumination was performed with such as a spotlight. When the surface area ratio of the color filters was 45% or less, that is, when the average transmissivity of all the color filters was 70% or more, a brightness was obtained being comfortable to use in a comparatively bright room of about 1000 lux brightness, for example, in an environment such as an office desk illuminated by a fluorescent lamp stand. When the surface area ratio of the color filters was 35% or less, that is, when the average transmissivity of all the color filters was 75% or more, a brightness was obtained being sufficient for use even under the ordinary room illumination of about 200 lux. Also, when the surface area-ratio of the color filters was 15% or more, that is, when the average transmissivity of all the color filters was 90% or less, a display was possible such that the red and the cyan could be discriminated. When the surface area ratio of the color filters was 25% or more, that is, when the average transmissivity was also 90% or less, a display was possible such that the colors could be recognized clearly. Also, when all the color filters were provided, a high contrast ratio of 1:15 could be obtained.

The color filters used in Preferred Embodiment 11, excluding the points using the cyan color, are ordinary color filters used in transmissive types, and they are of the same extent of spectral properties and the same extent of brightness. For such color filters, it is desirable that they be provided on 45% or less of the light-variable area, preferably 35% or less, moreover, that they be provided on 15% or more, preferably 25% or more of the area.

In Preferred Embodiment 1, MIM elements were used as the active elements, but this was because they are rather useful in increasing the aperture, but if the aperture is the same, there is no change in the effect of the present invention even when using TFT elements.

Preferred Embodiment 12

Preferred Embodiment 12 also is a reflective type color liquid crystal device according to aspects of the present invention. Its structure is the same as the reflective type color liquid-crystal device of Preferred Embodiment 11 shown in FIG. 15, but the properties of the color filters are different.

Figure 18:
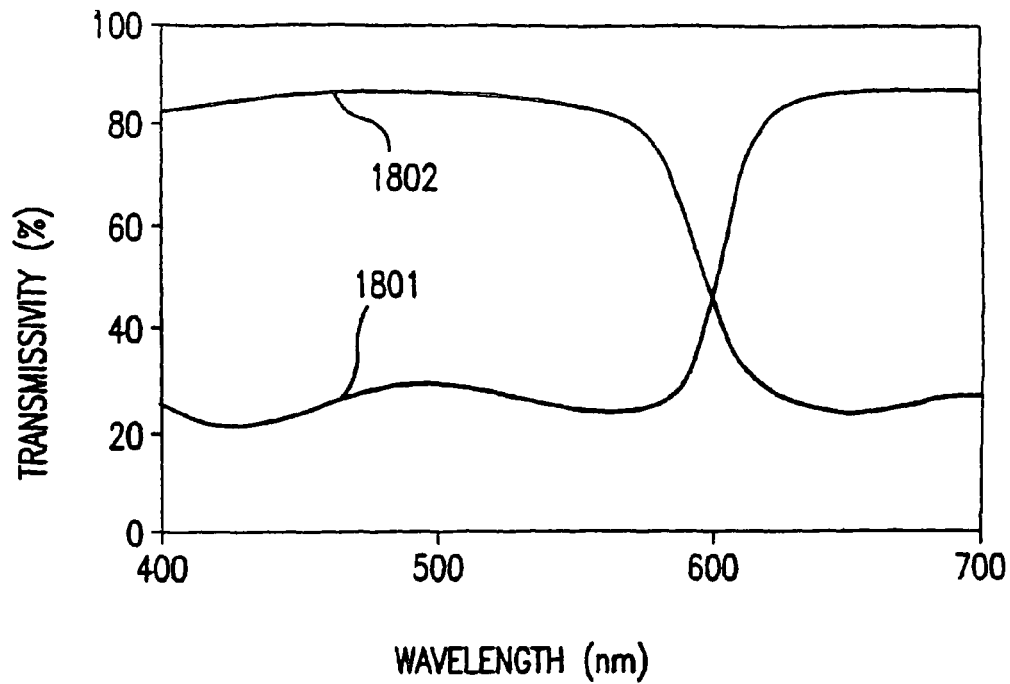
FIG. 18 is a drawing showing the spectral properties of the color filters of a reflective type color liquid crystal device in preferred embodiments 12 and 26 of the present invention.

FIG. 18 is a drawing showing the spectral properties of the color filters used in Preferred Embodiment 2. The horizontal axis of FIG. 18 is the light wavelength, the vertical axis is the transmissivity, 1801 shows the spectrum of the red filter, and 1802 shows the spectrum of the cyan filter. The average transmissivity was 41% for the red filter, and 62% for the cyan filter. As color filters that can be fabricated according to conventional processes without the problems of dye distribution, and the like, this extent of brightness is the maximum.

Figure 19:
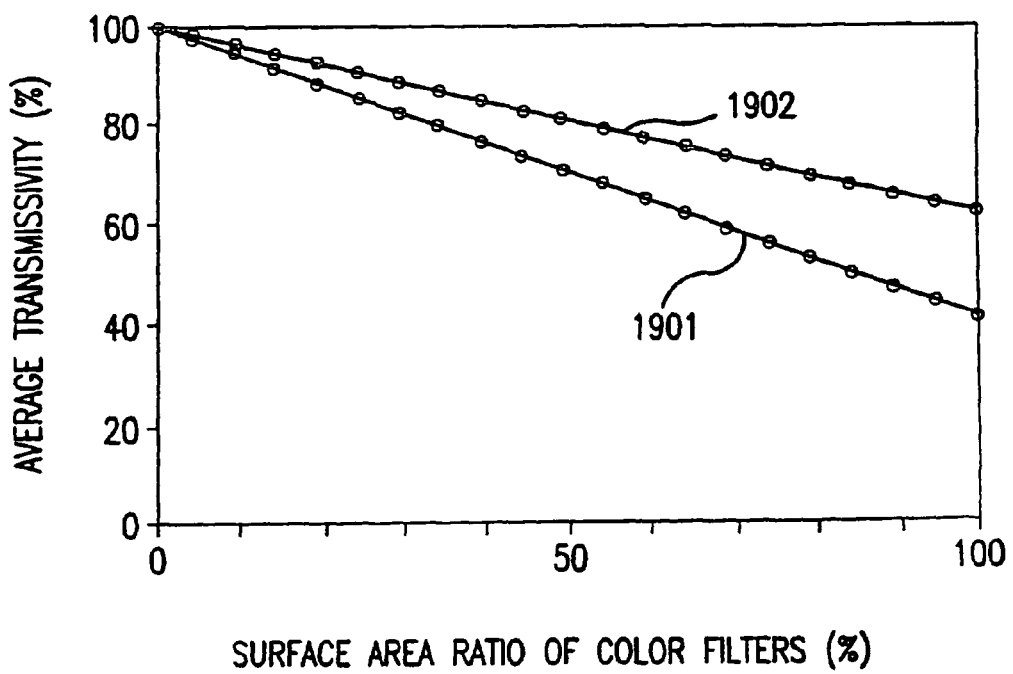
FIG. 19 is a drawing having plotted the change of average transmissivity when having changed the percentage of the area providing the color filters in a reflective type color liquid crystal device in preferred embodiment 12 of the present invention.

FIG. 19 is the results having sought the average transmissivity by variously changing the percentages of the areas providing the color filters within the light-variable area. 1901 is the average transmissivity in dots providing the red filter, and 1902 is the average transmissivity in the dots providing the cyan filter.

When the surface area ratio of the color filters was 100%, that is, when the color filters were provided on the entire face, the displays were dark such that they could not be discriminated unless under direct sunlight outdoors or unless special illumination was performed with such as a spotlight. When the surface area ratio of the color filters was 50% or less, that is, when the average transmissivity of all the color filters was 70% or more, a brightness was obtained being comfortable to use in a comparatively bright room of about 1000 lux brightness, for example, in an environment such as an office desk illuminated by a fluorescent lamp stand. When the surface area ratio of the color filters was 40% or less, that is, when the average transmissivity of all the color filters was 75% or more, a brightness was obtained being sufficient for use even under the ordinary room illumination of about 200 lux. Also, when the surface area ratio of the color filters was 15% or more, that is, when the average transmissivity of all the color filters was 90% or less, a display was possible such that the red and the cyan could be discriminated. When the surface area ratio of the color filters was 25% or more, that is, when the average transmissivity was also 90% or less, a display was possible such that the colors could be recognized clearly. Also, when all the color filters were provided, a high contrast ratio of 1:15 could be obtained.

The color filters used in Preferred Embodiment 12 were completely clear when compared with the color filters used in the ordinary transmissive types. For such color filters, it is desirable that they be provided on 50% or less of the light-variable area, preferably 40% or less, moreover, that they be provided on 15% or more, preferably 25% or more of the area.

Preferred Embodiment 13

Figure 20:
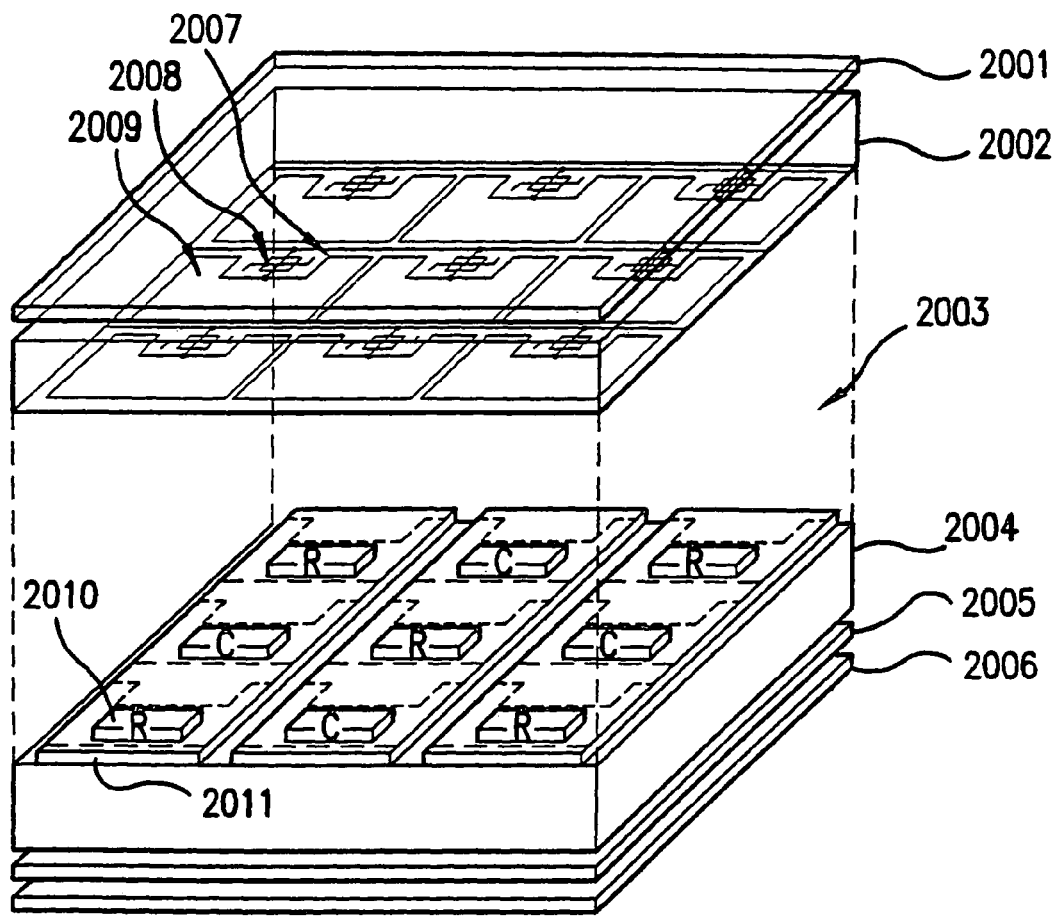
FIG. 20 is a drawing showing the essential components of the structure of a reflective type color liquid crystal device in preferred embodiments 13 and 15 of the present invention.

FIG. 20 is a drawing showing the essential components of the structure of a reflective type color liquid crystal device according to aspects of the present invention. The configuration is explained. 2001 is the upper polarizing plate, 2002 is the element substrate, 2003 is the liquid crystals, 2004 is the opposing substrate, 2005 is the lower polarizing plate, and 2006 is the scattering reflective plate. On the opposing plate 2004 are provided the opposing electrodes (scanning wires) 2011 and the color filters 2010, and on the element substrate 2002 are provided the signal wires 2007, the MIM elements 2008, and the pixel electrodes 2009. Also, the light-variable area in one dot is an area in which a bump-shaped ITO on the element substrate overlaps with a bar-shaped ITO on the opposing substrate, and that outline is shown with a broken line on the ITO of the opposing substrate.

The color filters 1510 are composed of the two colors, red ("R" in the drawing) and cyan ("C" in the drawing), being in a mutually complementary relationship, and they are provided substantially in the middle of the light-variable area. It is desirable that it be arranged such that there are no other color filters in the perimeter of the various color filters. By being arranged in this manner, a display having little color blending is possible. The reason why is that, ordinarily, because there exists a distance of only the thickness of at least the opposing substrate between the color filter layer and the reflective plate, color mixing occurs by the light introduced through the red filter and being emitted through the cyan filter or the reverse, but in the arrangement mentioned above, such a probability is reduced.

Preferred Embodiment 14

Figure 21:
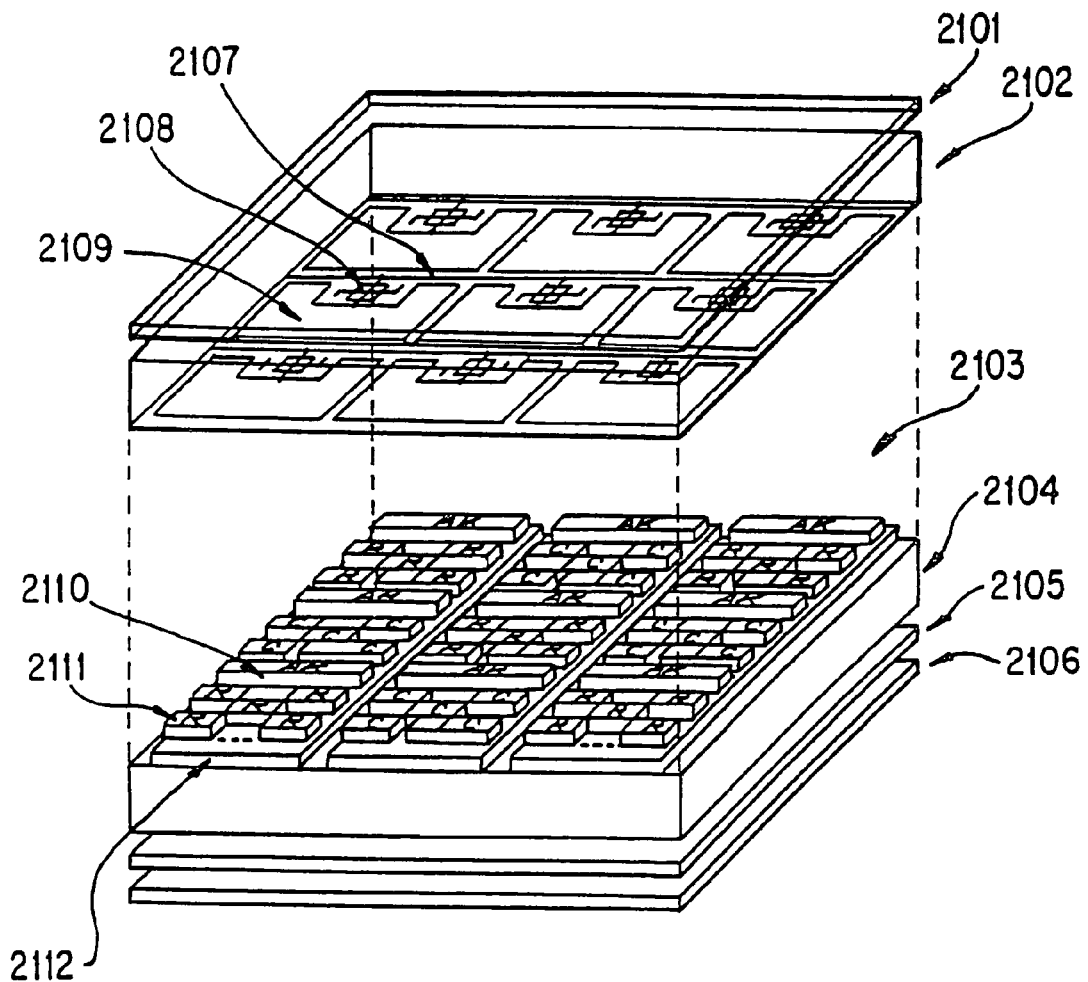
FIG. 21 is a drawing showing the essential components of the structure of a reflective type color liquid crystal device in preferred embodiments 14 and 15 of the present invention.

FIG. 21 is a drawing showing the essential components of the structure of a reflective type color liquid crystal device according to aspects of the present invention. The configuration is explained. 2101 is the upper polarizing plate, 2102 is the element substrate, 2103 is the liquid crystals, 2104 is the opposing substrate, 2105 is the lower polarizing plate, and 2106 is the scattering reflective plate. On the opposing plate 2104 are provided the opposing electrodes (scanning wires) 2112 and the color filters 2111, and on the element substrate 2102 are provided the signal wires 2107, the MIM elements 2108, and the pixel electrodes 2109.

The color filters 2111 are composed of the two colors, red ("R" in the drawing) and cyan ("C" in the drawing), being in a mutually complementary relationship, and they are arranged variously divided in five areas in the middle of the light-variable area forming a checkered shape. If the color filters are provided only on a part of the dots, the parts not having the color filters are white and easy to see, but if they are divided into fine areas in this manner, it has the advantage that the color mixing is good. The number of divisions of course may be two, but the effect is greater when being divided into three or more.

Also, black masks ("BK" in the drawing) are provided in the positions covering the scanning wires. These black masks particularly have the effect of preventing reflection when the opposing substrate 2104 in FIG. 21 is positioned on the upper side and the element substrate 2102 is positioned on the lower side. Also, even if the black dye is not used deliberately, it may be substituted by the red, cyan or their combination.

Preferred Embodiment 15

Preferred Embodiment 15 is a reflective type color liquid crystal device according to aspects of the present invention. However, its structure is identical to the reflective type color liquid crystal device of Preferred Embodiment 12 shown in FIG. 15, the reflective type color liquid crystal device of Preferred Embodiment 13 shown in FIG. 20, and the reflective type color liquid crystal device of Preferred Embodiment 14 shown in FIG. 21.

Its characteristics is in the point that the color filters are provided in the positions between the electrodes and the liquid crystals. Generally, color filters are provided in the positions between the electrodes and the substrate in order to print the voltage effectively on the liquid crystals. However, by arranging them in the manner of the present preferred embodiment, two new effects are obtained. One is the expansion of the visual angle, and another is the improvement of the color purity in the intermediate tones.

Figure 22:
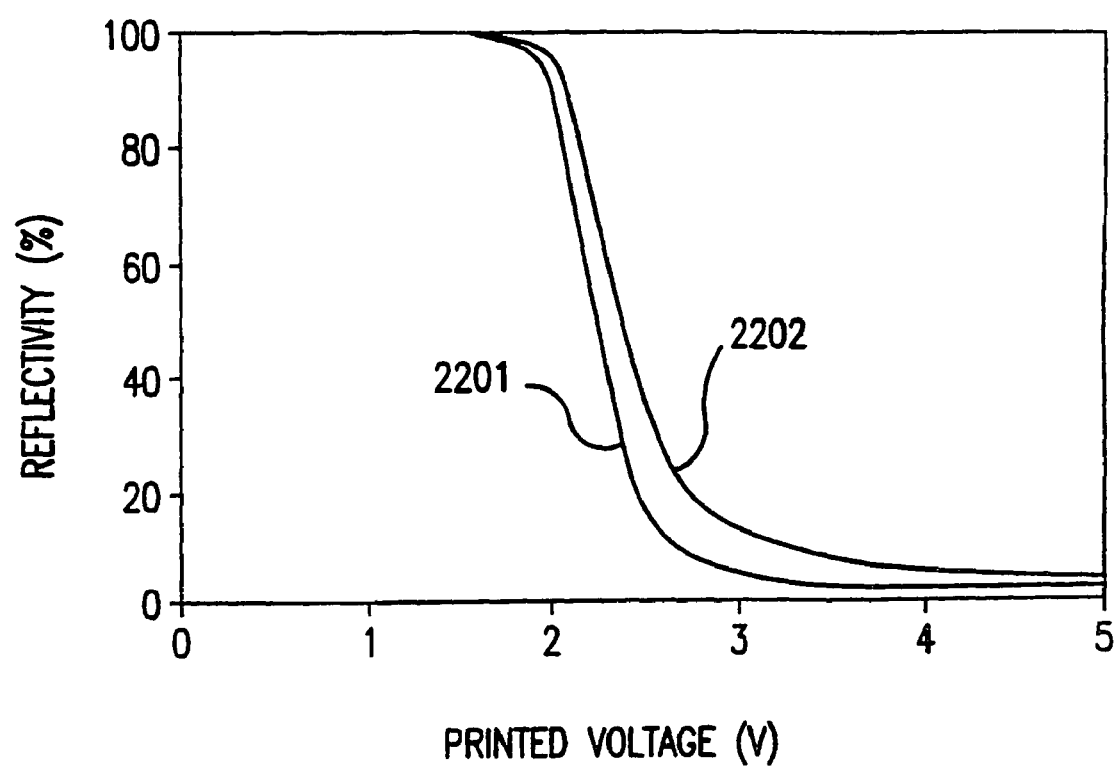
FIG. 22 is a drawing showing the voltage reflectivity properties of the color filters of a reflective type color liquid crystal device in preferred embodiment 15 of the present invention.

FIG. 22 is a drawing showing the voltage reflectivity properties of the reflective type color liquid crystal device in Preferred Embodiment 15 of the present invention. The horizontal axis is the voltage effectively printed on the liquid crystals, and the vertical axis is the reference reflectivity set to 100% when the voltage is not printed. 2201 is the properties of the areas not having color filters within the light-variable areas, and 2202 is the properties of the areas having the color filters. Because of the voltage effect due to the division of capacity, the sharpness of 2202 is worse in the voltage reflectivity properties than 2201. In other words, it is harder for the voltage to be printed on the liquid crystals when the areas having the color filters are compared with the areas not having them. Because two areas exist within a single pixel, having different voltage-spending conditions in this manner, the visual angle properties are improved by the effect (generally called the "halftone effect") disclosed in the publication of Japanese Laid-Open Patent No. 2-12 and the publication of Japanese Laid-Open Patent No. 4-348323. Also, because the areas having the color filters always have a higher reflectivity in the intermediate tone display state, there is also the effect of the colors being displayed richer.

Preferred Embodiment 16

Figure 23A:
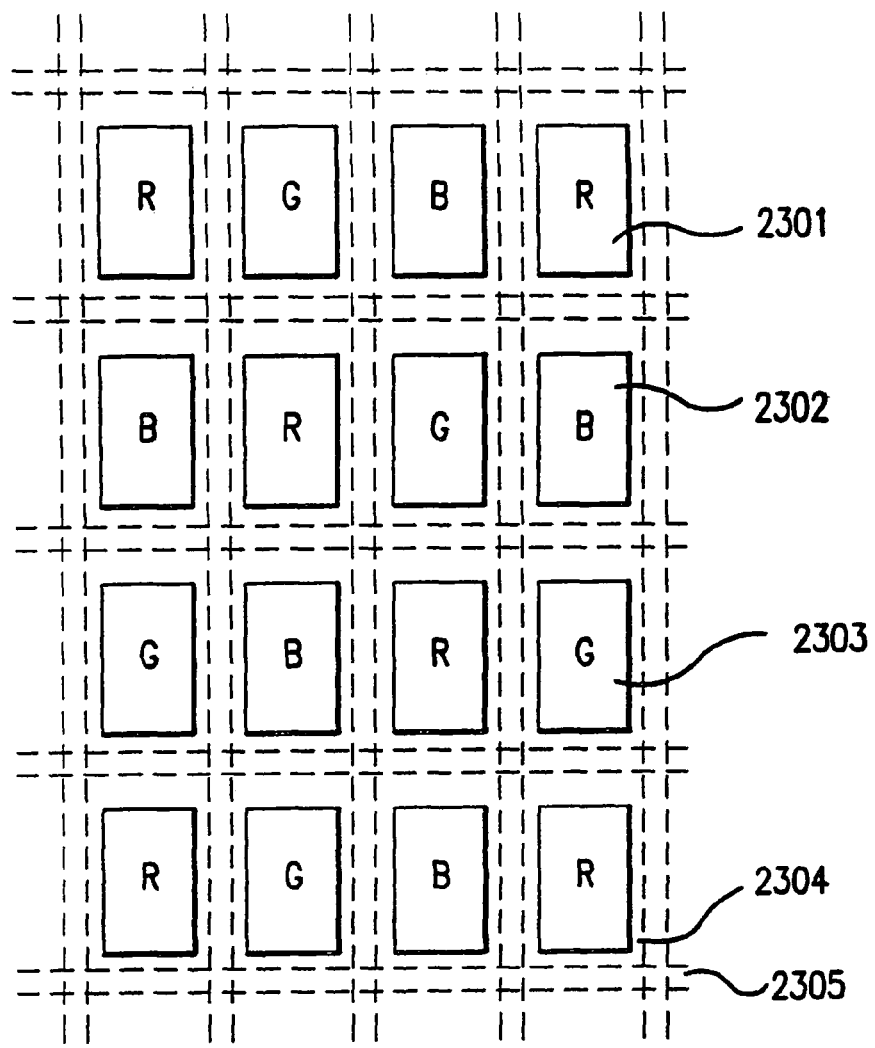
FIG. 23 is a drawing showing the essential components of the structure of the color filter substrate of a reflective type color liquid crystal device in preferred embodiment 16 of the present invention.
Figure 23B:
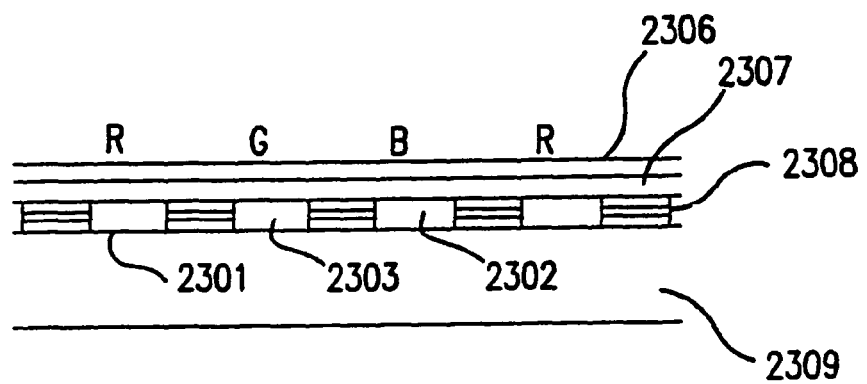

FIG. 23 is a drawing showing the structure of the color filter substrate of a reflective type color liquid crystal device according to aspects of the present invention, (a) is a frontal view, and (b) is a cross section. First, the configuration is explained. The rectangular area 2304 surrounded by the broken line of (a) shows one dot. 2309 is the glass substrate, 2301 is the red filter, 2303 is the green filter, 2302 is the blue filter, 2305 is the gap between dots, the hatched area 2308 is acryl, 2307 is a protective film, and 2306 is a transparent ITO electrode.

Figure 25:
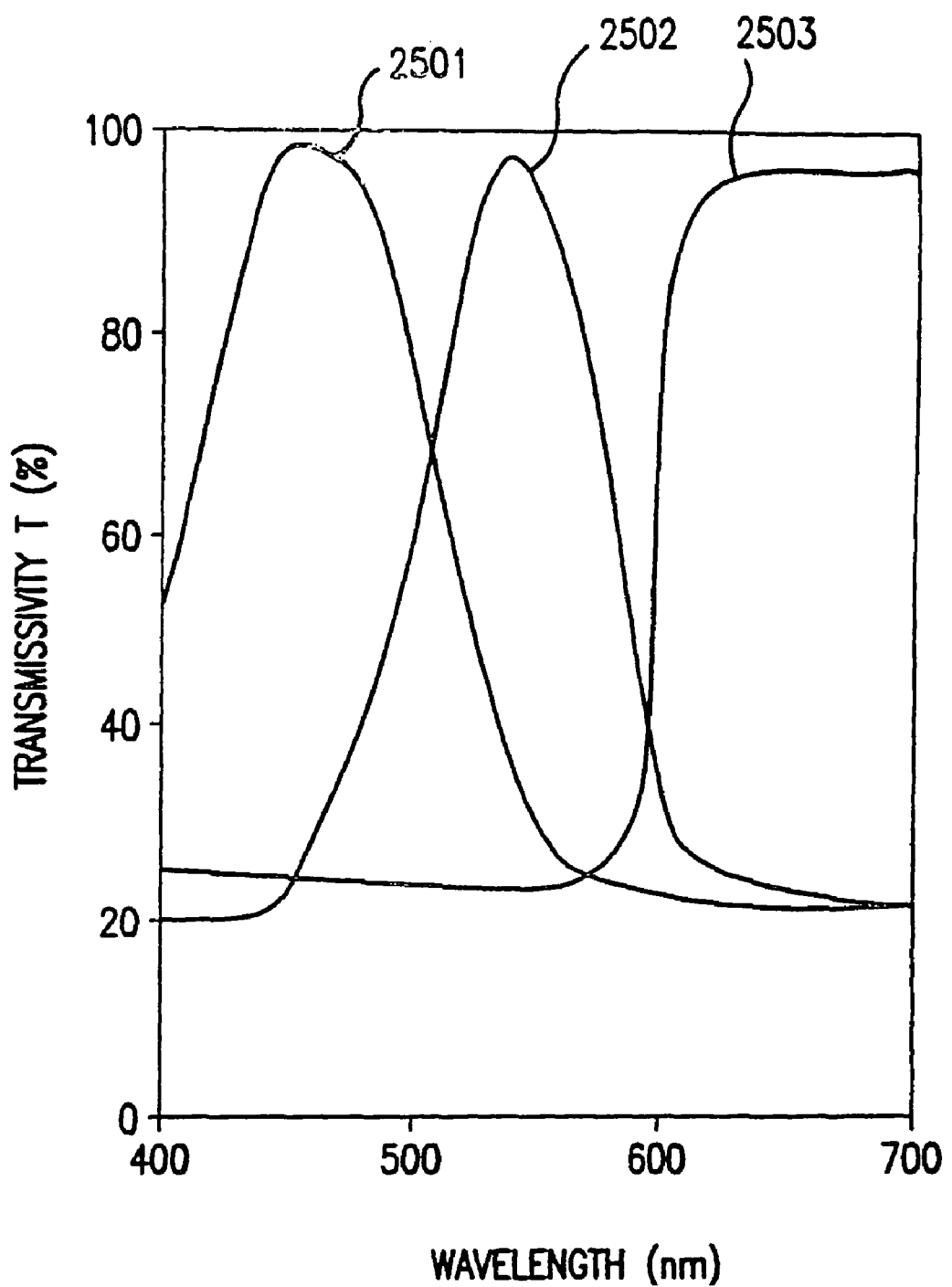
FIG. 25 is a drawing showing the spectral properties of the color filters of a reflective type color liquid crystal device in preferred embodiment 16 of the present invention.
Figure 26:
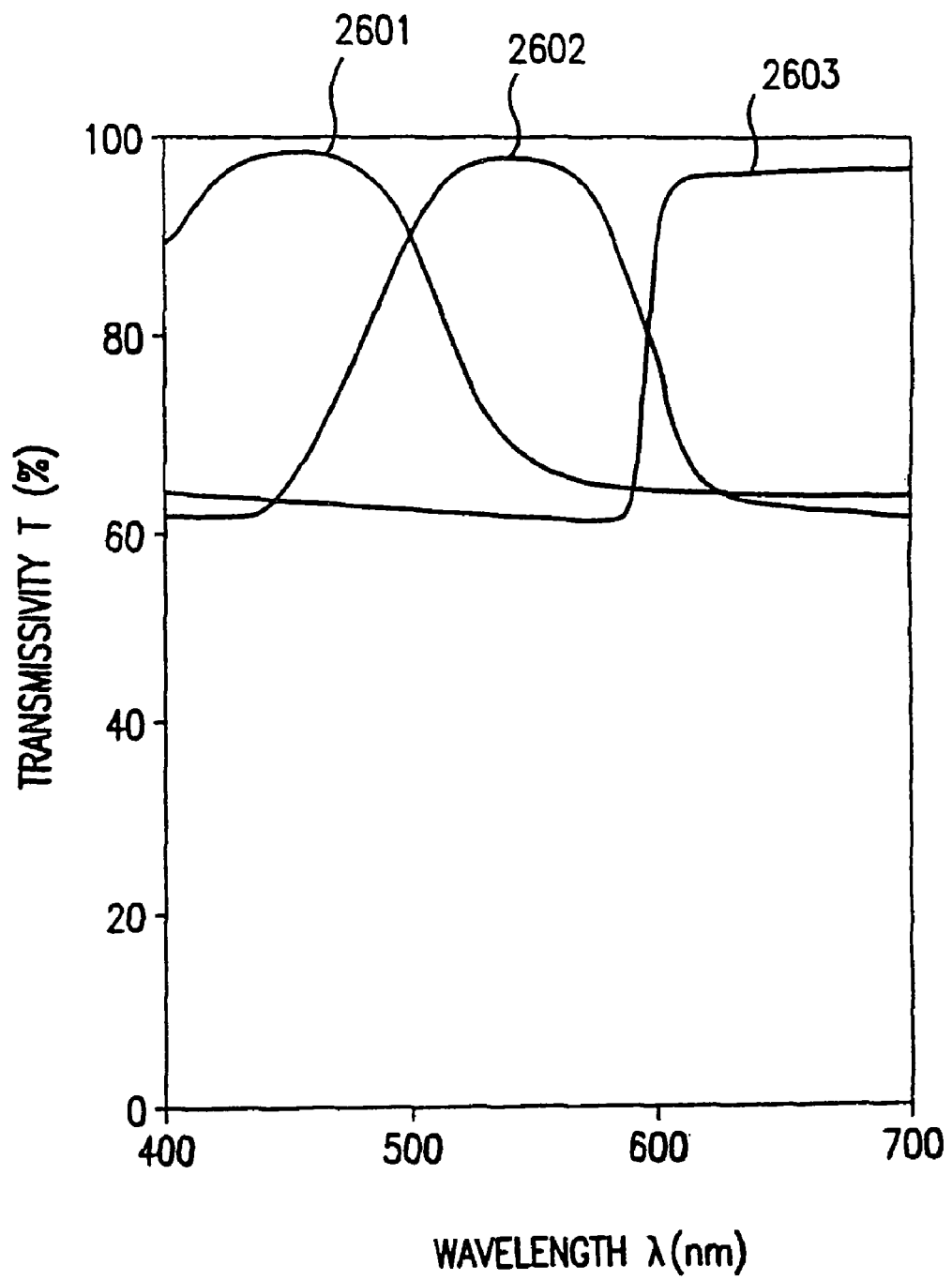
FIG. 26 is drawing showing the average spectral properties in one dot of the color filters of a reflective type color liquid crystal device in preferred embodiments 16 and 17 of the present invention.

The spectral properties of the color filters used here are shown in FIG. 25. The horizontal axis of FIG. 25 is the light wavelength, the vertical axis is the transmissivity, 2501 shows the spectrum of the blue filter, 2502 shows the spectrum of the green filter, and 2503 shows the spectrum of the red filter. However, these are the properties when the area formed by the color filters is 100%. A color filter showing such spectral properties is formed on 50% of the proportion of the area within one dot 2304 of FIG. 23. Thus, the spectral properties shown in FIG. 26 were obtained, being the average within one dot. The horizontal axis of FIG. 26 is the light wavelength, the vertical axis is the transmissivity, 2601 shows the spectrum of the blue filter, 2602 shows the spectrum of the green filter, and 2603 shows the spectrum of the red filter.

Furthermore, the portions not formed by the color filters of FIG. 23 have formed acryl 2308 at the same thickness as the color filters. The thickness of the color filters 2301, 2302, 2303, and the acryl 2308 at this time is about 0.2 µm for each. Also, without forming a light-blocking film (black stripe) as usually formed by transmissive type color liquid crystal devices in the space between the dots, a transparent acryl layer 2308 was formed also in the gap 2305 between the dots. Furthermore, a liquid crystal device was composed by forming sequentially on these a protective film 2307, an ITO electrode 2306, and an orientation film (not illustrated) for orienting the liquid crystals, and combining them with a MIM (metal-insulator-metal) active matrix substrate. The TN mode was selected for the liquid crystal mode at this time.

Figure 24:
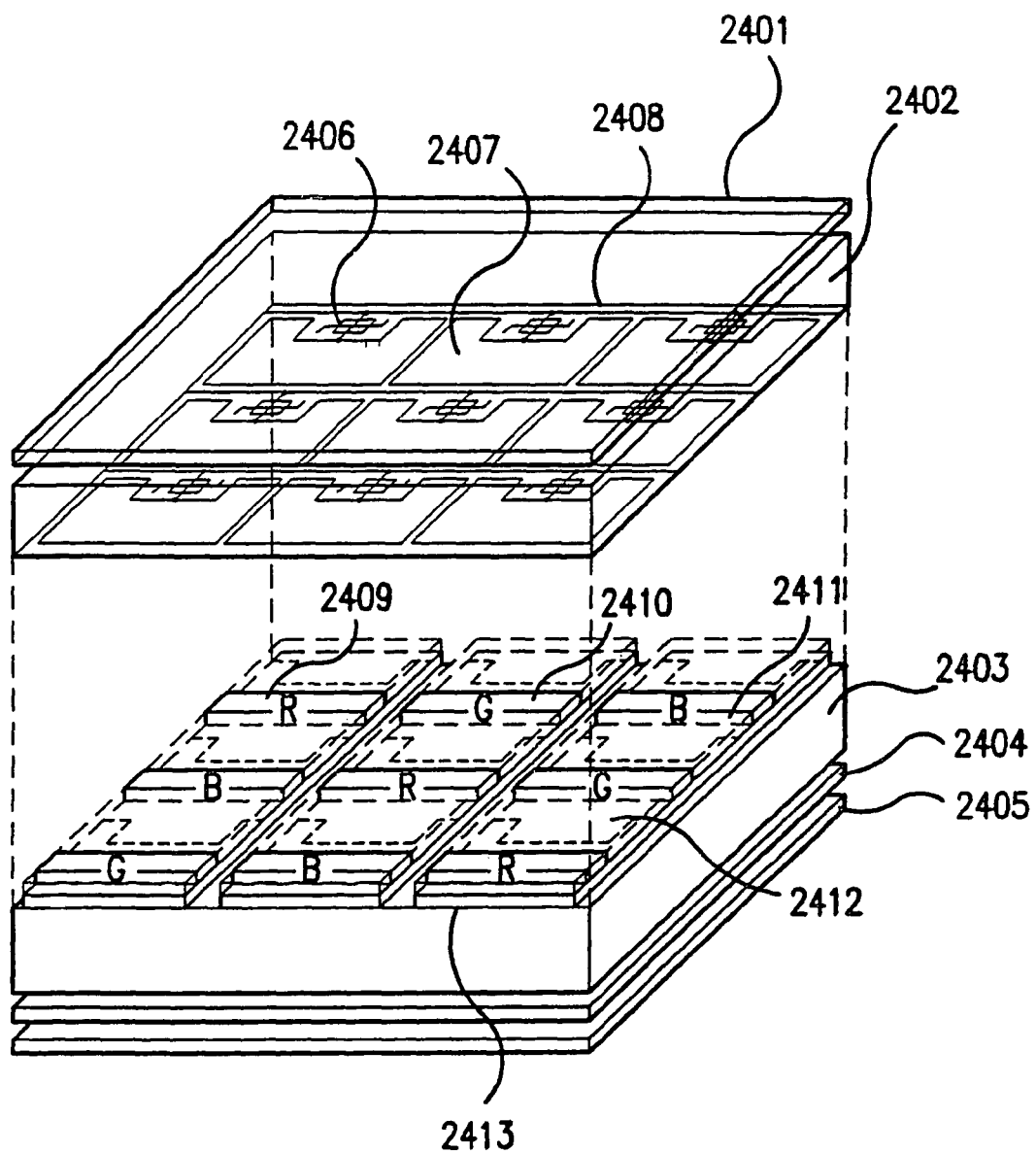
FIG. 24 is a drawing showing the essential components of the structure of a reflective type color liquid crystal device in preferred embodiment 16 of the present invention.

FIG. 24 is a drawing showing the essential components of the structure of a reflective type color liquid crystal device in Preferred Embodiment 16. 2402 is the element substrate, 2403 is the opposing substrate, 2406 is the MIM element, 2407 is the display electrode of one dot, 2408 is the scanning wire, 2401 is the upper polarizing plate, 2409 is the partially formed red filter, 2410 is the partially formed green filter, 2411 is the partially formed blue filter, 2413 is the signal electrode, 2404 is the lower polarizing plate, and 2405 is an aluminum reflective plate.

Figure 27A:
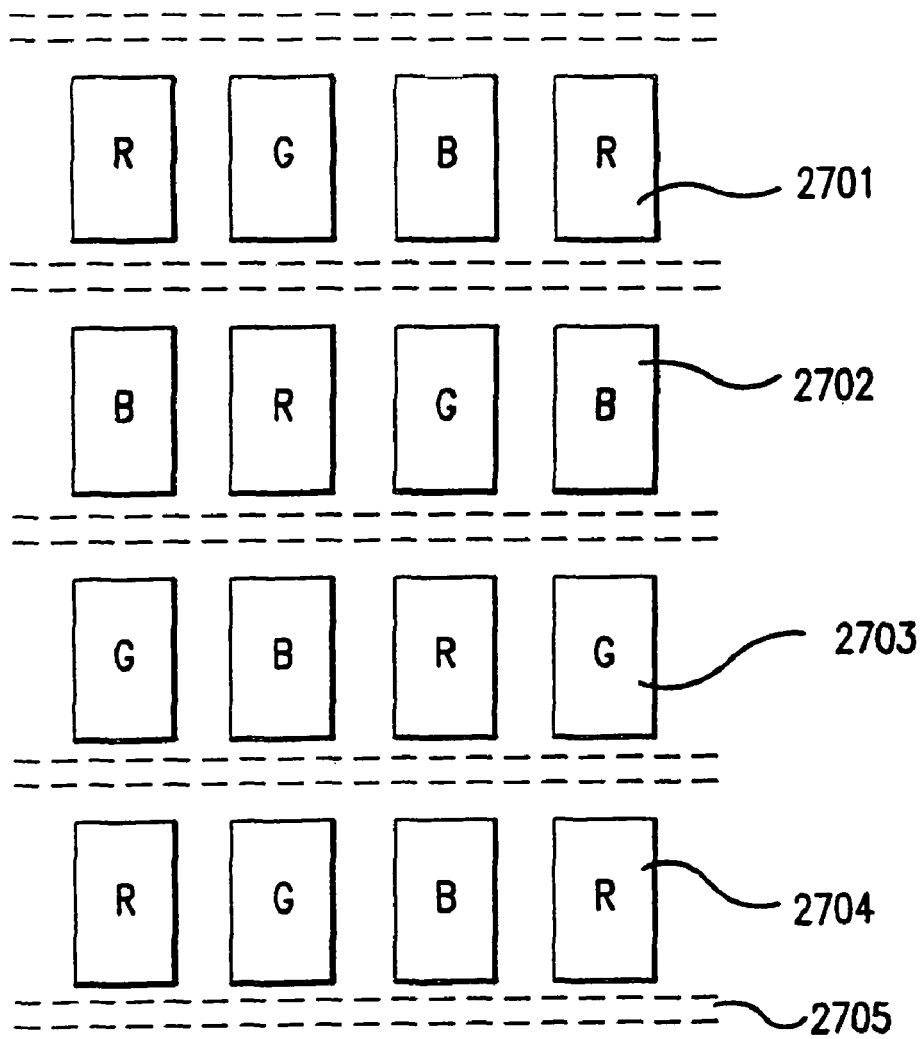
FIG. 27 is a drawing showing the structure of the color filter substrate of a reflective type color liquid crystal device in the comparative example mentioned in preferred embodiment 16 of the present invention.
Figure 27B:
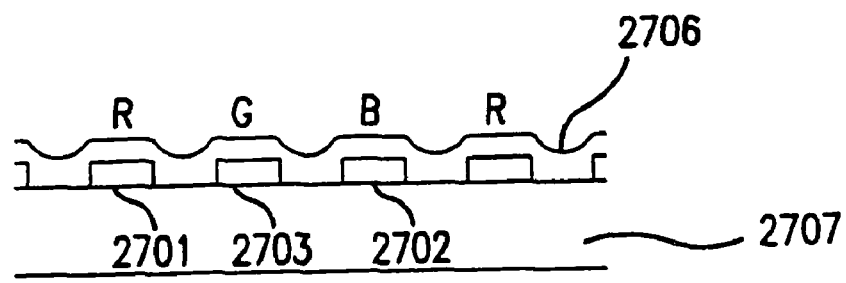

A reflective type color liquid crystal device using a substrate haring formed color filters only on 50% of the proportion of the area within one dot had the liquid crystal orientation become confused by the difference of levels of the portions formed with color filters and the portions not formed with color filters, and the contrast was 1:8. As opposed to this, a reflective type color liquid crystal device using a substrate having formed acryl at the same thickness as the color filters on the portions not formed with color filters did not have the orientation of the liquid crystals become confused, and a high-image-quality display was possible. The contrast at this time was 1:20. The color filter configuration when not forming a transparent acryl layer on the portions not formed with color filters is shown in FIG. 27. (a) is a frontal view, and (b) is a cross section. 2707 is the glass substrate, 2701 is the partially formed red filter, 2703 is the partially formed green filter, 2702 is the partially formed blue filter, 2706 is a protective film, 2704 is one dot, and 2705 is the gap between the pixels. As is clear from the cross section of (b), there exists an irregularity on the surface of the color filters, and by such a surface condition is confused the liquid crystal orientation.

In the present preferred embodiment, the color filter substrate of the present invention was combined with a MIM substrate, but a TFT substrate and a TFD (thin film diode) also may be used. Also, in the present preferred embodiment was described about an active matrix reflective type color liquid crystal device, but the present invention also may be applied to a simple matrix reflective type color liquid crystal device. When the surface irregularity of the substrate greatly influences the liquid crystal orientation as in the STN mode, the present invention is further effective. Also, in the present preferred embodiment, a "mosaic arrangement" was selected for the color filter arrangement, but "triangle arrangements" and "stripe arrangements" also may be used as in p. 321 of Latest Liquid Crystal Process Technology '93 (Puresu Janaruy).

Preferred Embodiment 17

Figure 28A:
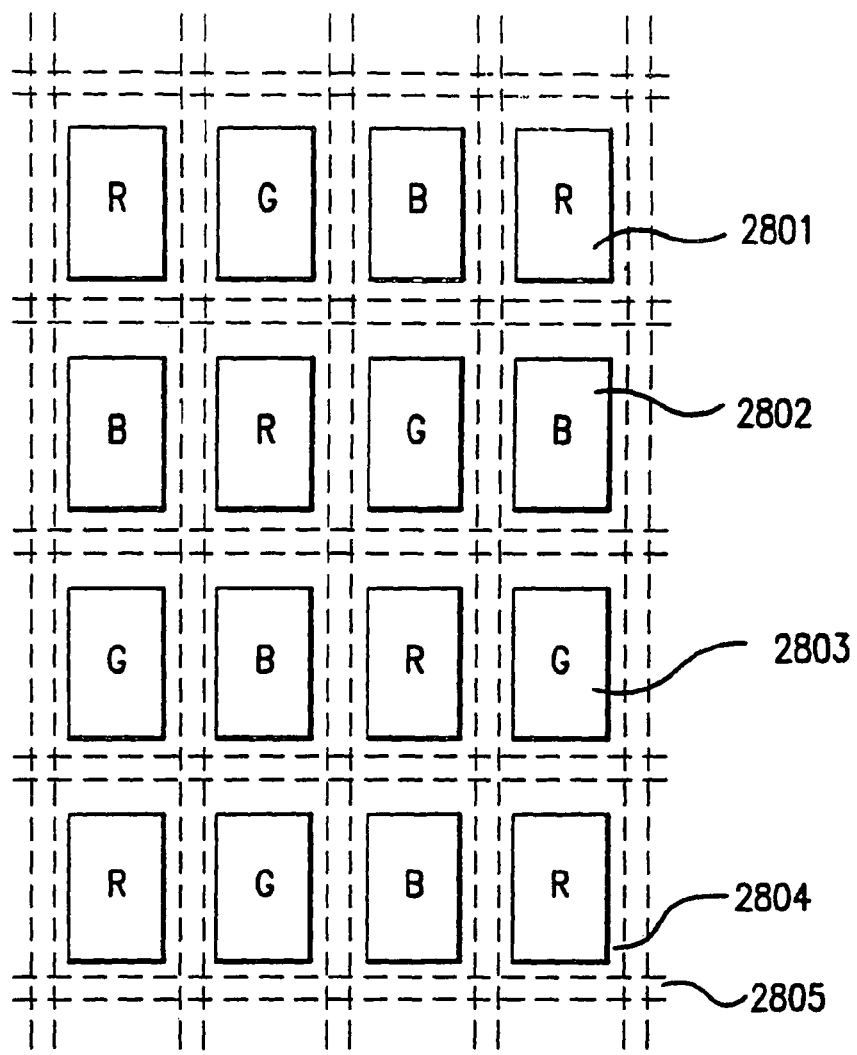
FIG. 28 is a drawing showing the essential components of the structure of the color filter substrate of a reflective type color liquid crystal device in preferred embodiment 17 of the present invention.
Figure 28B:
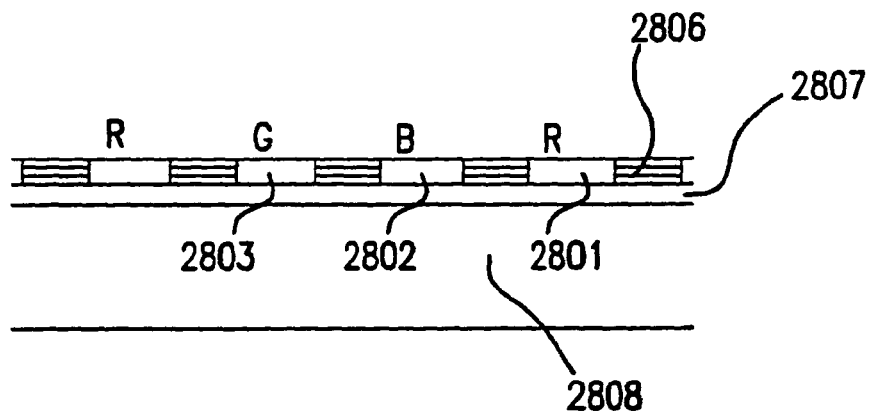

FIG. 28 is a drawing showing the structure of the color filters of a reflective type color liquid crystal device according to aspects of the present invention. (a) is a frontal view, and (b) is a cross section. First, the configuration is explained. The rectangular area 2804 surrounded by the broken line of (a) shows one dot. 2808 is the glass substrate, 2807 is the ITO electrode, 2801 is the red color filter, 2803 is the green color filter, 2802 is the blue color filter, and the hatched area 2806 is acryl.

Figure 29:
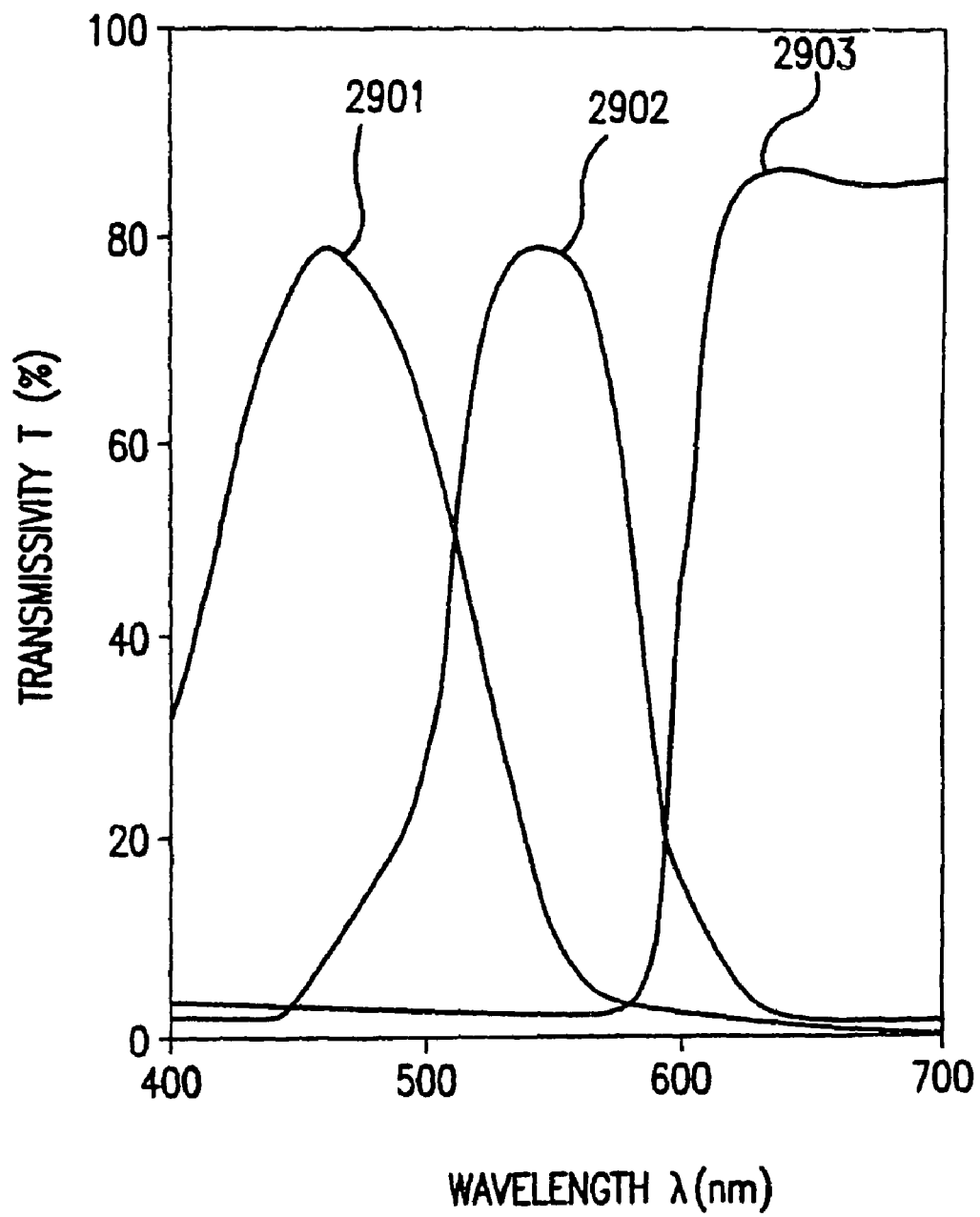
FIG. 29 is a drawing showing the spectral properties of the color filters of a reflective type color liquid crystal device in preferred embodiment 17 of the present invention.

The spectral properties of the color filters used here are shown in FIG. 29. The horizontal axis of FIG. 29 is the light wavelength, the vertical axis is the transmissivity, 2901 shows the spectrum of the blue filter, 2902 shows the spectrum of the green filter, and 2903 shows the spectrum of the red filter. However, these are the properties when the area formed by the color filters is 100%. A color filter showing such spectral properties is formed on 30% of the proportion of the area within one dot of FIG. 28. Thus, the spectral properties shown in FIG. 26 were obtained, being the average within one dot.

Furthermore, the portions not formed by the color filters of FIG. 28 have formed acryl 2807 at the same thickness as the color filters. The thickness of the color filters and the acryl at this time is about 0.8 µm for each, and, without forming a light-blocking film (black stripe) as usually formed by transmissive type color liquid crystal devices in the space between the dots, a transparent acryl layer 2807 was formed also in the gap between the dots. Furthermore, a liquid crystal device was composed by forming an orientation film for orienting the liquid crystals, and combining it with a TFT substrate. The TN mode was selected for the liquid crystal mode at this time, polarizing plates were affixed variously to the outsides of the glass substrate, and a silver reflective plate was further placed on the opposite side of the observed side.

A reflective type color liquid crystal device using a substrate having formed color filters only on 30% of the proportion of the area within one dot had the liquid crystal orientation become confused by the difference of levels of the portions formed with color filters and the portions not formed with color filters, and the contrast was 1:5. As opposed to this, a reflective type color liquid crystal device using a substrate having formed acryl at the same thickness as the color filters on the portions not formed with color filters did not have the orientation of the liquid crystals become confused, and a high-image-quality display was possible. The contrast at this time was 1:18.

In the present preferred embodiment, the color filter substrate of the present invention was combined with a TFT substrate, but an MIM substrate and a TFD substrate also may be used. Also, in the present preferred embodiment was described about an active matrix reflective type color liquid crystal device, but the present invention also may be applied to a simple matrix reflective type color liquid crystal device. When the surface irregularity of the substrate greatly influences the liquid crystal orientation as in the STN mode, the present invention is further effective.

Figure 30:
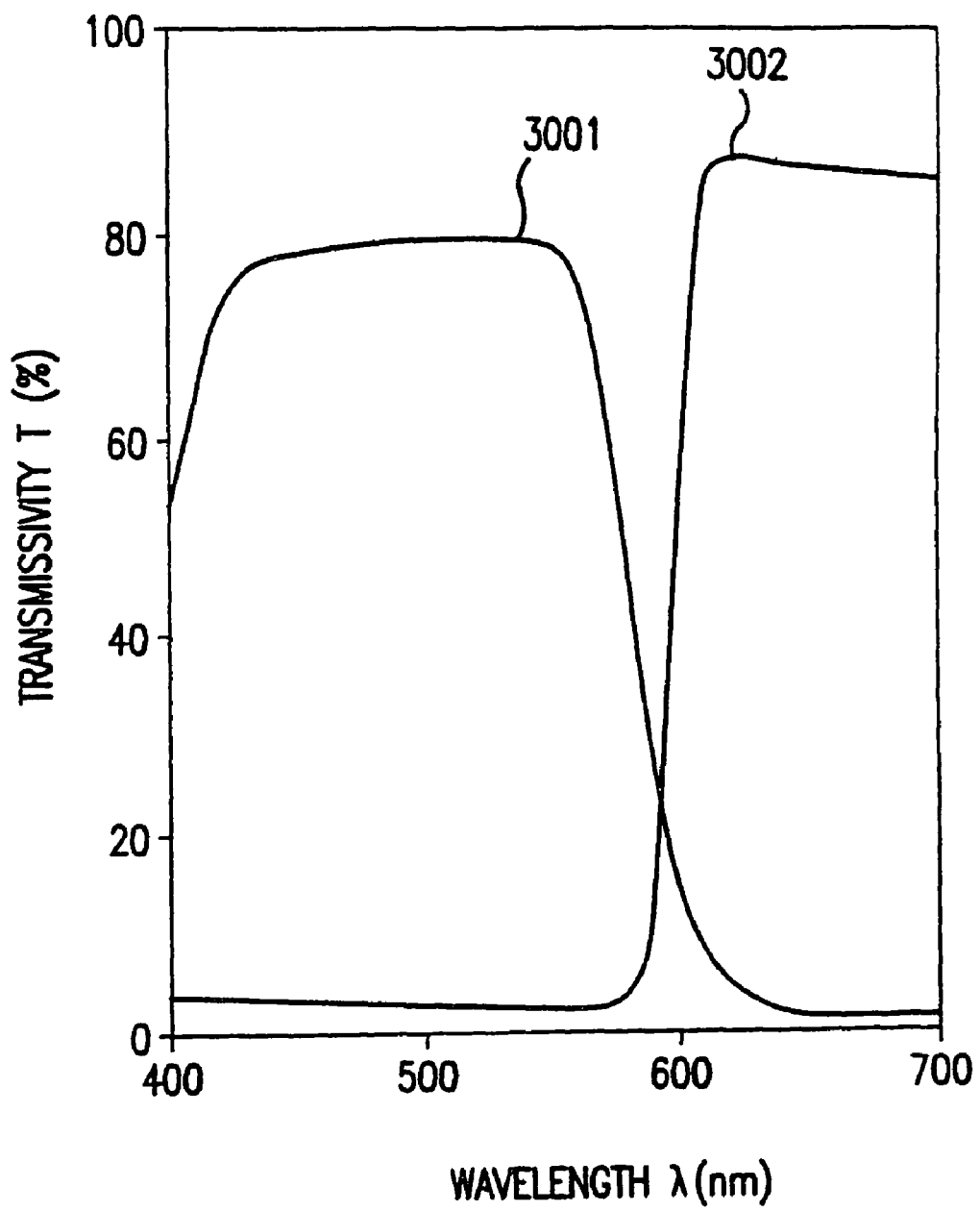
FIG. 30 is a drawing showing the spectral properties of the color filters of a reflective type color liquid crystal device in preferred embodiment 17 of the present invention.
Figure 31:
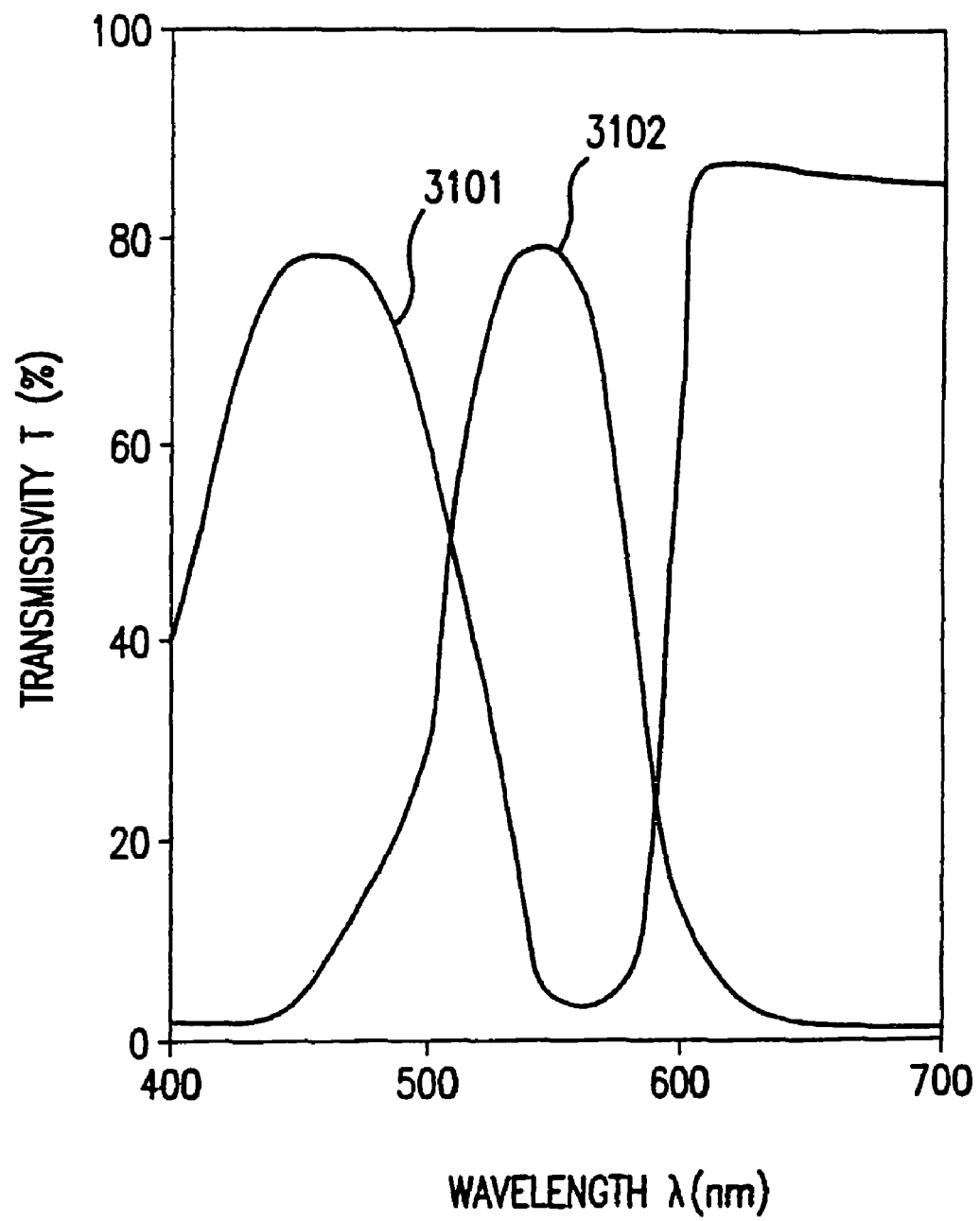
FIG. 31 is a drawing showing the spectral properties of the color filters of a reflective type color liquid crystal device in preferred embodiment 17 of the present invention.
Figure 32A:
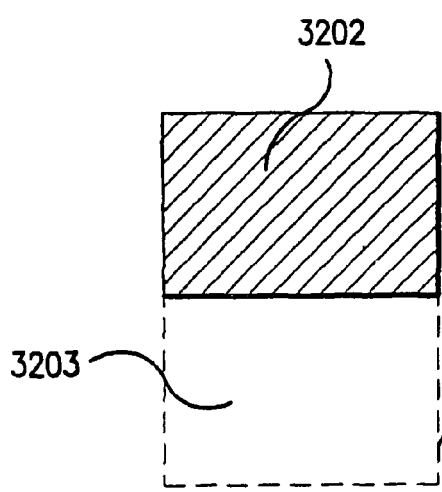
FIG. 32 is a drawing showing the placement of the color filters of a reflective type color liquid crystal device in preferred embodiment 18 of the present invention.
Figure 32B:
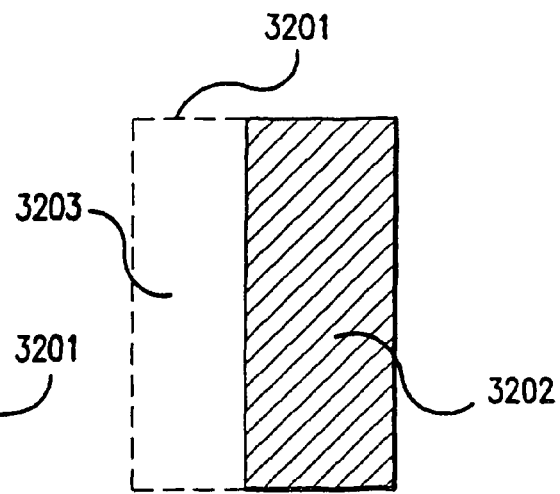
Figure 32C:
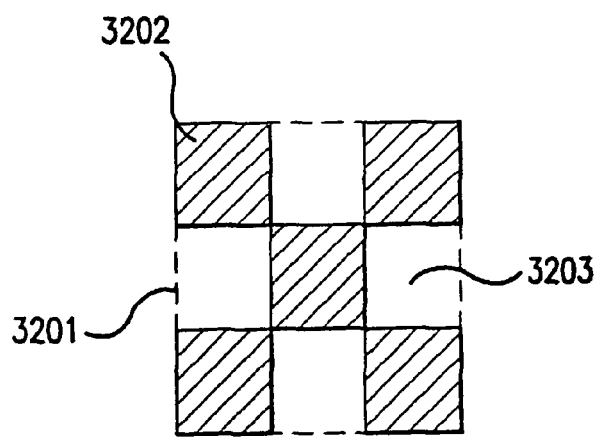
Figure 32D:
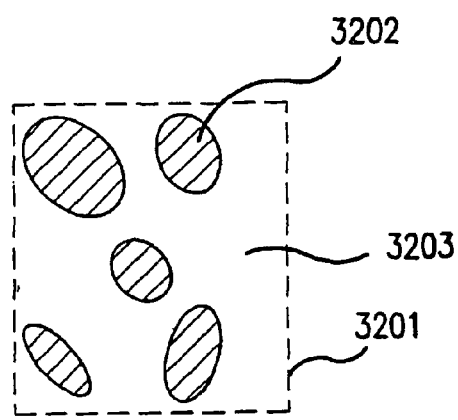

In Preferred Embodiment 16 and Preferred Embodiment 17, the three colors, RGB, were used for the color filters, but two colors of color filters being in a mutually complementary relationship may be used, such as the cyan 3001 and red 3002 shown in FIG. 30, the magenta 3101 and green 3102 shown in FIG. 31, or yellow and blue.

Preferred Embodiment 18

In Preferred Embodiment 16 and Preferred Embodiment 17, the color filters were partially formed substantially in the middle of one dot, but they also may be formed in the positions as shown in FIGS. 32 (*a*) and (*b*). (a) shows the area 3202, being the upper or lower half of the one dot 3201 having formed color filters, and the area 3203, being the remaining half not having formed color filters. (b) shows the area 3202, being the right or left half of the one dot 3201 having formed color filters, and the area 3203, being the remaining half not having formed color filters. Also, as shown in FIGS. 32 (*c*) and (*d*), the one dot 3201 also may be divided into two or more, and one part may be made as the area 3202 having formed the color filters, and the remainder may be made as the area 3203 not having formed color filters. Even using color filters in the various patterns as such, high-image-quality reflective type color liquid crystal devices still could be realized.

Preferred Embodiment 19

Table 1 shows the change in properties when having changed the difference of levels of the reflective layer and the color filters in Preferred Embodiment. As the difference of levels becomes smaller, the image quality/contrast go up together. If the difference in levels is 0.5 µm, a contrast of 1:10 or more can be obtained, and if it further becomes 0.1 µm, a contrast of 1:15 can be obtained.

Preferred Embodiment 20

In Preferred Embodiment 16 and Preferred Embodiment 17, acryl was used in the transparent layer filling the difference in levels between the parts formed and not formed with color filters, but high-image-quality reflective type color liquid crystal devices could be realized also by using polyimide. Also, high-image-quality reflective type color liquid crystal devices could be realized also by using polyvinyl alcohol in the transparent layer in the same manner. These results are shown in Table 2. Compared with the case not having a transparent layer, both the image quality and the contrast are improved.

In Preferred Embodiment 16 and Preferred Embodiment 17, aluminum reflective plates and silver reflective plates were used, being common for reflective plates, but the holographic reflective plates published by A. G. Chen, et al. (SID '95 Digest, pp. 176-179) also may be used.

Preferred Embodiment 21

Figure 33:
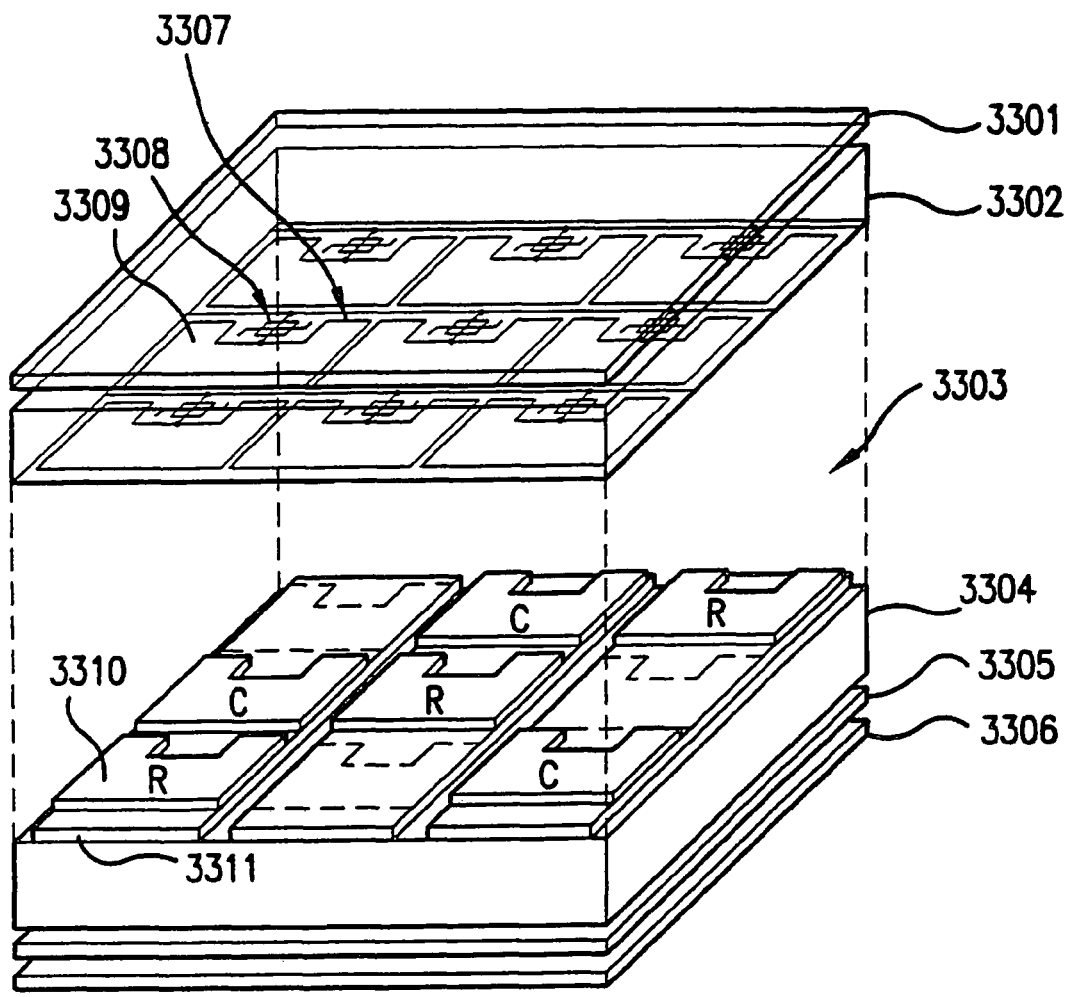
FIG. 33 is a drawing showing the essential components of the structure of a reflective type color liquid crystal device in preferred embodiment 21 of the present invention.

FIG. 33 is a drawing showing the essential components of the structure of a reflective type color liquid crystal device according to aspects of the present invention. The configuration is explained. 3301 is the upper polarizing plate, 3302 is the element substrate, 3303 is the liquid crystals, 3304 is the opposing substrate, 3305 is the lower polarizing plate, and 3306 is the scattering reflective plate. On the opposing substrate 3304 are provided the opposing electrodes (scanning wires) 3311 and the color filters 3310, and on the element substrate 3302 are provided the signal wires 3307, the MIM elements 3308, and the pixel electrodes 3309.

The color filters 3310 are composed of the two colors, red ("R" in the drawing) and cyan ("C" in the drawing), being in a mutually complementary relationship, but on part of the dots there are not provided color filters. The color filters used here are the same as Preferred Embodiment 1, and their spectral properties are shown in FIG. 16.

Figures 34A, 34B, 34C, 34D:
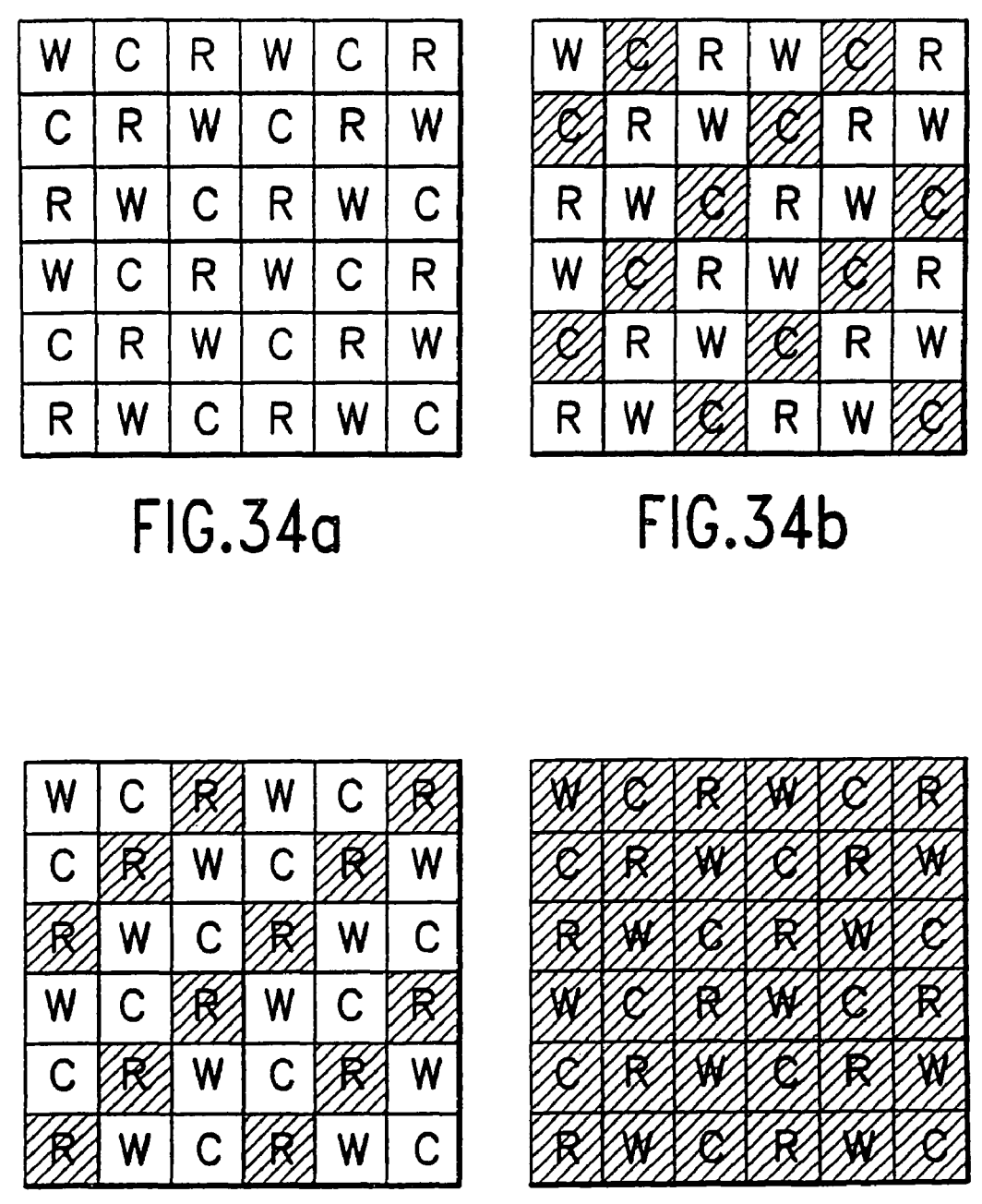

FIG. 34 is a drawing showing the orientation of the color filters in the form viewing FIG. 33 from above. "R" in the drawing shows a dot having a red filter, "C" shows a dot having a cyan filter, and "W" shows a dot having no color filter. On ⅓ of the entirety of dots was provided red filters, on ⅓ of the dots was provided cyan filters, and on the remaining ⅓ of the dots was provided no filters. Also, FIGS. 34 (*a*), (*b*), (*c*), and (*d*) show the distribution of the on dots and off dots when having displayed variously white, red, cyan, and black. The dots having hatching applied are the on dots, that is, the dark state, and the dots not having the hatching applied are the off dots, that is, the bright state. When performing display in this manner, because the color display is performed with ⅔ of the entirety of the dots, a display brighter than usual becomes possible. Also, even when displaying intermediate tones with a color display, if the brightness is adjusted mainly by the dots not having color filters, it has the merit of always being able to display brilliant colors. For example, when displaying dark red, half of the dots having color filters can be turned on with all the dots having red filters turned off and the dots having cyan filters turned on.

Figures 35A, 35B, 35C, 35D:
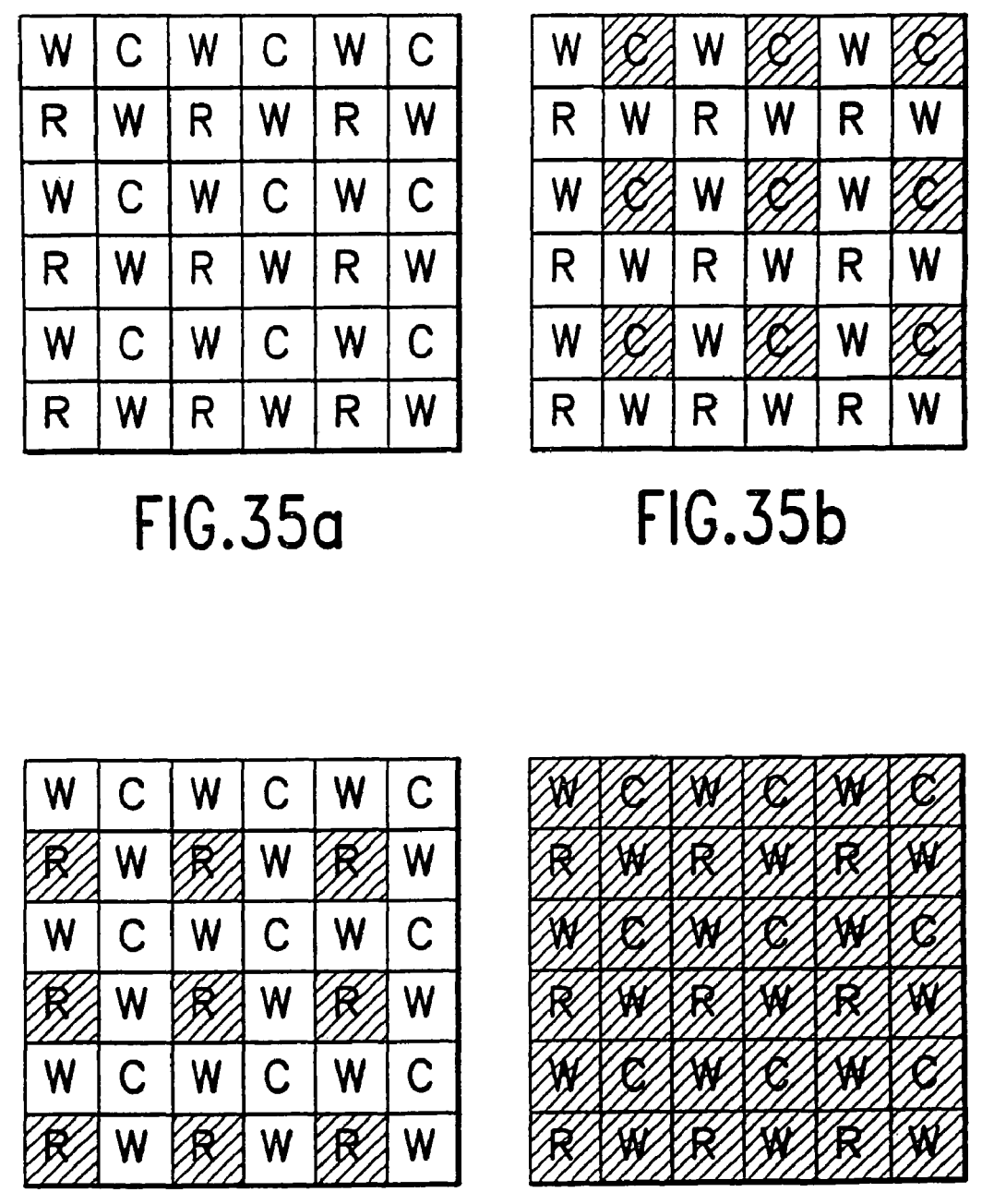

Another color filter placement is shown in FIG. 35. On ¼ of the entirety of the dots were placed the red filters, on ¼ of the dots were placed the cyan filters, and on the remaining ½ of the dots were not placed color filters. Also, FIGS. 35 (*a*), (*b*), (*c*), and (*d*) show the distribution of the on dots and off dots when displaying variously white, red, cyan, and black. When performing such displays, because the color display is performed with ¾ of the entirety of the dots, a display even brighter than the color filter placement of FIG. 35 is possible.

Figures 36A, 36B, 36C, 36D:
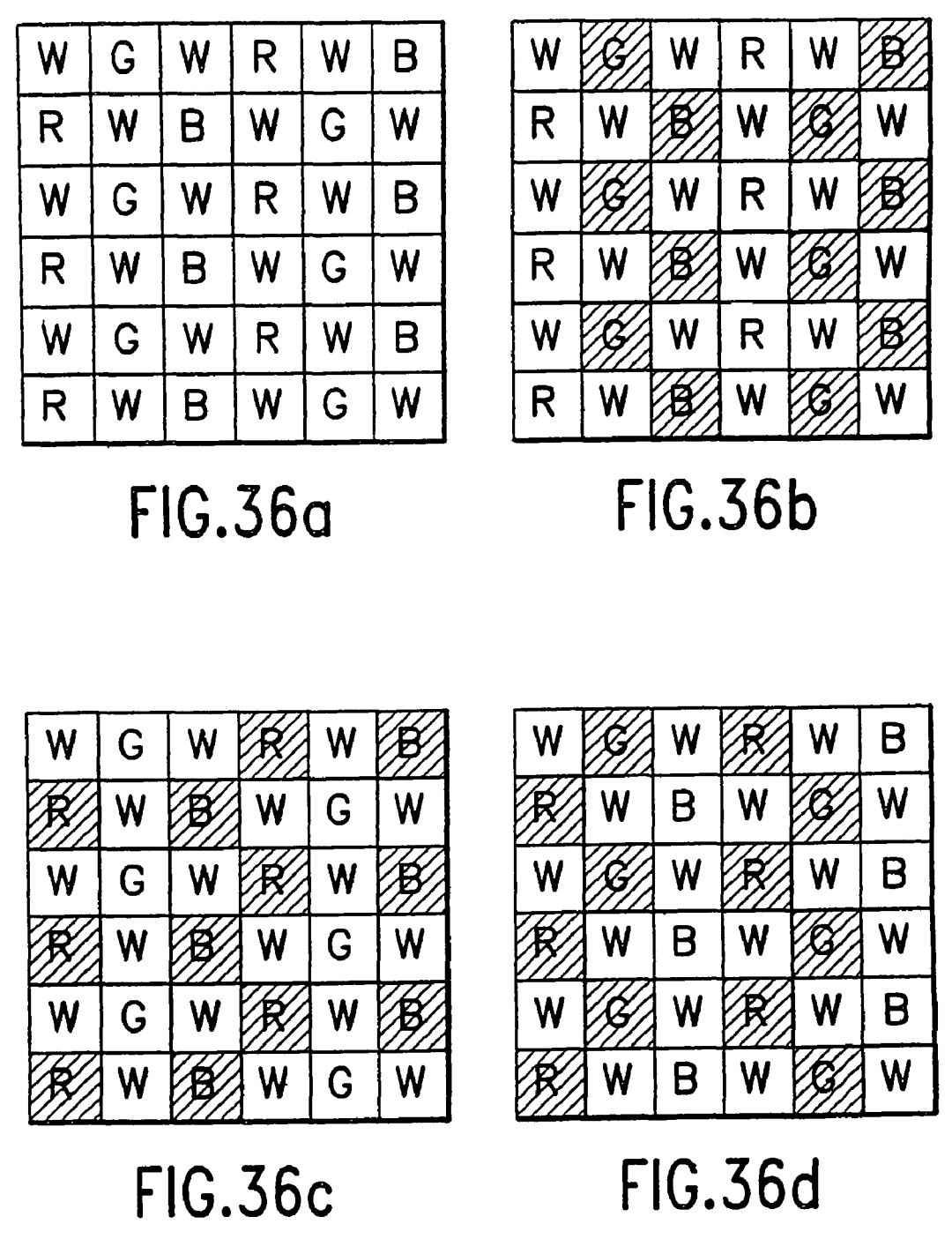

As another example, the placement when using three colors of filters, red, green, and blue, is shown in FIG. 36. The "R" in the drawing shows the dots having red filters, "G" shows the dots having green filters, "B" shows the dots having blue filters, and "W" shows the dots not having color filters. On ⅙ of the entirety of the dots were provided the red filters, on ⅙ of the dots were provided the green filters, on ⅙ of the dots were provided the blue filters, and on the remaining ½ of the dots were not provided color filters. Also, FIGS. 36 (*a*), (*b*), (*c*), and (*d*) show the distribution of the on dots and off dots when displaying variously white, red, green, and blue. When performing such displays, because the color display is performed with ⅘ of the entirety of the dots, a bright display is possible.

Also, a configuration is possible in which the red filters are provided on ⅙ of the entirety of the dots, the green filters are provided on ⅙ of the dots, the blue filters are provided on ⅙ of the dots, and no filters are provided on ½ of the dots. When performing such displays, because the color display is performed with ½ of the entirety of the dots, a bright display is possible.

Preferred Embodiment 22

Figure 37A:
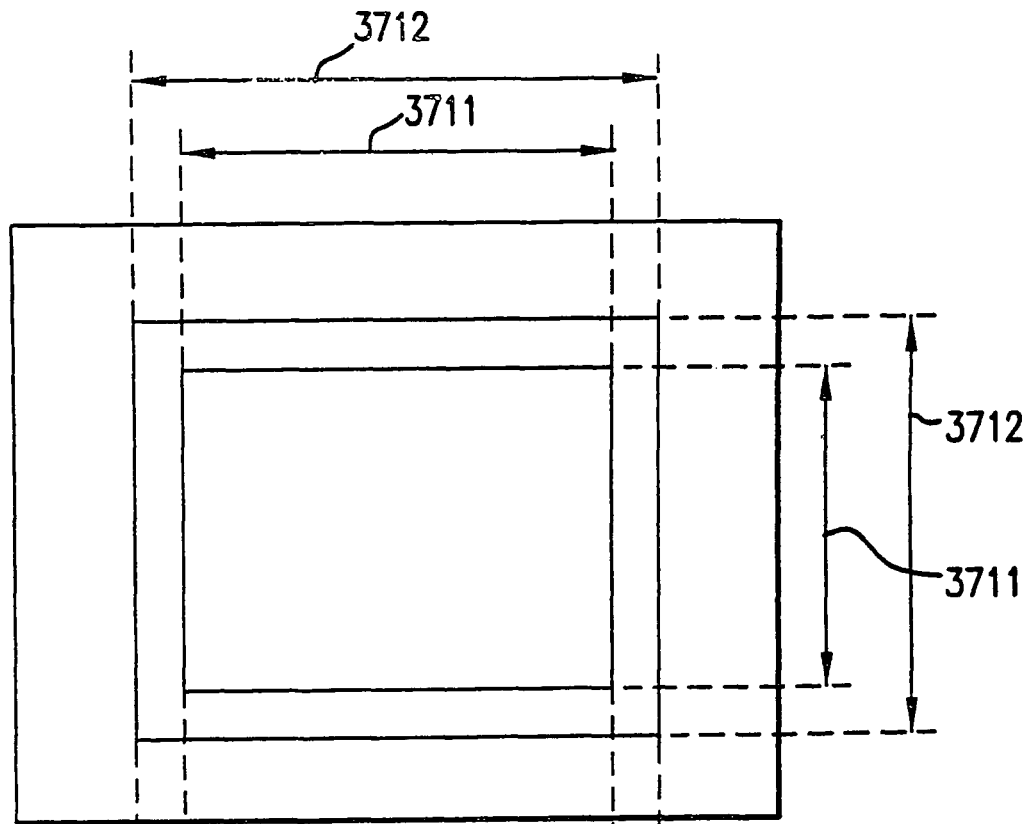
FIG. 37 is a drawing showing an outline of the structure of a reflective type color liquid crystal device in preferred embodiment 22 of the present invention.
Figure 37B:
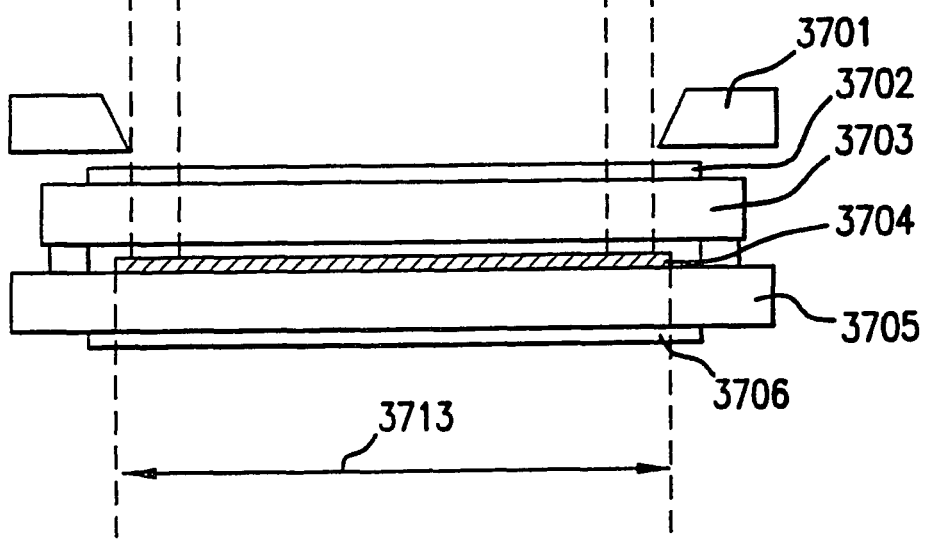

FIG. 37 is a drawing showing an outline of the structure of a reflective type color liquid crystal device according to aspects of the present invention. The configuration is explained. 3701 is a frame case, 3702 is the upper polarizing plate, 3703 is the upper substrate, the hatched area of 3704 is the color filters, 3705 is the lower substrate, and 3706 is the polarizing plate with the reflecting plate attached. Because the figure is complicated, the transparent electrodes, nonlinear elements, signal wires, orientation film, and the like, have been omitted. Also, 3711 is the drive display area, 3712 is the effective display area, and 3713 is the area having the color filters. (b) is a horizontal cross section, but the vertical cross section is identical to (b). The terms "drive display area" and "effective display area" are defined in the Electronic Industry Association of Japan (EIAJ) standard ED-2511A as "the area possessing the display function in a liquid crystal display device" and "the effective area as the drive display area and the screens following that," respectively. That is, the drive display area is the area capable of expending voltage in the liquid crystals, and the effective display area is all the area of the liquid crystal panel not hidden by the frame case.

The properties of Preferred Embodiment 22 have the area 3713 having the color filters the same or wider than the effective display area 3712. By being configured in this manner, the reflective type color liquid crystal device of Preferred Embodiment 22 has the advantage of the display being brightly visible. Ordinarily, with a transmissive type color liquid crystal device, the color filters are provided only on the drive display areas, and on the area outside that is provided a black mask made of metal or resin. As a matter of fact, in reflective type color liquid crystal devices, metallic black masks cannot be used because they add glare. Also, because resinous black masks originally are not provided for color filters, it becomes an increase in cost. The reason is that, if nothing is provided outside the drive display area, the outside becomes dark, and the drive display area appears relatively dark. Thus, the provision of the same color filters inside as well as outside the drive display areas, preferably in the same pattern, is effective in showing a brighter display.

Preferred Embodiment 23

In a transmissive type color liquid crystal device, generally a black mask is provided outside the dots, but if a black mask is provided in a reflective type color liquid crystal device, while a high contrast is obtainable, on the contrary, the display becomes extremely dark. Particularly in liquid crystal modes in which the parallax is unavoidable, such as the TN mode and the STN mode, because the light is absorbed two times by the black mask when introduced and when emitted, the brightness has a quality substantially proportional to the square of the aperture. Consequently, a black mask cannot be provided in a reflective type color liquid crystal device, but conversely, if no light-absorbing body is provided whatsoever outside the dots, the contrast decreases markedly, being undesirable. Thus, this aspect of the present invention does not provide a black mask outside the dots, rather it comprises color filters having the same extent or less absorption as the areas inside the dots.

Figure 38A:
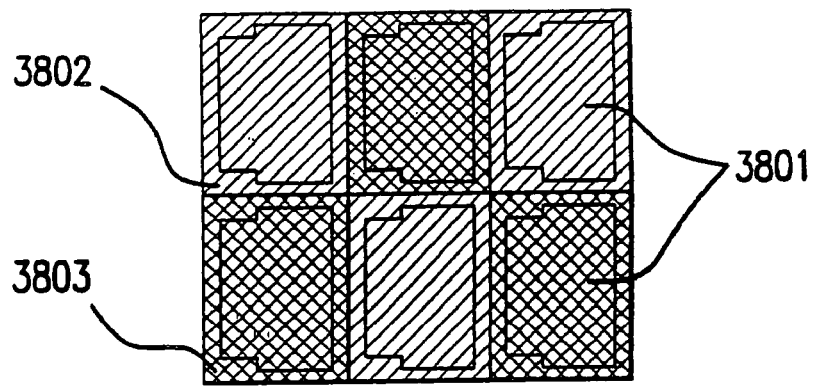
FIG. 38 is a drawing showing the placement of the color filters of a reflective type color liquid crystal device in preferred embodiment 23 of the present invention.
Figure 38B:
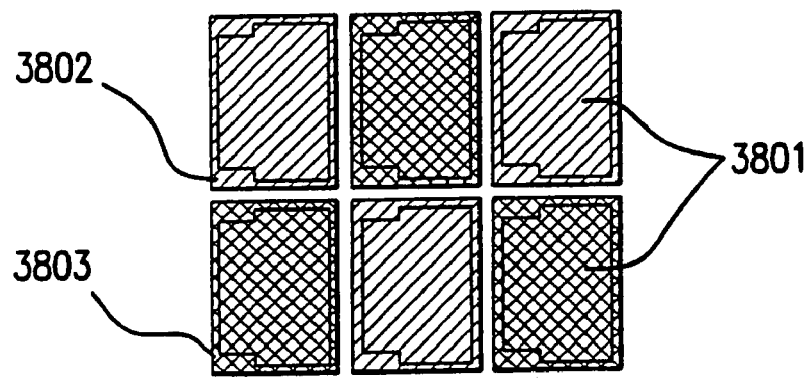
Figure 38C:
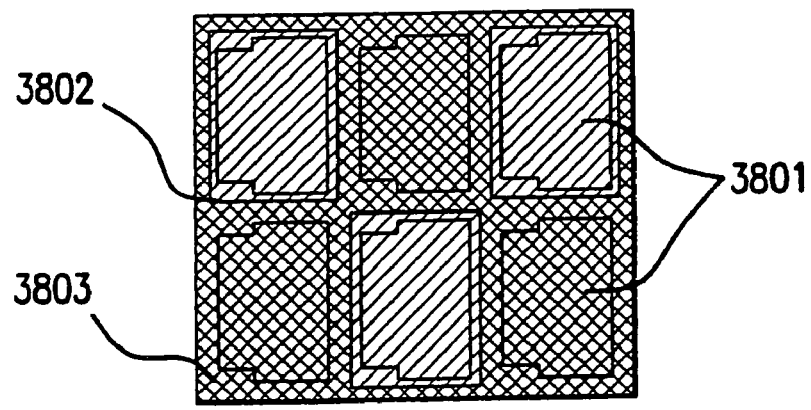

FIG. 38 is a drawing showing the placement of the color filters of a reflective type color liquid crystal device according to aspects of the present invention. The fundamental configuration and spectral properties of the color filters are identical to FIG. 6 of Preferred Embodiment 5, but pains were taken in the placement of the color filters in the area outside the dots. In FIG. 38, the "horizontally protruding" area shown in 3801 is the area in which the opposing electrodes and the pixel electrodes are overlaid and the electric field is imprinted in the liquid crystals. Also, the area 3802 having applied hatching slanted from the top right to the bottom left is the cyan filters, and the area 3803 having applied cross hatching is the red filters.

In FIG. 38(*a*), the red filters and cyan filters are placed so as to be closely touching outside the dots. Also, in (b), filters are provided outside the dots as well, but they are placed apart from each other. Also, in (c), red filters are placed outside the dots. Because there is a non-zero absorption in the area outside the dots that is the same extent or less than that inside the dots, a bright, high-contrast display is obtainable. For the various properties, (a) had a reflectivity of 30% and a contrast ratio of 1:15 during white display, (b) had a reflectivity of 33% and a contrast ratio of 1:13, and (c) had 29% and 1:16.

Preferred Embodiment 24

Figure 39A:
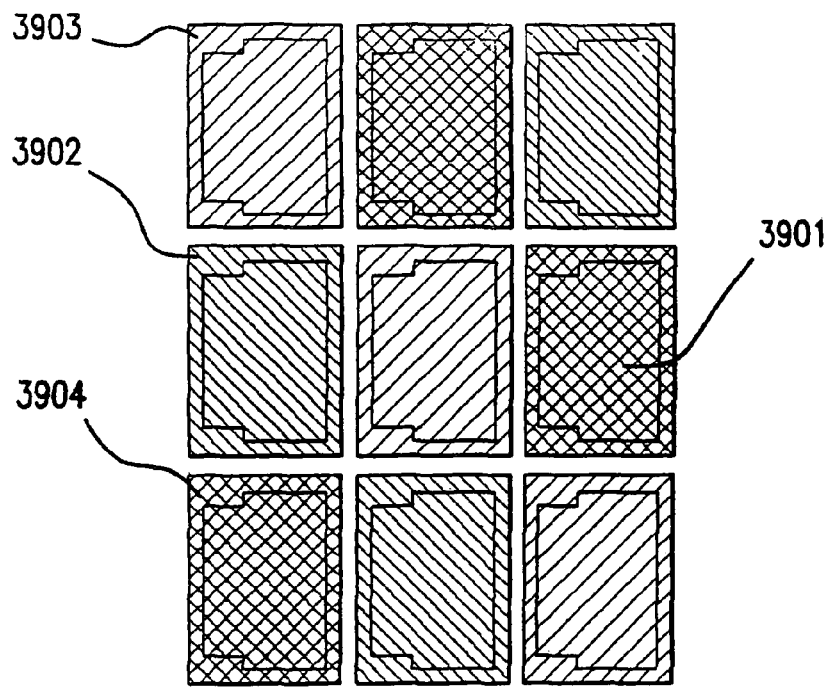
FIG. 39 is a drawing showing the placement of the color filters of a reflective type color liquid crystal device in preferred embodiment 24 of the present invention.
Figure 39B:
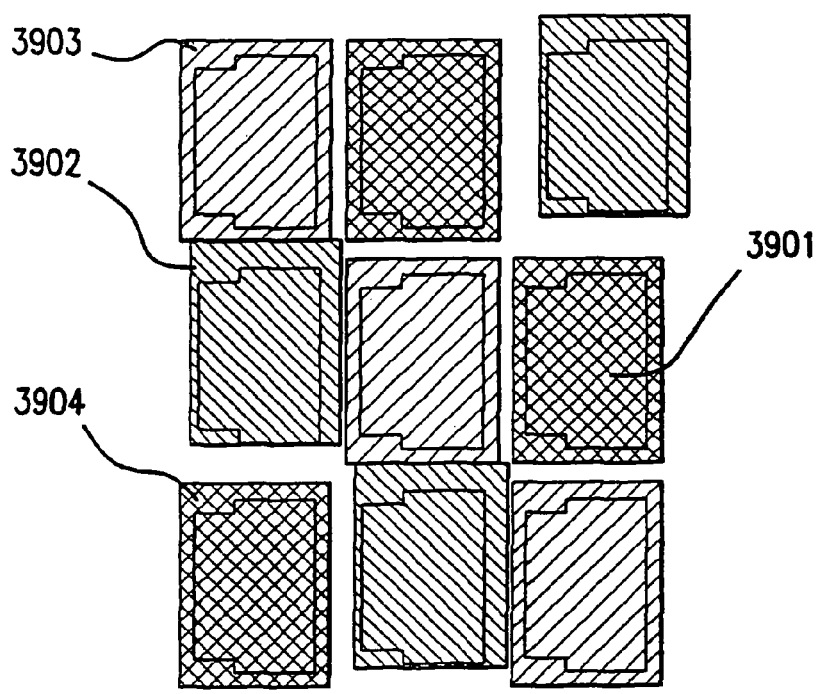

FIG. 39 is a drawing showing the placement of the color filters of a reflective type color liquid crystal device according to aspects of the present invention. The fundamental configuration and spectral properties of the color filters are identical to FIG. 8 of Preferred Embodiment 9 and FIG. 12, but pains were taken in the placement of the color filters outside the dots. In FIG. 39, the "horizontally protruding" area shown in 3901 is the area in which the opposing electrodes and the pixel electrodes are overlaid and the electric field is imprinted in the liquid crystals. Also, the area 3902 having applied hatching slanted from the top left to the bottom right is the blue filters, the area 3903 having applied hatching slanted from the top right to the bottom left is the green filters, and the area 3904 having applied cross hatching is the red filters.

In FIG. 39(*a*), the three colors of filters are placed outside the dots as well, but they are placed apart from each other. The distance apart was set anticipating the maximum alignment error during fabrication of the color filters. That is, FIG. 39(*b*) is the color filter placement when having anticipated the expected maximum alignment error, but even in this case the color filters of different colors are made such that they do not overlap each other. Because the overlapping of the color filters has substantially the same significance as the existence of a black mask, this must be avoided to the extent possible. By placing the color filters in the above manner, a bright, high-contrast reflective type color liquid crystal device was possible.

Preferred Embodiment 25

Figure 40:
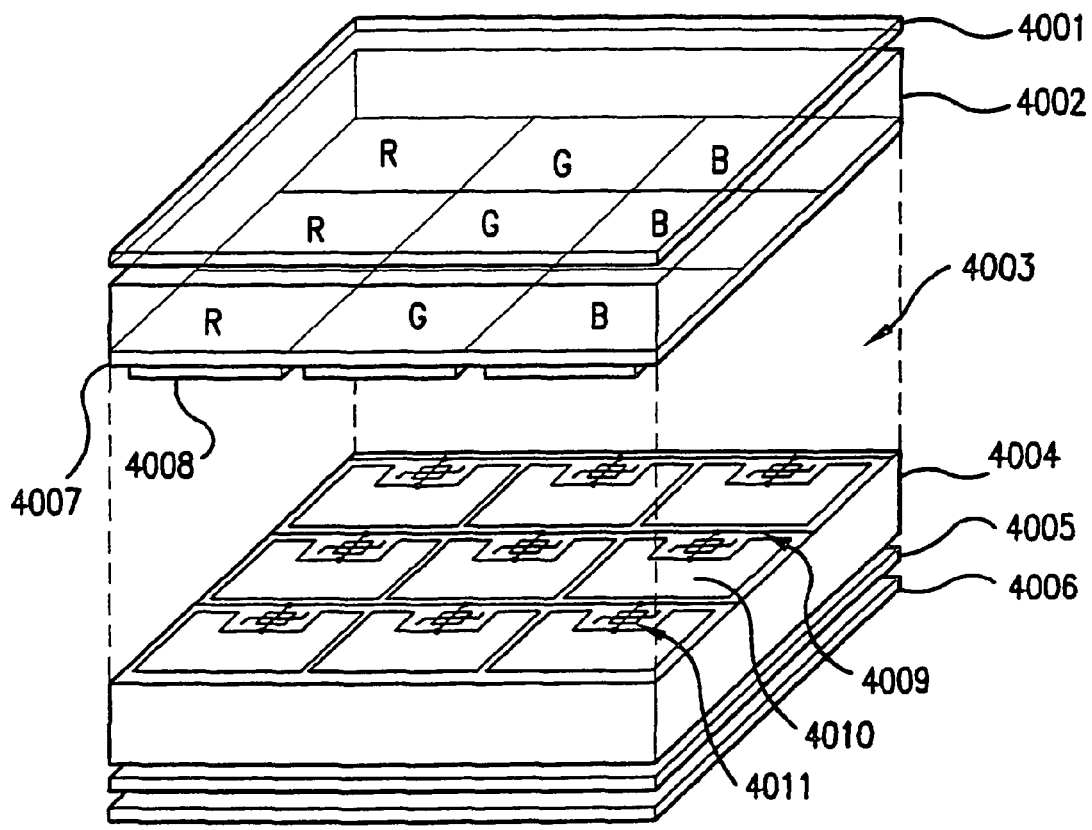
FIG. 40 is a drawing showing the essential components of the structure of a reflective type color liquid crystal device in preferred embodiment 25 of the present invention.

FIG. 40 is a drawing showing the essential elements of a reflective type color liquid crystal device according to aspects of the present invention. First the configuration is explained. 4001 is the upper polarizing plate, 4002 is the opposing substrate, 4003 is the liquid crystals, 4004 is the element substrate, 4005 is the lower polarizing plate, and 4006 is the scattering reflecting plate. On the opposing substrate 4002 are provided the color filters 4007 and the opposing electrodes (scanning wires) 4008, and on the element substrate 4004 are provided the signal wires 4009, the pixel electrodes 4010, and the MIM elements. These color filters are in the stripe arrangement common with the data displays of PCs and the like. The spectral properties of the color filters are identical to FIG. 12 of Preferred Embodiment 9.

Figure 41A:
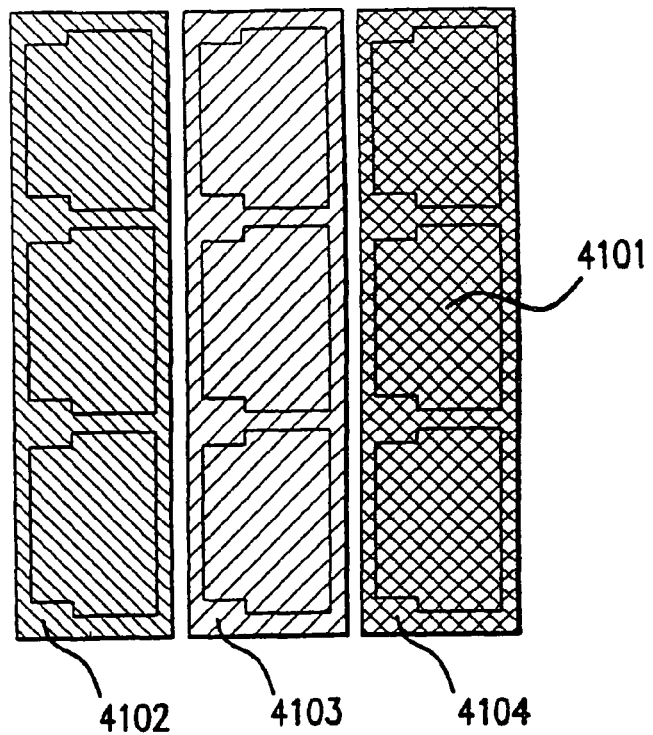
FIG. 41 is a drawing showing the placement of the color filters of a reflective type color liquid crystal device in preferred embodiment 25 of the present invention.
Figure 41B:
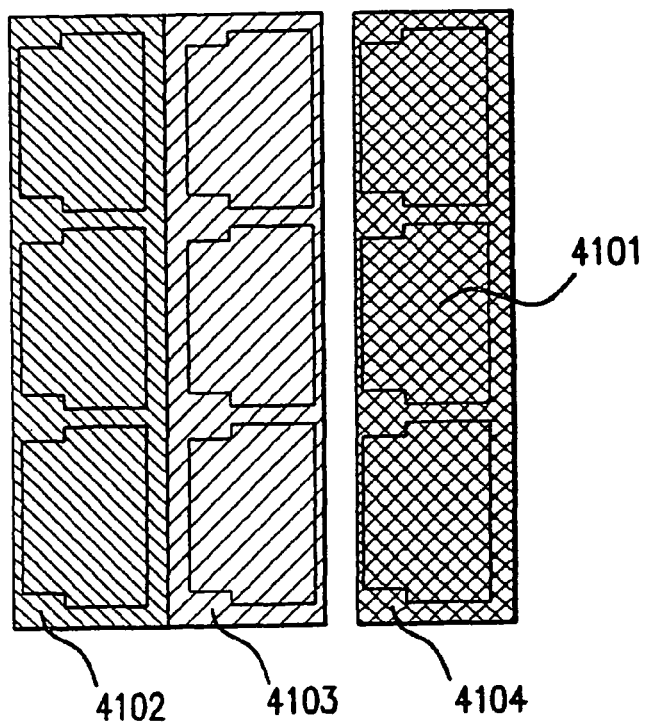

FIG. 41 is a drawing showing the placement of the color filters of a reflective type color liquid crystal device according to aspects of the present invention. In FIG. 41, the "horizontally protruding" area shown in 4101 is an area in which the opposing electrodes and the pixel electrodes are overlaid and the electric field is imprinted in the liquid crystals. Also, the area 4102 having applied hatching slanted from the top left to the bottom right is the blue filters, the area 4103 having applied hatching slanted from the top right to the bottom left is the green filters, and the area 4104 having applied cross hatching is the red filters.

In FIG. 41(*a*), the three colors of filters are placed outside the dots as well, but they are placed continuously up and down, and they are placed apart from each other left and right. The distance apart was set anticipating the maximum alignment error during fabrication of the color filters. That is, FIG. 41(*b*) is the color filter placement when having anticipated the expected maximum alignment error, but even in this case the color filters of different colors are made such that they do not overlap each other. By placing the color filters in the above manner, a bright, high-contrast reflective type color liquid crystal device was possible.

Preferred Embodiment 26

Figure 42:
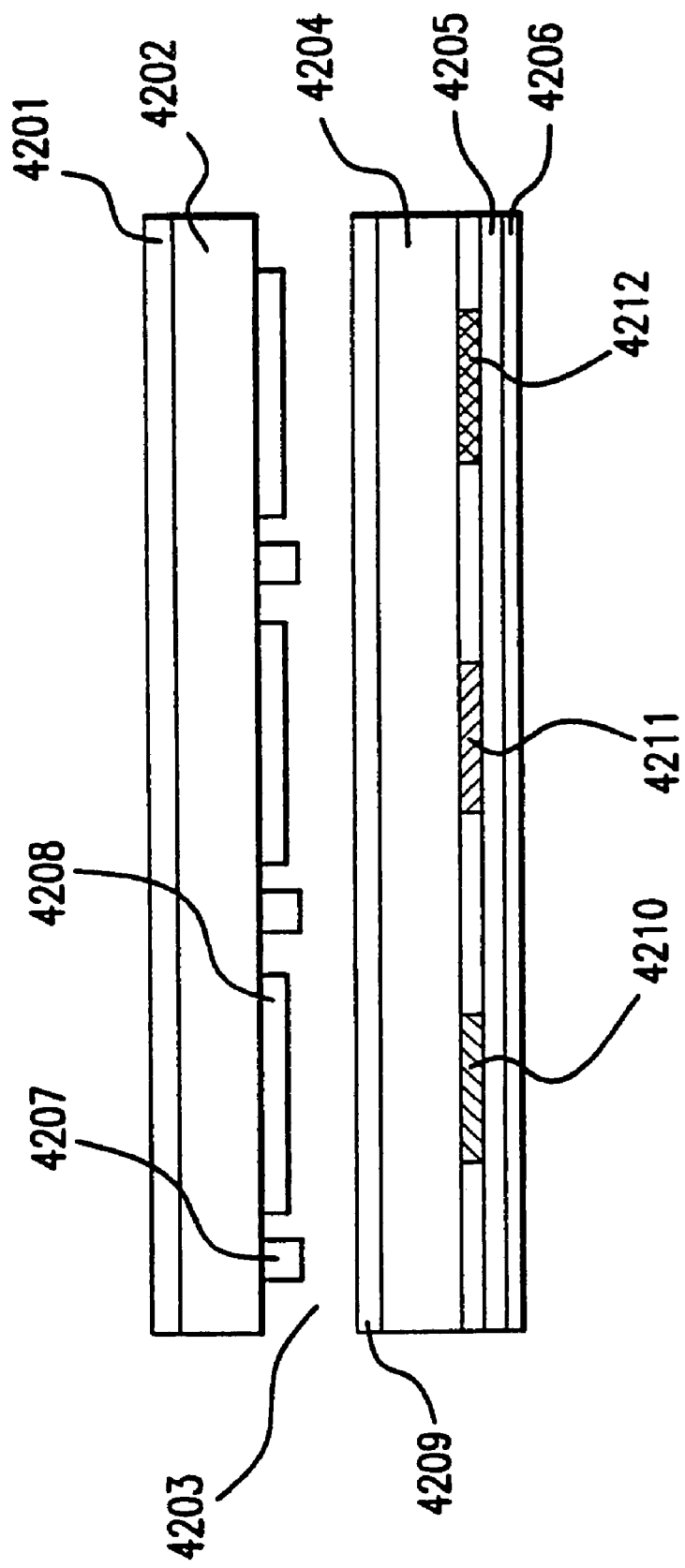
FIG. 42 is a drawing showing the essential components of the structure of a reflective type color liquid crystal device in preferred embodiment 26 of the present invention.

FIG. 42 is a drawing showing the essential elements of the structure of a reflective type color liquid crystal device according to aspects of the present invention. The configuration is explained. 4201 is the upper polarizing plate, 4202 is the element substrate, 4203 is the liquid crystals, 4204 is the opposing substrate, 4205 is the lower polarizing plate, and 4206 is the scattering reflective plate. On the element substrate 4202 are provided the signal wires 4207 and the pixel electrodes 4208, and on the opposing substrate are provided the opposing electrodes (scanning wires) 4209. They do not appear on this cross section, but the signal wires and the pixel electrodes are connected via MIM elements. Also, on the surface of the reflective plate side of the opposing substrate are provided the red filters 4210, the green filters 4211, and the blue filters 4212.

The spectral properties of the color filters are given the properties as shown in FIG. 12 if provided on the entirety of the dots, or as shown in FIG. 16 and FIG. 18 according to the proportion if provided on a part of the dots.

By providing the color filters on the outside of the substrate in this manner, the use of cheap color filters is possible. These color filters also may be provided on top of a film, or the like, and affixed later. Also, particularly by providing the color filters only on a part of the dots, it has the advantages of the assembly margin being expanded, and the visual field being widened.

Preferred Embodiment 27

Preferred Embodiment 27 is a reflective type color liquid crystal device according to aspects of the present invention. Its structure is identical to FIG. 1 of Preferred Embodiment 1, FIG. 6 of Preferred Embodiment 6, and FIG. 8 of Preferred Embodiment 7. Its characteristics are in the fact that on the substrate 104, 604, 804 positioned on the side of the reflective plate are provided the MIM elements 111, 611, 811. By being positioned in this manner, compared with the case of the reverse configuration, that is, having provided the MIM elements on the substrate 102, 602, 802, unwanted surface reflection is reduced, and a high contrast was obtained. There are three reasons for this. One is that the reflections by the signal wires 109, 609, 809 and the MIM elements are partially absorbed by the color filters 107, 607, 807. The second is that the signal wires themselves are of a structure having superimposed metallic Ta and metallic Cr. The third is that the reflected light incurs absorption due to the interference of multiple refraction by passing through the liquid crystal layer 103, 603, 803.

Preferred Embodiment 28

Preferred Embodiment 28 is a reflective type color liquid crystal device according to aspects of the present invention. Its overall structure is identical to, for example, FIG. 8 of Preferred Embodiment 7. It characteristics are in the wiring method of the MIM elements.

Figure 43:
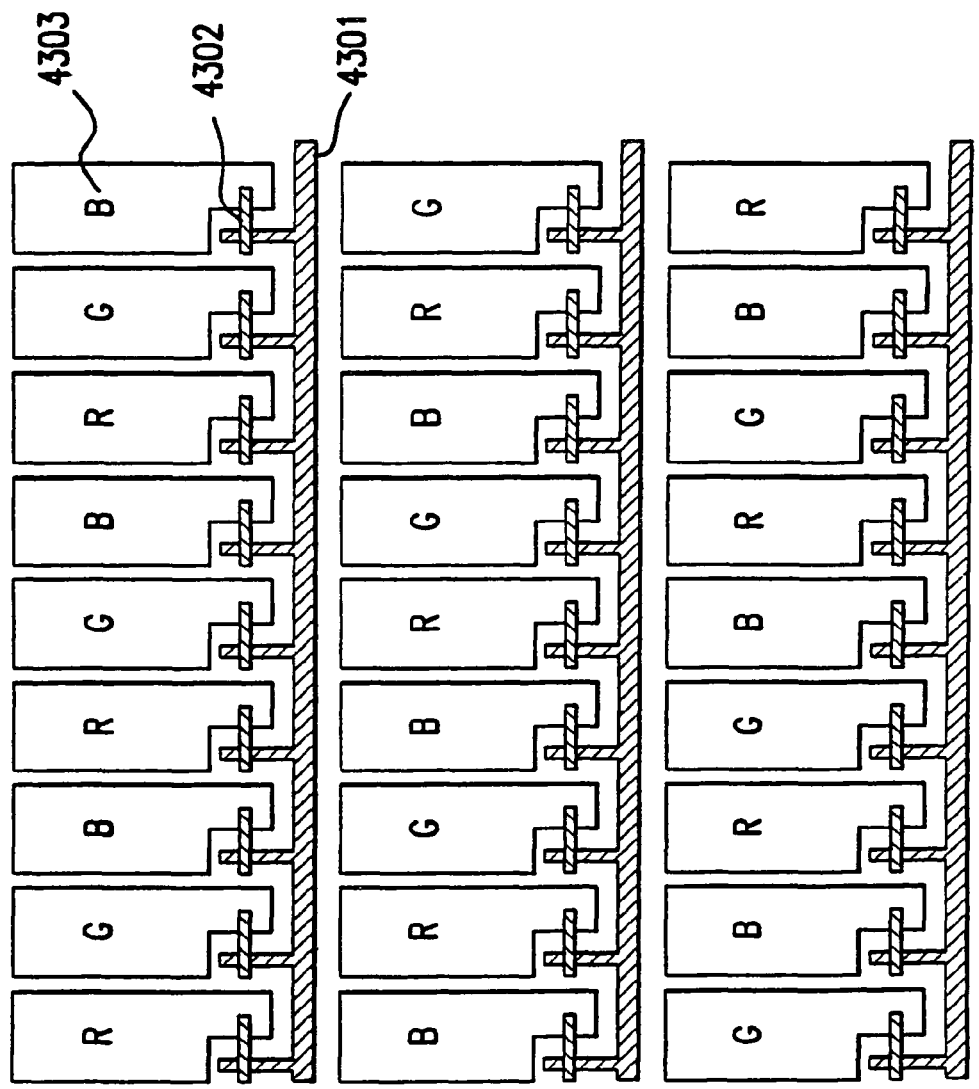
FIG. 43 is a drawing showing the wiring method of the MIM element of a reflective type color liquid crystal device in preferred embodiment 28 of the present invention.

FIG. 43 is a drawing showing the wiring method of the MIM elements of the reflective type color liquid crystal device in Preferred Embodiment 28. 4101 is the signal wires, 4302 is the MIM element, and 4303 is the pixel electrodes. Because the pixel electrodes variously face the red, green, and blue color filters of the opposing substrate, the corresponding relationships are shown by "R," "G," and "B" on the pixel electrodes.

Each dot of FIG. 43 is in a vertically long shape, and one square pixel is formed by three dots arrayed horizontally. This is a configuration often seen with the data displays of PCs. Here, the signal wires are wired parallel to the short edges of the dots, that is, in the horizontal direction. By being wired in this manner, it has the effects of the number of wires becoming less, and the aperture becoming higher. Here, aperture is the percentage of the area occupied excluding the non-transparent portion of the metal, and the like.

Figure 44:
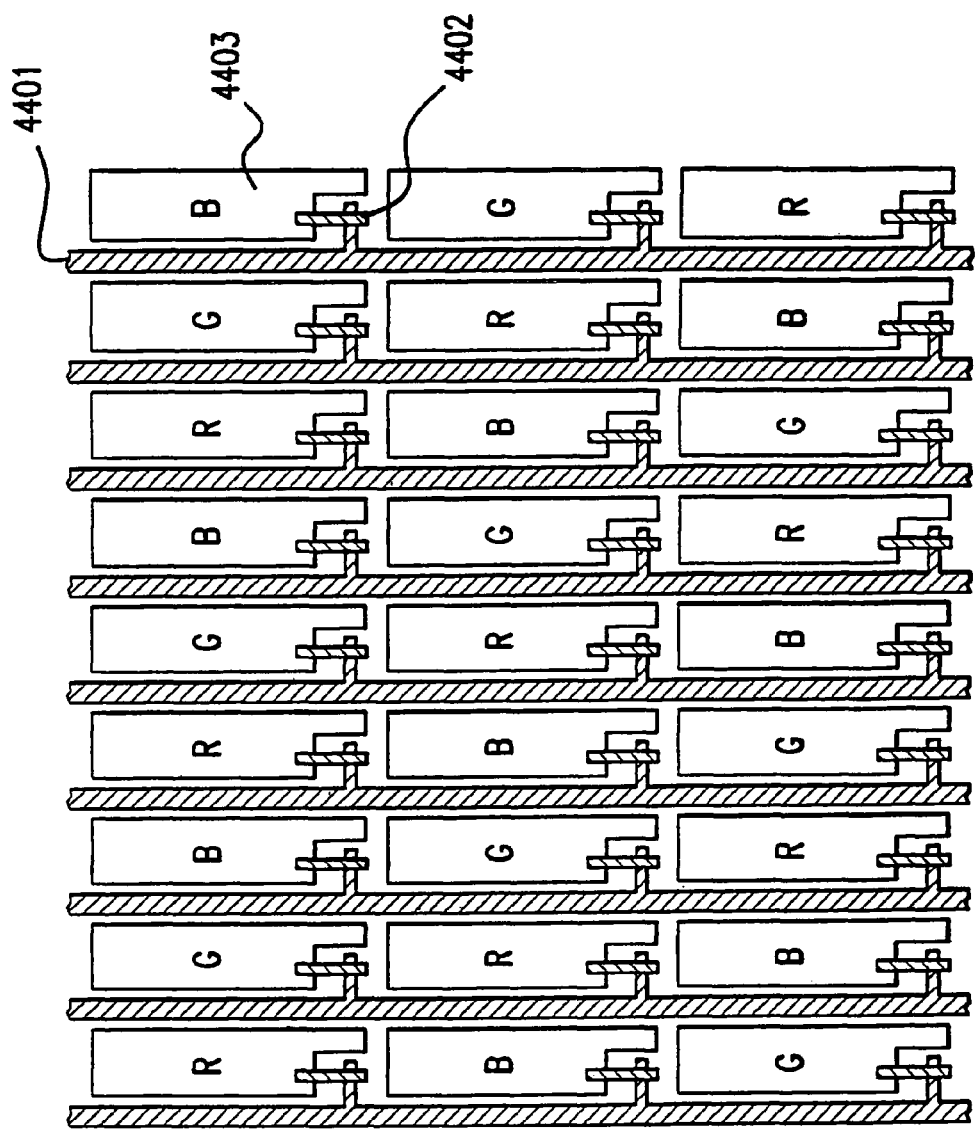
FIG. 44 is a drawing showing the wiring method of the MIM element of a reflective type color liquid crystal device of the comparative example mentioned in preferred embodiment 28 of the present invention.

This is compared with the conventional configuration. FIG. 44 is a drawing showing the wiring method of a (transmissive) color liquid crystal device using conventional MIM elements. 4401 is the signal wires, 4402 is the MIM element, and 4403 is the pixel electrodes. The dot pitch is the same as FIG. 43, and the dots are formed vertically long, but the signal wires are wired parallel to the long edges of the dots, that is, in the vertical direction. When wired in this manner, the number of wires becomes three times the case of FIG. 43, and the aperture is low. One of the reasons such wiring was performed in the past was because vertical wiring on a horizontal panel has a shorter distance, and another was because if a black mask is provided, the aperture does not change whether vertically wired or horizontally wired.

When the aperture becomes higher in this manner, the display becomes brighter. That the aperture is beneficial to brightness, and that it is particularly evident in a reflective configuration having parallax, already have been explained in detail from Preferred Embodiment 23 to 25.

Preferred Embodiment 29

Figure 45:
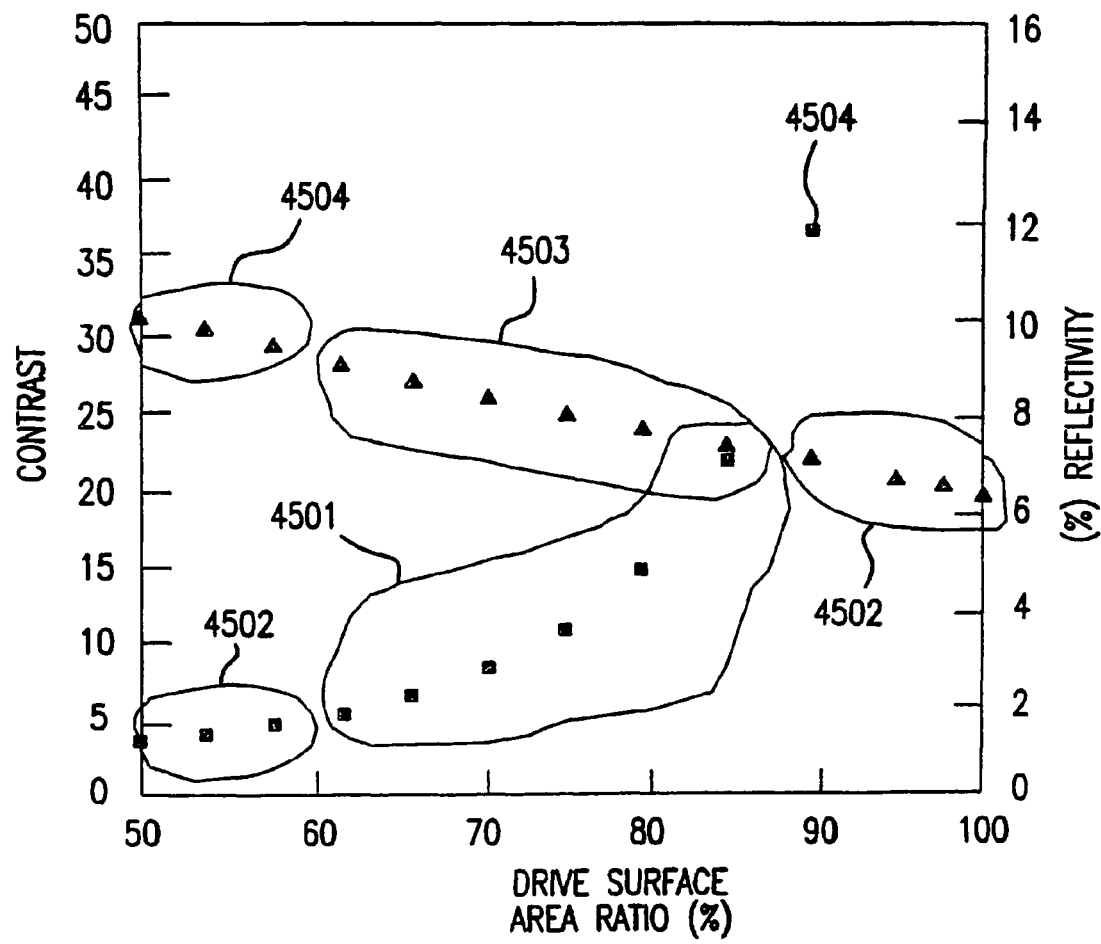
FIG. 45 is a drawing having plotted the change of contrast and reflectivity when having changed the drive area in a reflective type color liquid crystal device in preferred embodiment 29 of the present invention.

FIG. 45 shows the properties of a reflective type color liquid crystal device according to aspects of the present invention. Taking the same configuration as Preferred Embodiment 2, the relationships between the drive surface area ratio and contrast, and the drive surface area ratio and reflectivity when having changed the drive surface area ratio from 50% to 100% are shown. Here, drive surface area ratio is defined as the percentage occupied by the area driven by the liquid crystals within the areas excluding the non-transparent portions of the pixels, such as the metallic wiring, the MIM elements, and the like. The horizontal axis takes the drive surface area ratio, the vertical axis takes the contrast and reflectivity, 4501 is the contrast of the present preferred embodiment, 4502 is the contrast of a comparative example, 4503 is the reflectivity during cyan display of the present preferred embodiment, and 4504 is the reflectivity during cyan display of the comparative example.

If the drive surface area ratio is 60% or more, a good contrast of 1:5 or more can be obtained. Also, if the drive surface area ratio is 85% or less, a good brightness of 23% or more in cyan display can be obtained.

Preferred Embodiment 30

In a reflective type color liquid crystal display device, the properties of the scattering reflective plate greatly control the properties of brightness, contrast, and visual angle. There are various types of scattering reflective plates, from those having weak scattering properties, such as mirror faces, to those having strong scattering properties, such as paper, and they are selected according to the peripheral environment, but for a reflective type color liquid crystal display device, one with weak scattering properties is desirable, as brightness and contrast are deemed important.

Figure 46:
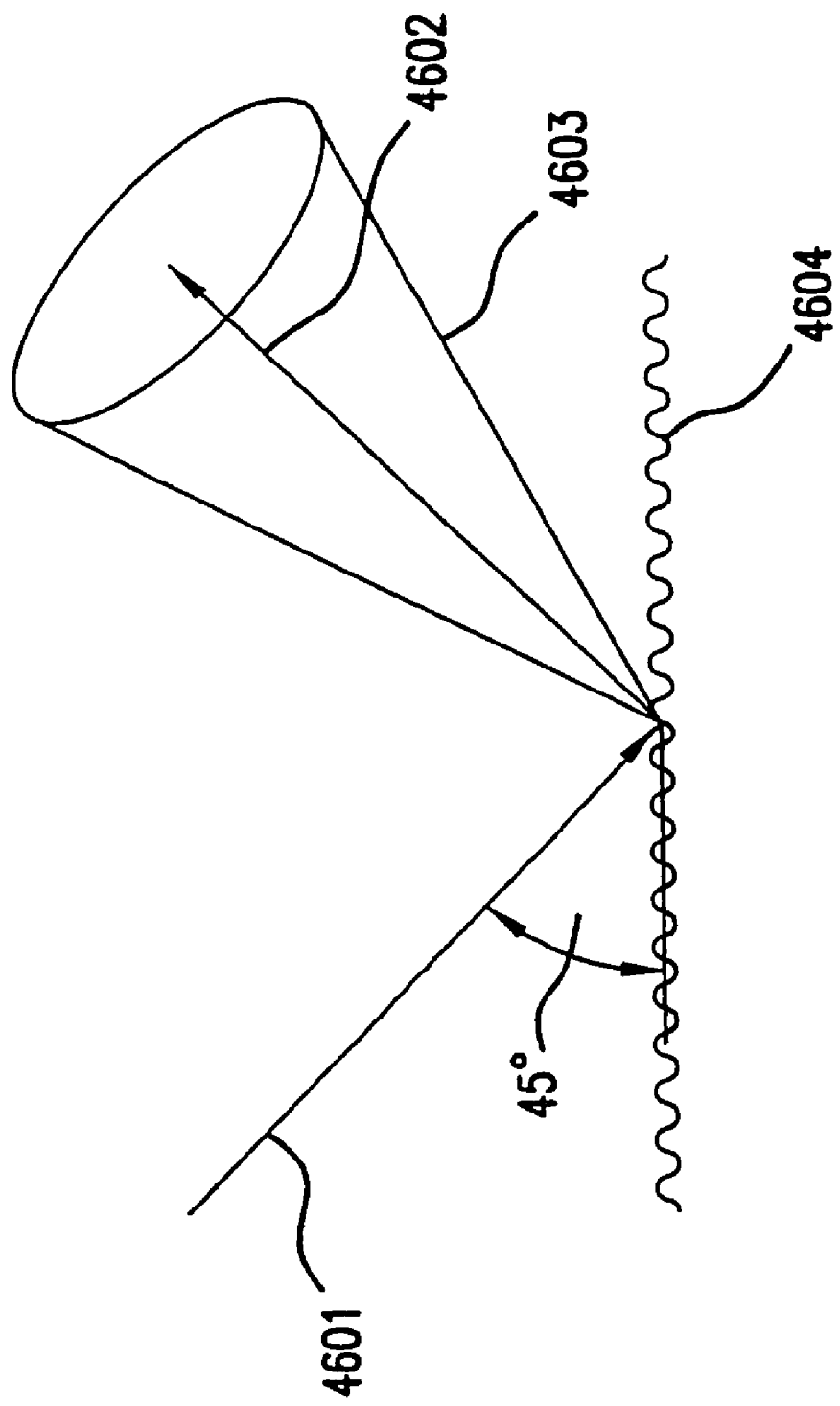
FIG. 46 is a drawing showing the scattering properties of the reflective plate of a reflective type color liquid crystal device in preferred embodiment 30 of the present invention.
Figure 47:
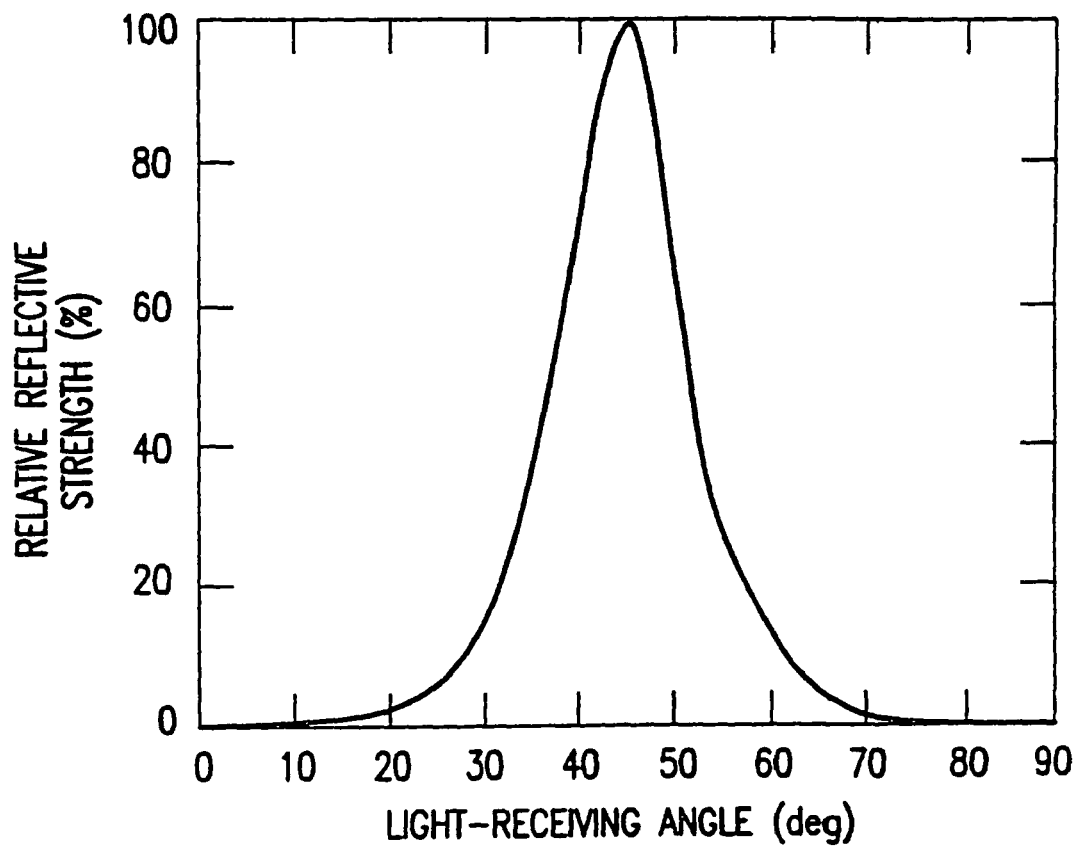
FIG. 47 is a drawing showing the scattering properties of the reflective plate of a reflective type color liquid crystal device in preferred embodiment 30 of the present invention.

FIG. 46 and FIG. 47 are drawings showing the properties of the reflective plates of reflective type color liquid crystal devices according to aspects of the present invention. In FIG. 46, 4604 is the scattering reflective plate, 4601 is the light introduced at a 45° angle onto the surface of the scattering reflective plate, 4602 is the light of the positive reflection, and 4603 is a 30° cone centering the positive reflection. Also, the horizontal axis of FIG. 47 is the light-receiving angle of the reflected light, and the vertical axis is the relative reflective strength. The reflective plate of Preferred Embodiment 30 has the property that about 95% introduced light is reflected into the 30° cone. If this does not meet 80%, a contrast ratio of 1:10 cannot be obtained in an ordinary room environment.

Figure 48:
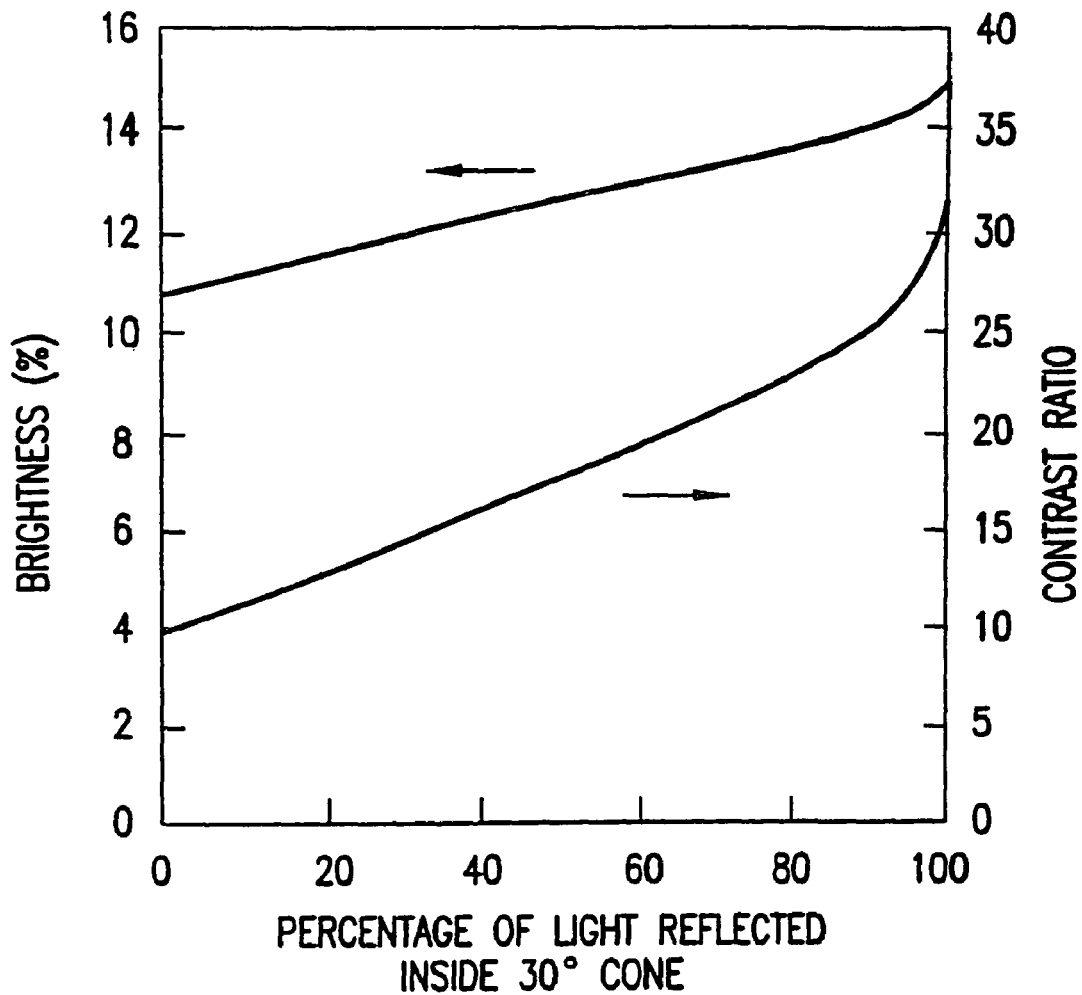
FIG. 48 is a drawing having plotted the brightness and contrast ratio when having changed the percentage of light reflected inside a 30° cone in a reflective type color liquid crystal device in preferred embodiment 30 of the present invention.

For the purpose of reference, in FIG. 48 are shown the results of a computer simulation. The horizontal axis of the drawing is the percentage of the light reflected into the 30° cone shown in FIG. 46, and the vertical axis of the drawing is the brightness and contrast ratio. The light source is hypothesized as completely scattered white light such as an integrating sphere, and the light reflected in the normal line direction of the substrate is computed. The brightness is set as 100% the brightness of a standard white plate. As is clear from these simulation results, display can be obtained being as bright and as high-contrast as the percentage of the light reflected into the 30° cone is high, that is, as the scattering of the reflective plate is weak. However, it was confirmed that, with a reflective plate such that light more than 95% of the introduced light is reflected into the 30° cone, the visual angle properties are markedly narrow, and it cannot stand to practical use.

Preferred Embodiment 31

Figure 49:
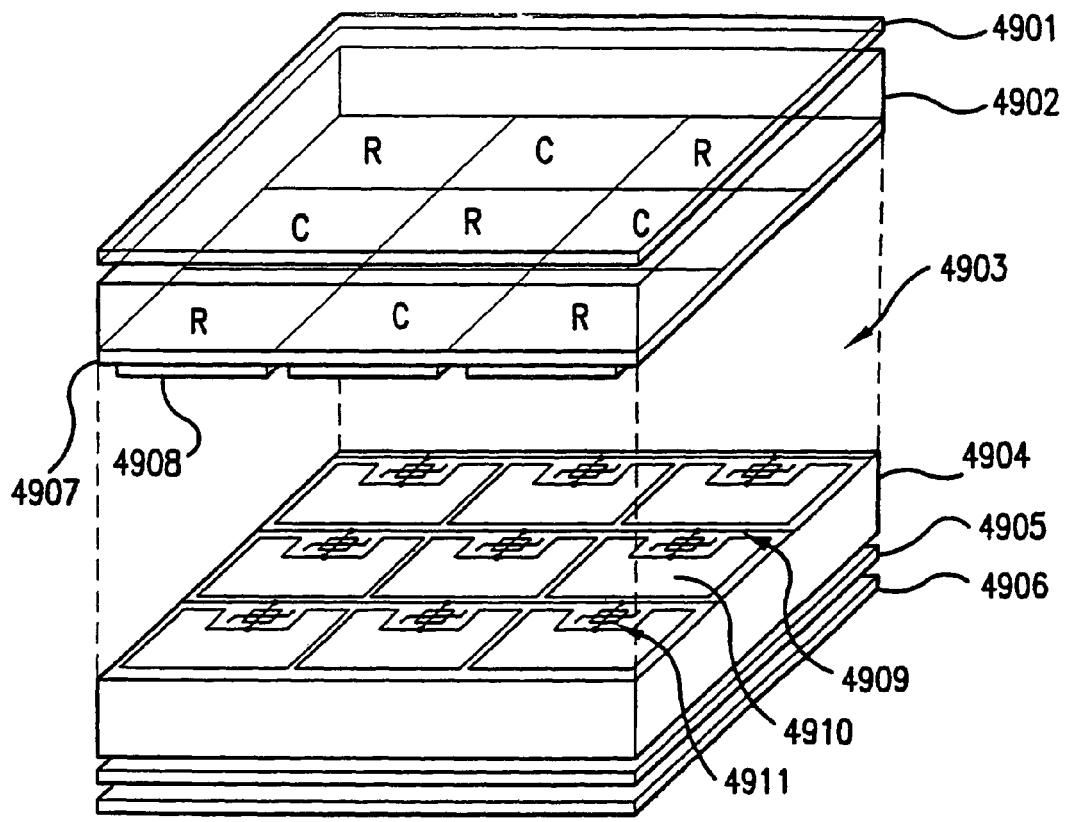
FIG. 49 is a drawing showing the essential components of the structure of a reflective type color liquid crystal device in preferred embodiment 31 of the present invention.

FIG. 49 is a drawing showing the essential components of the structure of a reflective type color liquid crystal device according to aspects of the present invention. First the configuration is explained. 4901 is the upper polarizing plate, 4902 is the opposing plate, 4903 is the liquid crystals, 4904 is the element substrate, 4905 is the lower polarizing plate, 4906 is a semi-transmissive reflective plate, and 4912 is backlights. On the opposing plate 4902 are provided the color filters 4907 and the opposing electrodes (scanning wires) 4908, and on the element substrate 4904 are provided the signal wires 4909, the pixel electrodes 4910, and the MIM elements 4911. Also, the color filter has the identical spectral properties as FIG. 3 of Preferred Embodiment 2.

Since the reflectivity of a semi-transmissive plate is about 70 percent that of an ordinary, scattering reflective plate, when used in a reflective mode without lighting backlights, the reflectivity during white color display becomes about 24%. Meanwhile, in a transmissive mode having lit the backlights, a sufficient brightness can be obtained even with monochrome backlights having a surface brilliance of 400 cd/m$^2$. Also, the properties of the color filters such as shown in FIG. 3 are of a transmissive nature and are not sufficient for display of colors, but when using a semi-transmissive plate, there is the effect of raising the color purity with the reflection of the ambient light even in a transmissive mode.

For a semi-transmissive plate, one that reflects 80% or more of the introduced light is desirable for obtaining a bright display. The display necessarily becomes dark when used in a transmissive mode, but the pursuit of the brightness of a transmissive mode, once obtained, easily becomes unsatisfactory as a result for both a transmissive display and a reflective display. It is clear that a transmissive mode should be totally dark and should barely visible for a display to be obtained that is easily sold on the market.

Preferred Embodiment 32

Preferred Embodiment 32 relates to a reflective type color liquid crystal device according to aspects of the present invention, but the fundamental configuration and spectral properties of the color filters are identical to FIG. 6 of Preferred Embodiment 5 and FIG. 3. Its characteristic is in that the cell conditions of the TN mode are optimized in the reflective type color liquid crystal device.

Figure 50:
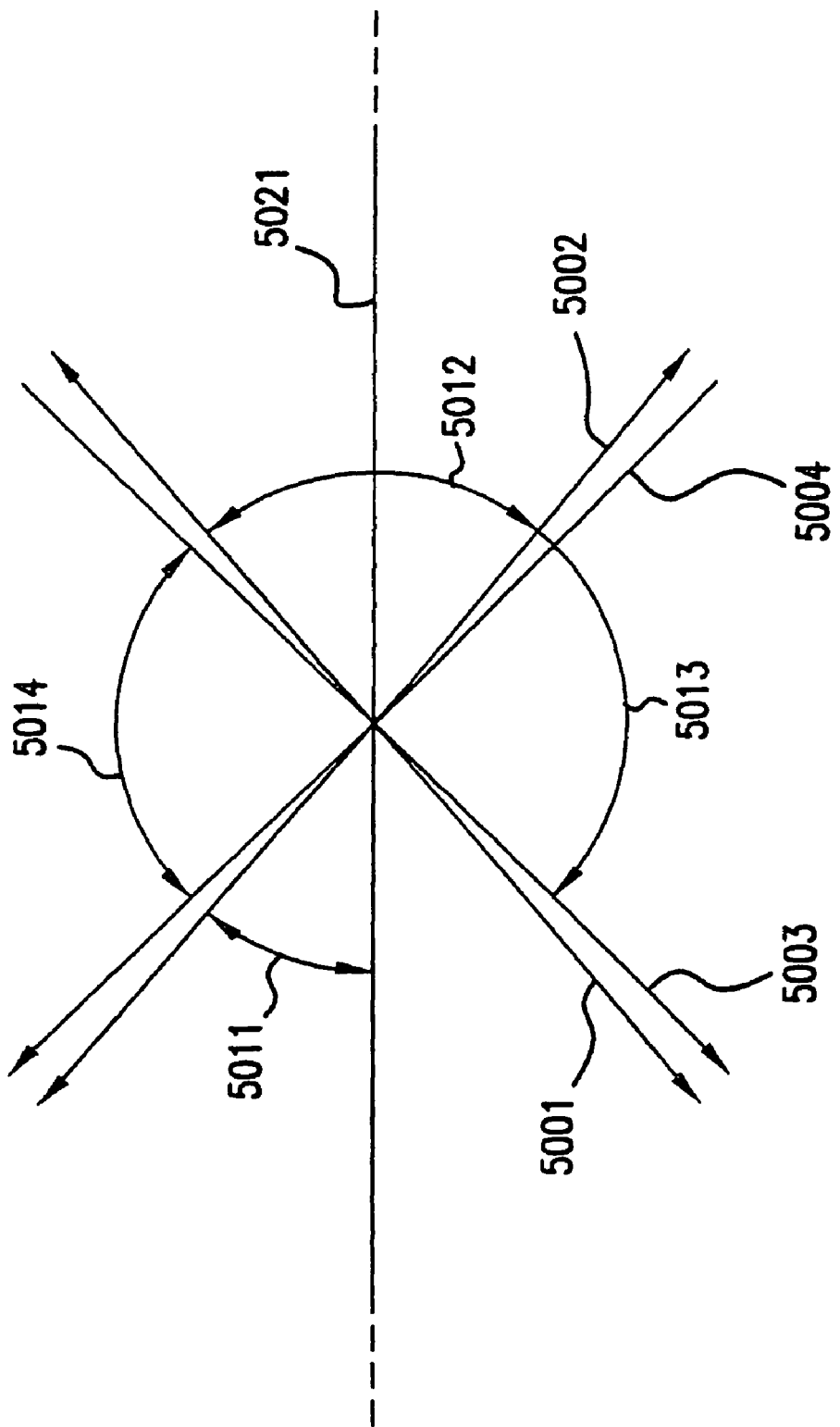
FIG. 50 is a drawing showing the relationships of each axis of a reflective type color liquid crystal device in preferred embodiments 32 and 33 of the present invention.

FIG. 50 is a drawing showing the relationships of each axis of the reflective type liquid crystal device in Preferred Embodiment 32. 5021 is the left and right direction (lengthwise direction) of the liquid crystal panel, 5001 is the direction of the transmissive axis of the upper polarizing plate, 5002 is the rubbing direction of the polarizing plate placed above, 5003 is the rubbing direction of the element substrate placed below, and 5004 is the direction of the transmissive axis of the lower polarizing plate. Here, the angle 5011 formed by the rubbing direction of the opposing substrate and the left and right direction of the liquid crystal panel is set to 45°, the angle 5012 formed by the direction of the transmissive axis of the upper polarizing plate and the rubbing direction of the opposing plate is set to 90°, the angle 5013 of the twist of the liquid crystals is set to right 90°, and the angle 5014 formed by the direction of the transmissive axis of the lower polarizing plate and the rubbing direction of the element substrate is set to 90°. If placed in such a manner, when the molecules of the center of the liquid crystal layer are voltage printed, they stand up from the side of the viewer (that is, the lower side of the drawing), and in conjunction with the visual angle properties of the TN liquid crystals, a high-contrast display not tending toward reflections becomes possible. Also, the placement whereby the transmissive axis of the polarizing plates are perpendicular to the rubbing directions of the adjacent substrates (so-called O mode) has less color variation due to relative direction compared with the parallel placement (so-called E mode), and is more desirable.

Also, by making the multiple refractivity Δn of the liquid crystal material 0.189 and the cell gap 7.1 μm, the Δnxd of a liquid crystal cell is set as 1.34 μm. This is the condition of most brightness and least coloration during non-selective voltage printing. There are problems that at Δnxd<1.30 μm the display color becomes bluish, and at Δnxd>1.40 μm the display becomes dark, and these are not desirable.

Preferred Embodiment 33

Preferred Embodiment 33 relates to a reflective type color liquid crystal device according to aspects of the present invention. Its characteristics is in that the cell conditions of the TN mode are further optimized in the reflective type color liquid crystal device.

FIG. 50 is a drawing showing the relationships of each axis of the reflective type liquid crystal device in Preferred Embodiment 33. 5021 is the left and right direction (lengthwise direction) of the liquid crystal panel, 5001 is the direction of the transmissive axis of the upper polarizing plate, 5002 is the rubbing direction of the polarizing plate placed above, 5003 is the rubbing direction of the element substrate placed below, and 5004 is the direction of the transmissive axis of the lower polarizing plate. Here, the angle 5011 formed by the rubbing direction of the opposing substrate and the left and right direction of the liquid crystal panel is set to 45°, the angle 5012 formed by the direction of the transmissive axis of the upper polarizing plate and the rubbing direction of the opposing plate is set to 90°, the angle 5013 of the twist of the liquid crystals is set to right 90°, and the angle 5014 formed by the direction of the transmissive axis of the lower polarizing plate and the rubbing direction of the element substrate is set to 90°. If placed in such a manner, when the molecules of the center of the liquid crystal layer are voltage printed, they stand up from the side of the viewer (that is, the lower side of the drawing), and in conjunction with the visual angle properties of the TN liquid crystals, a high-contrast display not tending toward reflections becomes possible. Also, the placement whereby the transmissive axis of the polarizing plates are perpendicular to the rubbing directions of the adjacent substrates (so-called 0 mode) has less color variation due to relative direction compared with the parallel placement (so-called E mode), and is more desirable.

Here, a panel was fabricated whereby the multiple refractivity Δn of the liquid crystal material was made 0.084, and the Δnxd is differs by changing the cell gap.

Figure 51:
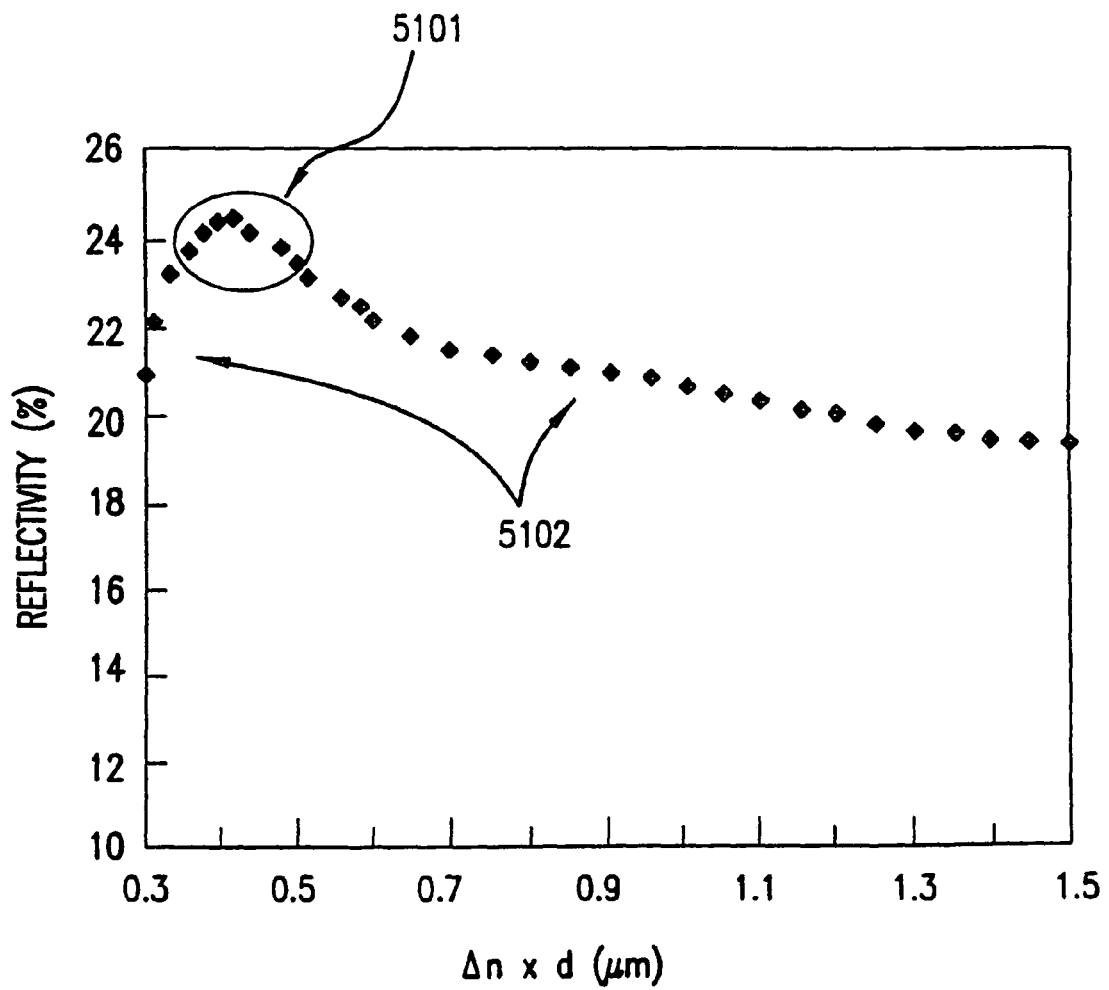
FIG. 51 is a drawing having plotted the change of reflectivity of the white display when having changed the Δnxd of the liquid crystal cells of a reflective type color liquid crystal device in preferred embodiment 33 of the present invention.

FIG. 51 shows the Δnxd and the reflectivity during white display. 5101 is the reflectivity for each Δnxd of the preferred embodiment, and 5102 is the reflectivity for each Δnxd of a comparative example. For measurement, it was measured such that the light is introduced uniformly from all directions by using an integrating sphere. The reflectivity was taken as 100% of a standard white plate. From FIG. 51, it can be read that, as the Δnxd becomes larger, the visual angle becomes narrower, and the display becomes dark because the efficiency of use of the introduced light decreases. Consequently, in obtaining a bright display, it is desirable that the Δnxd be small and that the fast minimum condition be used. As a matter of fact, the fast minimum condition has a deficiency that coloration of the display is great. Therefore, in the conventional reflective type monochrome display, a condition having a great Δnxd was used, such as Preferred Embodiment 32. Nevertheless, the coloration can be corrected somewhat by adjusting the color filters. In Preferred Embodiment 33, a display whereby the white was nearly colorless and there was substantially no change in coloration at any Δnxd by adjusting the color filters so as to have a high transmissivity at the long wavelength end.

The highest reflectivity is demonstrated when the Δnxd is 0.42, but the reflectivity corresponding to the Δnxd in this vicinity is shown below.

Thus, a bright display can be obtained by making the Δnxd greater than 0.34 μm and less than 0.52 μm.

When the Δnxd is less than 0.40 μm, a bright display can be obtained due to the visual angle being wide, but on the other hand, the brightness in the frontal direction is low, and under a spotlight it appears dark, so a Δnxd of 0.40 μm or more is desirable. Also, a great deal of coloration is lost on the extremes by making the Δnxd greater than 0.48 μm, so a Δnxd of 0.48 μm or less is desirable. The most desirable Δnxd is 0.42 μm, where the maximum brightness can be obtained.

Preferred Embodiment 34

Figure 52:
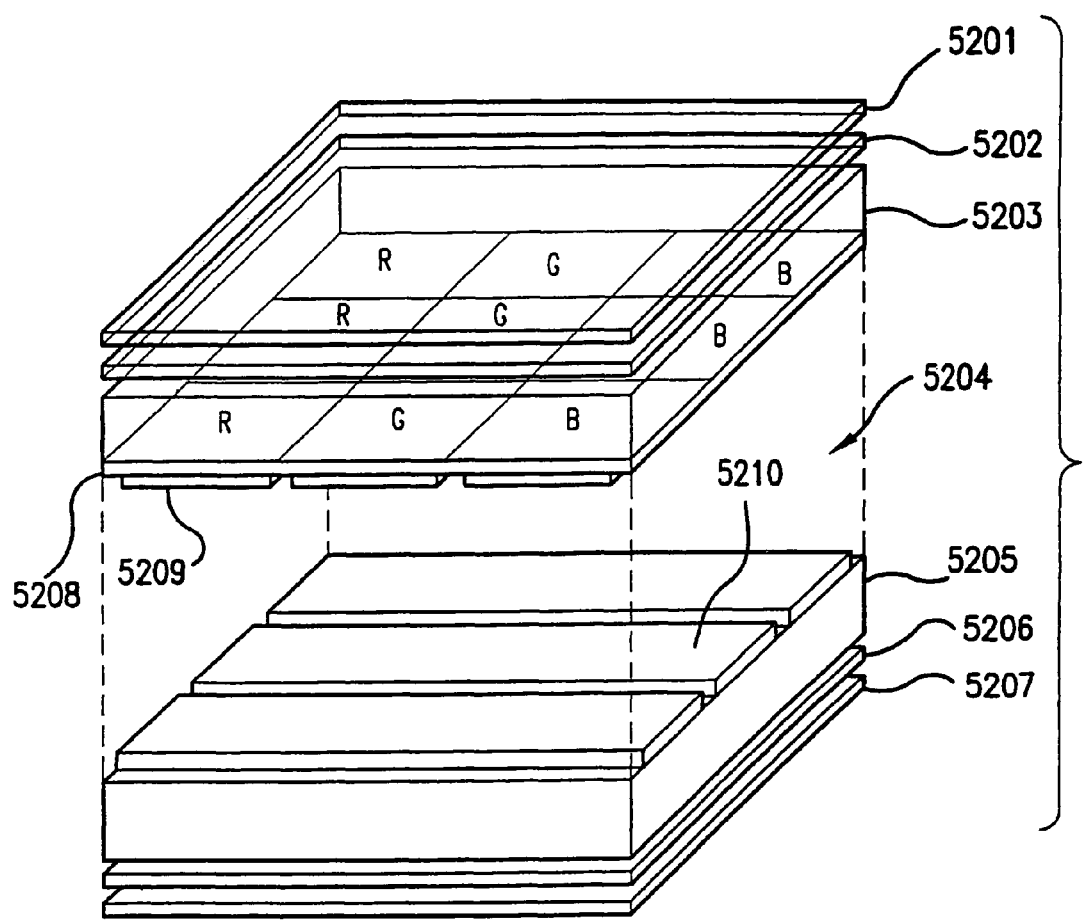
FIG. 52 is a drawing showing the essential components of the structure of a reflective type color liquid crystal device in preferred embodiment 34 of the present invention.

FIG. 52 is a drawing showing the essential components of a reflective type color liquid crystal device according to aspects of the present invention. First the configuration is explained. 5201 is the upper polarizing plate, 5202 is phase variation film, 5203 is the upper substrate, 5204 is the liquid crystals, 5205 is the lower substrate, 5206 is the lower polarizing plate, and 5207 is the scattering reflective plate. On the upper substrate 5203 are provided the color filters 5208 and the scanning electrodes 5209, and on the lower substrate are provided the signal electrodes 5210. The phase variation film 5202 is a single-axis extended polycarbonate film, and it shows a positive phase variation. Also the color filters have the identical spectral properties as FIG. 3 of Preferred Embodiment 2.

Figure 53:
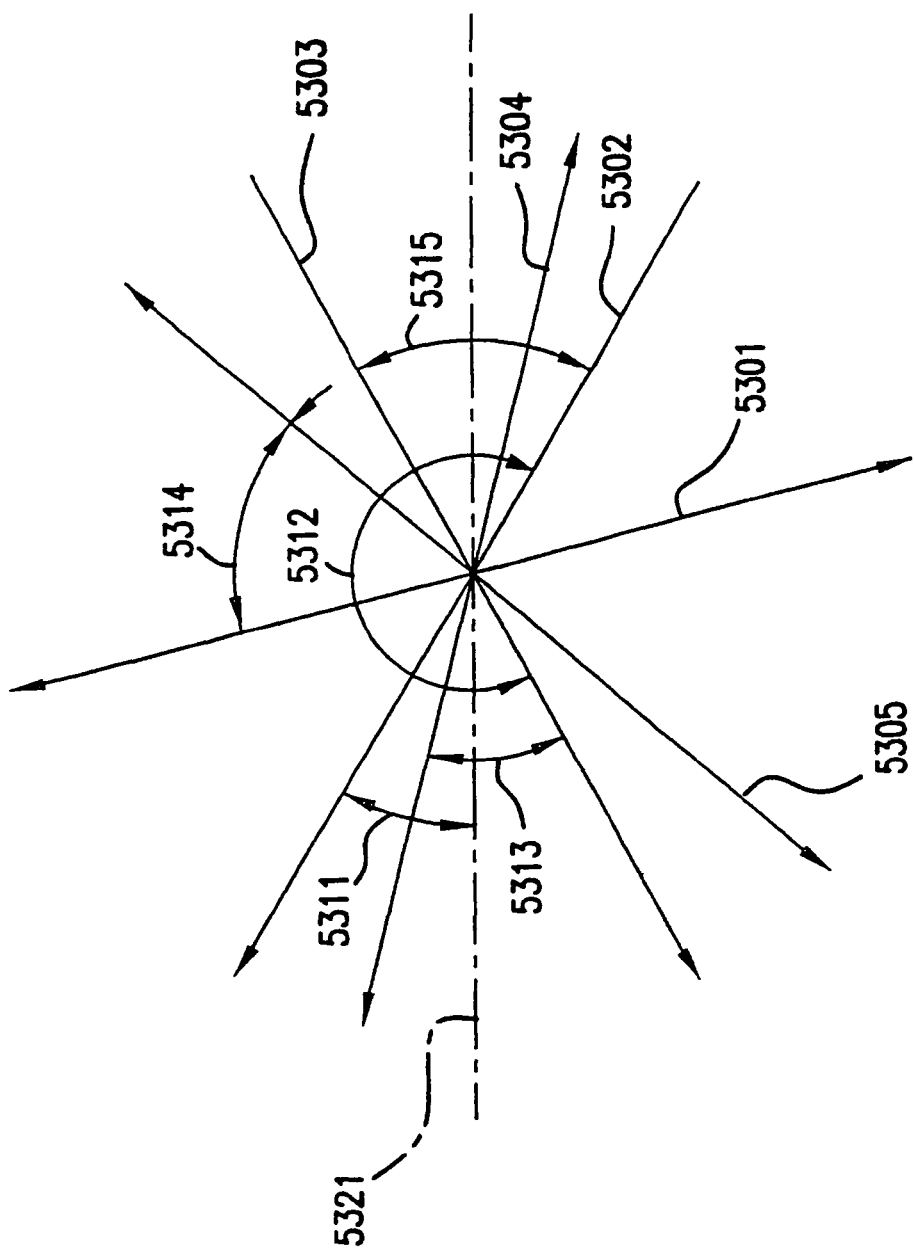
FIG. 53 is a drawing showing the relationships of each axis of a reflective type color liquid crystal device in preferred embodiments 34 and 35 of the present invention.

FIG. 53 is a drawing showing the relationships between each axis of the reflective type color liquid crystal device in Preferred Embodiment 34. 5321 is the left-right direction (lengthwise direction) of the liquid crystal panel, 5301 is the transmissive axial direction of the upper polarizing plate, 5302 is the rubbing direction of the upper substrate, 5303 is the rubbing direction of the lower substrate, 5304 is the transmissive axial direction of the lower polarizing plate, 5305 is the extended direction of the phase variation film. Here, the angle 5311 formed by the rubbing direction of the upper polarizing plate and the left-right direction of the liquid crystal panel was set to 30°, the angle 5314 formed by the transmissive axial direction of the upper polarizing plate and the extended direction of the phase variation film was set to 54°, the angle 5315 formed by the extended direction of the phase variation film and the rubbing direction of the upper polarizing plate was set to 80°, the angle 5312 of the twist of the liquid crystals was set to left 240°, and the angle 5313 formed by the transmissive axial direction of the lower polarizing plate and the rubbing direction of the lower substrate was set to 43°. If placed in such a manner, when the molecules of the center of the liquid crystal layer are voltage printed, they stand up from the side of the viewer (that is, the lower side of the drawing), and in conjunction with the visual angle properties of the TN liquid crystals, a high-contrast display not tending toward reflections becomes possible.

This is the phase variation plate compensating type STN mode proposed in the publication of Japanese Laid-Open Patent No. 3-50249, and it is characterized by the point that multiplexed driving up to a 1/480 duty ratio by a simple matrix is possible. Also, despite having the same color filters as Preferred Embodiment 2, the aperture is high only so long as signal wires and MIM elements are not required, and an extremely bright display is possible having a reflectivity of 33% during white display. The contrast ratio was 1:8, being comparatively low, but by adding one layer of phase variation film to perform compensation, and by performing multiple-line selective driving according to the method disclosed in the report of Japanese Laid-Open Patent No. 6-348230, it is possible to display with an equal contrast and equal color as the cases comprising MIM elements.

Preferred Embodiment 35

Figure 55:
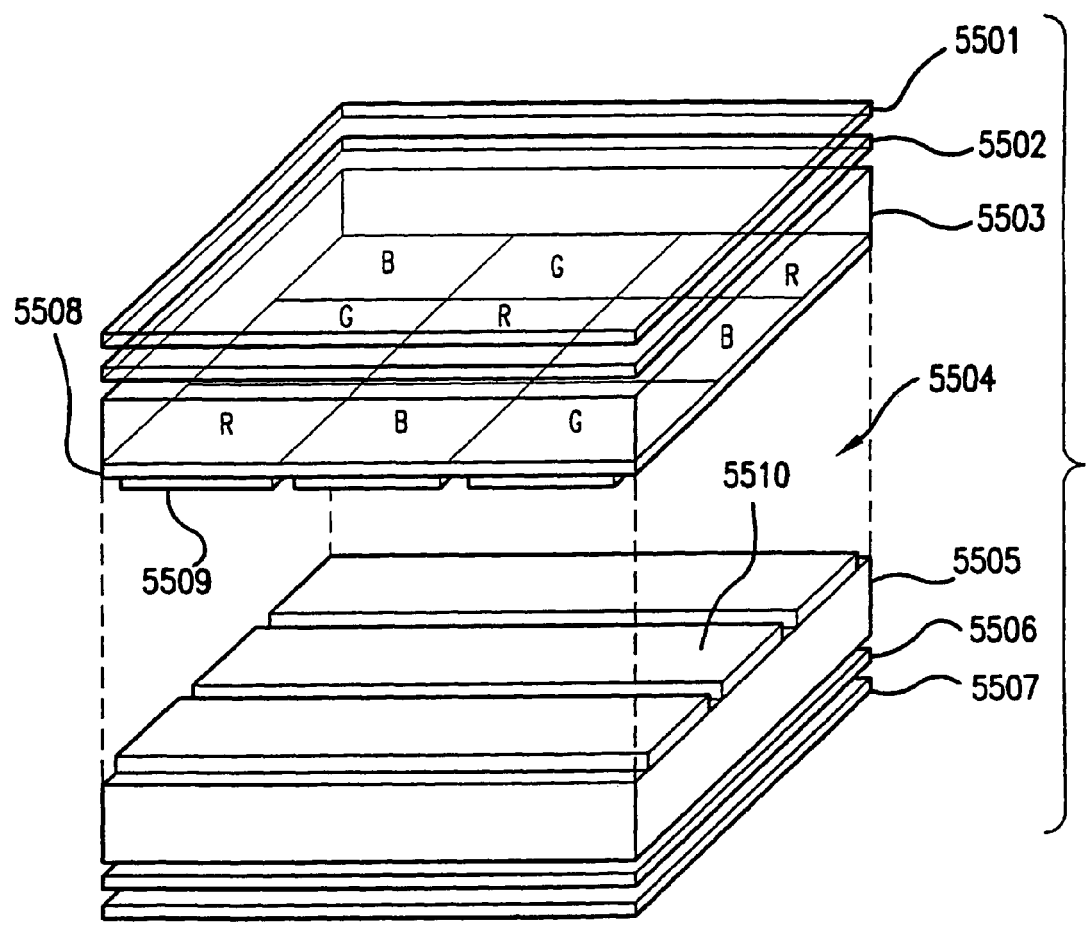
FIG. 55 is a drawing showing the essential components of the structure of a reflective type color liquid crystal device in preferred embodiment 35 of the present invention.

FIG. 55 is a drawing showing the essential components of a reflective type color liquid crystal device according to aspects of the present invention. First the configuration is explained. 5501 is the upper polarizing plate, 5502 is the phase variation film, 5503 is the upper substrate, 5504 is the liquid crystals, 5505 is the lower substrate, 5506 is the lower polarizing plate, and 5507 is the scattering reflective plate. On the upper substrate 5503 are provided the color filters 5508 and the scanning electrodes 5509, and on the lower substrate 5505 are provided the signal electrodes 5510. The phase variation film 5502 is a single-axis extended polycarbonate film, and it has a phase variation of positive 587 nm. The product $\Delta n \times d$ of the $\Delta n$ of the liquid crystals and the cell gap is 0.85 µm.

FIG. 53 is a drawing showing the relationships between each axis of the reflective type color liquid crystal device in Preferred Embodiment 35. 5321 is the left-right direction (lengthwise direction) of the liquid crystal panel, 5301 is the transmissive axial direction of the upper polarizing plate, 5302 is the rubbing direction of the upper substrate, 5303 is the rubbing direction of the lower substrate, 5304 is the transmissive axial direction of the lower polarizing plate, 5305 is the extended direction of the phase variation film. Here, the angle 5311 formed by the rubbing direction of the upper polarizing plate and the left-right direction of the liquid crystal panel was set to 30°, the angle 5314 formed by the transmissive axial direction of the upper polarizing plate and the extended direction of the phase variation film was set to 38°, the angle 5315 formed by the extended direction of the phase variation film and the rubbing direction of the upper polarizing plate was set to 92°, the angle 5312 of the twist of the liquid crystals was set to left 240°, and the angle 5313 formed by the transmissive axial direction of the lower polarizing plate and the rubbing direction of the lower substrate was set to 50°.

Figure 54:
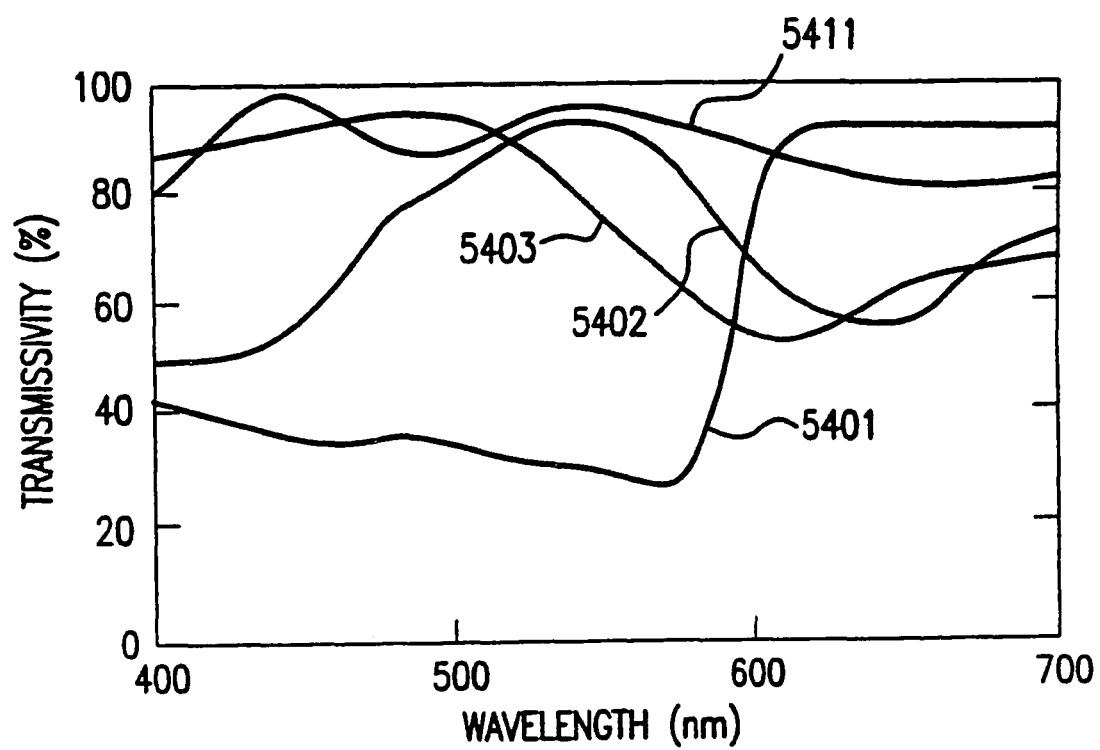
FIG. 54 is a drawing showing the spectral properties of the color filters of a reflective type color liquid crystal device in preferred embodiment 35 of the present invention.

FIG. 54 is a drawing showing the spectral properties of the color filters of the reflective type color liquid crystal device in Preferred Embodiment 35. The horizontal axis of FIG. 54 is the light wavelength, the vertical axis is the transmissivity, 5401 shows the spectrum of the red filter, 5402 shows the spectrum of the green filter, and 5403 shows the spectrum of the blue filter. The properties of these color filters are optimized such that the white balance can be taken from the spectral properties 5411 in the off state, when excluding the color filters from said liquid crystal device. Here, the green filter and the blue filter have transmissivities of 50% or more in the 450 nm to 660 nm wavelength range. Also, the lowest transmissivity of the red filter for the light of the wavelengths in the 450 nm to 660 nm range clearly is less compared with the blue filter and the green filter. By using such a red filter, it is possible to display brilliantly the red color which appeals most to the human eyes. Also, with the purpose of compensating the deepening of the red, the spectrum 5403 of the blue filter was made close to cyan.

This is the phase variation plate compensating type STN mode proposed in the publication of Japanese Laid-Open Patent No. 3-50249, and it is characterized by the point that multiplexed driving up to a 1/480 duty ratio by a simple matrix is possible. However, while the conventional phase variation compensating type STN mode can display black and white, it could only output cyan-ish white. As a matter of fact, the reflective type color liquid crystal device of Preferred Embodiment 35 became capable of displaying a white near perfect neutral more so than the conventional by having optimized the color filters. Also, despite having used color filters having similar properties as Preferred Embodiment 9, the aperture is high only so long as signal wires and MIM elements are not required, and an extremely bright display is possible having a reflectivity of 29% during white display.

Preferred Embodiment 36

Figure 56:
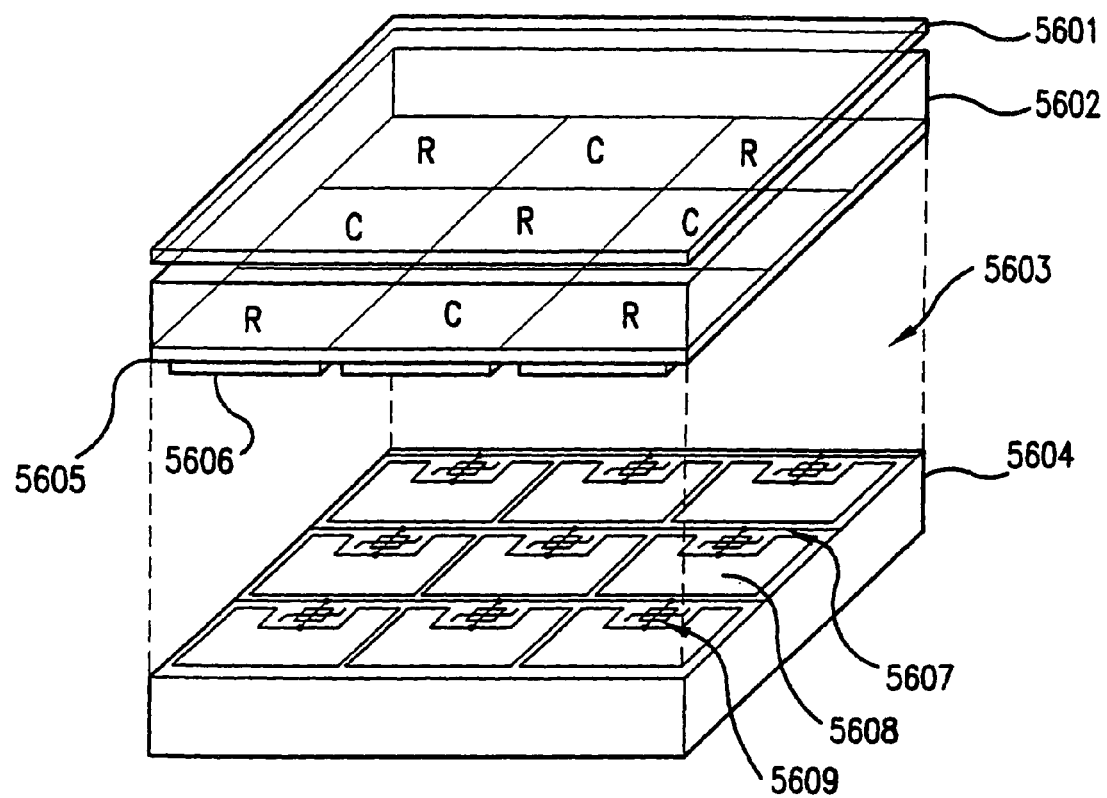
FIG. 56 is a drawing showing the essential components of the structure of a reflective type color liquid crystal device in preferred embodiment 36 of the present invention.

FIG. 56 is a drawing showing the essential elements of a reflective type color liquid crystal device according to aspects of the present invention. First the configuration is explained. 5601 is the upper polarizing plate, 5602 is the opposing substrate, 5603 is the liquid crystals, and 5604 is the element substrate. On the opposing substrate 5602 are provided the color filters 5605 and the opposing electrodes (scanning wires) 5606, and on the element substrate are provided the signal wires 5607, the pixel electrodes combined with the scattering reflective plate 5608, and the MIM elements 5609. The pixel electrodes combined with the scattering reflective plate used had irregularities applied mechanically and chemically to the surface of a metal aluminum sputtered film. Also, the color filters have the identical spectral properties as FIG. 3 of Preferred Embodiment 2.

Figure 57:
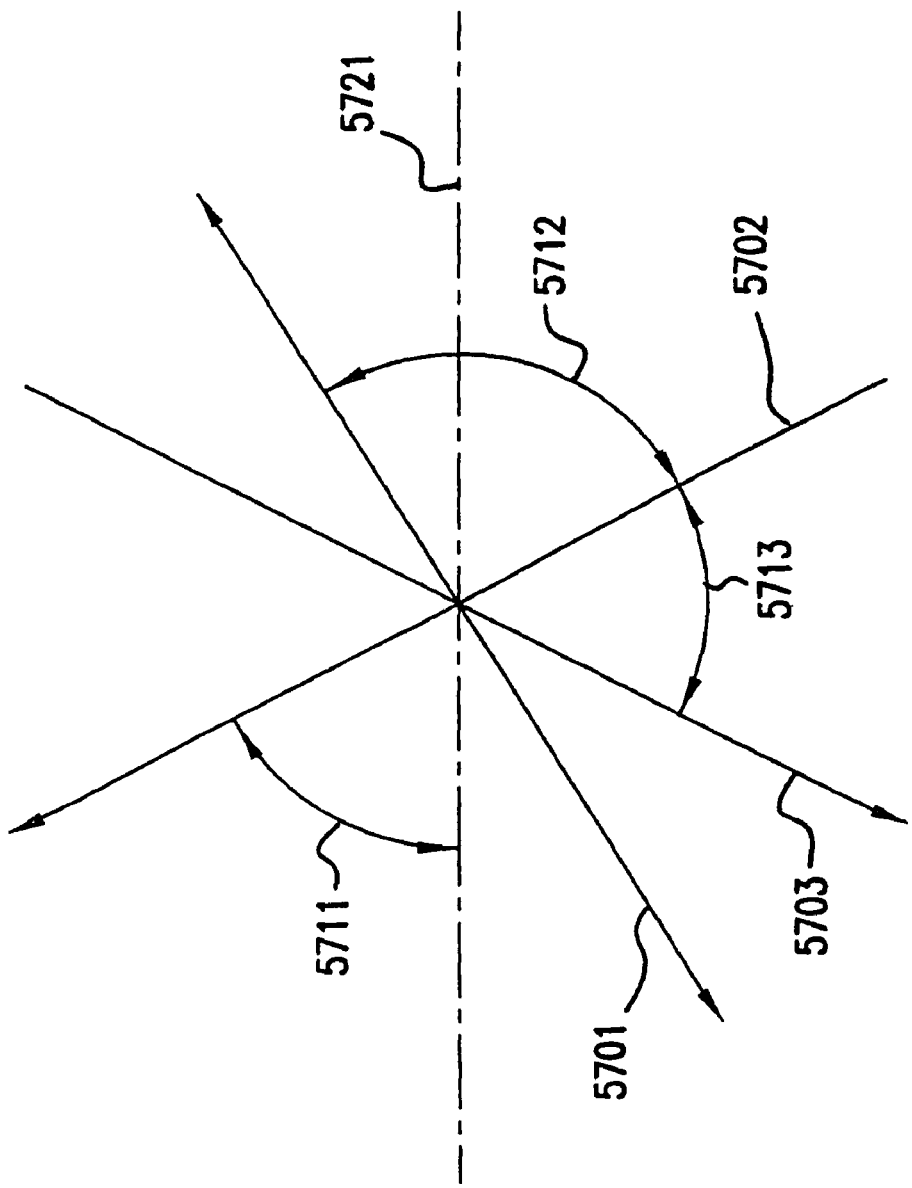
FIG. 57 is a drawing showing the relationships of each axis of a reflective type color liquid crystal device in preferred embodiment 36 of the present invention.

FIG. 57 is a drawing showing the relationships between each axis of the reflective type color liquid crystal device in Preferred Embodiment 36. 5721 is the left-right direction (lengthwise direction) of the liquid crystal panel, 5701 is the transmissive axial direction of the upper polarizing plate, 5702 is the rubbing direction of the upper substrate, and 5703 is the rubbing direction of the lower substrate. Here, the angle 5711 formed by the rubbing direction of the upper polarizing plate and the left-right direction of the liquid crystal panel was set to 62°, the angle 5712 formed by the transmissive axial direction of the upper polarizing plate and the rubbing direction of the upper substrate was set to 94°, and the angle 5713 of the twist of the liquid crystals was set to right 56°. If placed in such a manner, when the molecules of the center of the liquid crystal layer are voltage printed, they stand up from the side of the viewer (that is, the lower side of the drawing), and in conjunction with the visual angle properties of the TN liquid crystals, a high-contrast display becomes possible.

This is the single polarizing plate type nematic liquid crystal mode proposed by the publication of Japanese Laid-Open Patent No. 3-223715, and it is characterized by the point that a scattering reflective plate is provided in the position adjacent to the liquid crystals in order to be able to display high-contrast black and white without using a lower polarizing plate.

This reflective type color liquid crystal device had a reflectivity of 30% during white display and a contrast ratio of 1:10, it was capable of displaying the four colors, white, red, cyan, and black, the color of the red display was x=0.39, y=0.31, and the color of the cyan display was x=0.28, y=0.32. In its display there was no occurrence of reflections, and dependence on visual angle was extremely little. Also, because the light introduced through the red filter, for example, necessarily is emitted through the red filter, a bright, high-color purity display was possible without the occurrence of color contamination.

Figure 58:
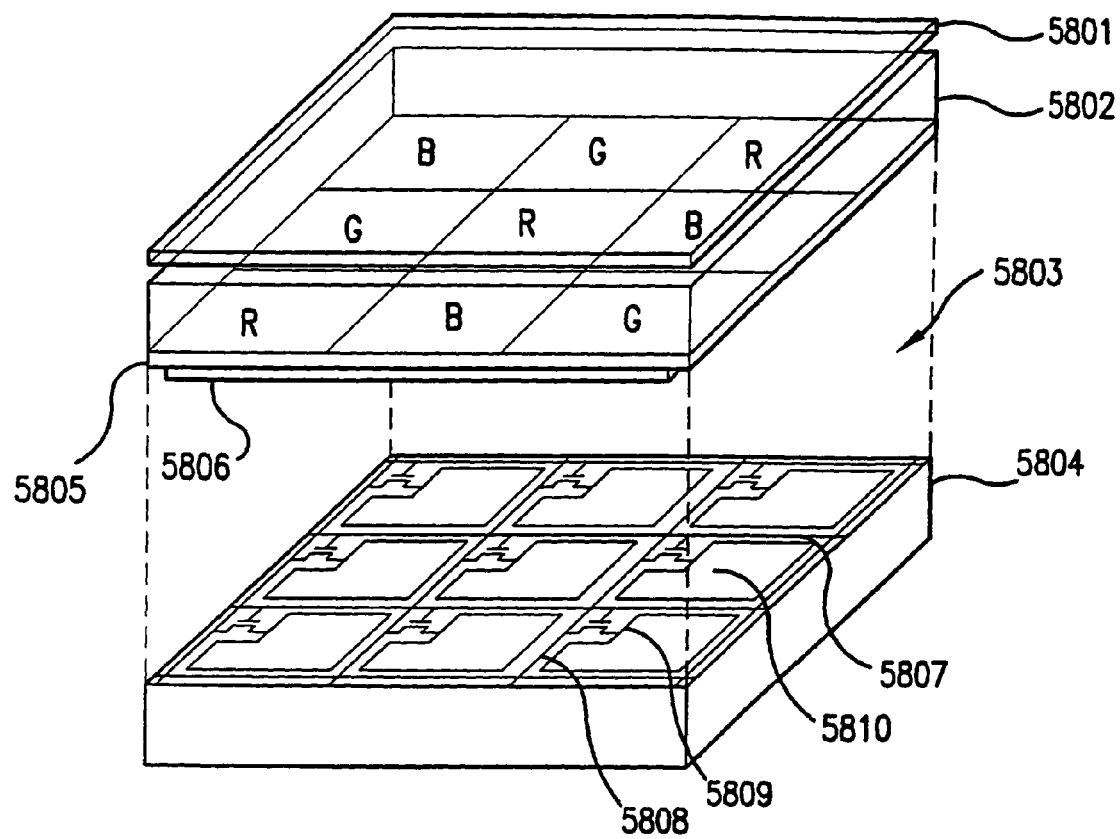
FIG. 58 is a drawing showing the essential components of the structure of a reflective type color liquid crystal device in preferred embodiment 36 of the present invention.

The above preferred embodiments used MIM elements, but TFT elements also may be used in place of them. FIG. 58 is a drawing showing the essential elements of the structure when having created, using TFT elements, a reflective type color liquid crystal device according to aspects of the present invention. First the configuration is explained. 5801 is the upper polarizing plate, 5802 is the opposing substrate, 5803 is the liquid crystals, and 5804 is the element substrate. On the opposing substrate 5802 are provided the color filters 5805 and the opposing electrodes (common electrodes) 5806, and on the element substrate 5804 are provided gate signal wires 5807, source signal wires 5808, the TFT elements 5809, and the pixel electrodes combined with the scattering reflective plate 5810. In the case of MIM elements, metallic wiring only ran in the up and down directions, but with TFT elements, because the metallic wiring runs up and down as well as left and right, the aperture decreases. Fortunately, in this Preferred Embodiment 37 there is no need for a lower polarizing plate. Thus, when using TFT elements, it is desirable to provide an insulating film on the element and signal wire layers, on top of that to provide anew a reflective plate combined with pixel electrodes, and to take a method to connect the two via a contact hole.

Preferred Embodiment 37

Preferred Embodiment 37 relates to a reflective type color liquid crystal device according to aspects of the present invention, but first will be introduced six examples of reflective type monochrome liquid crystal devices. Any of these can be used as a reflective type color liquid crystal device by adding color filters.

First Example

Figure 59:
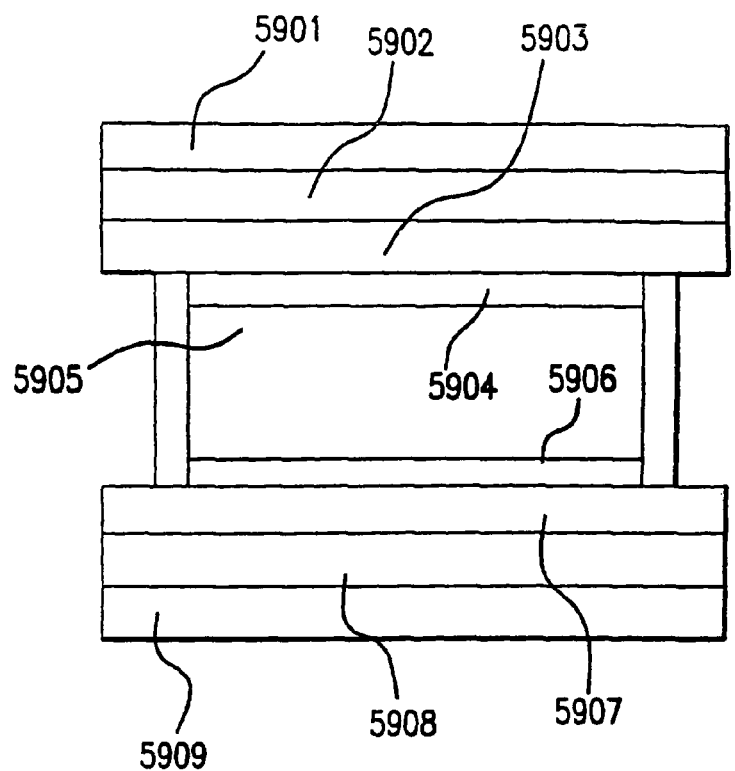
FIG. 59 is a drawing showing the essential components of the structure of a reflective type color liquid crystal device in preferred embodiments 37 and 39 of the present invention.

FIG. 59 is a cross section drawing of a reflective type liquid crystal device in the first example. First the configuration is explained. 5901 is the scattering plate, 5902 is the upper polarizing plate, 5903 is the upper substrate, 5904 is the upper electrodes, 5905 is the liquid crystals, 5906 is the lower electrodes, 5907 is the lower substrate, 5908 is the lower polarizing plate, and 5909 is the mirror reflective plate. The liquid crystals 5905 are twisted 90 degrees in the cells, and are TN mode, whereby the absorption axes of the polarizing plates 5902 and 5908 coincide with the lag phase axes of the liquid crystals 5 of the adjacent boundaries. The product Δnxd of the thickness d of the liquid crystals 5905 and the multiple refractivity Δn is 0.48 μm.

The reflective type liquid crystal device above had a brightness of 25% and a contrast of 1:15 during white display in a room in the normal line direction of the substrates, and a brightness of 45% and a contrast of 1:12 in the regular reflective direction of a ceiling lamp. Even in the regular reflective direction, there is no reflection of the ceiling lamp due to the effect of the back scattering of the scattering plate, and a high contrast can be obtained.

Thus, because the light of the regular reflective direction can be used effectively while preserving a sufficient contrast, a very bright display can be obtained.

Second Example

Figure 60:
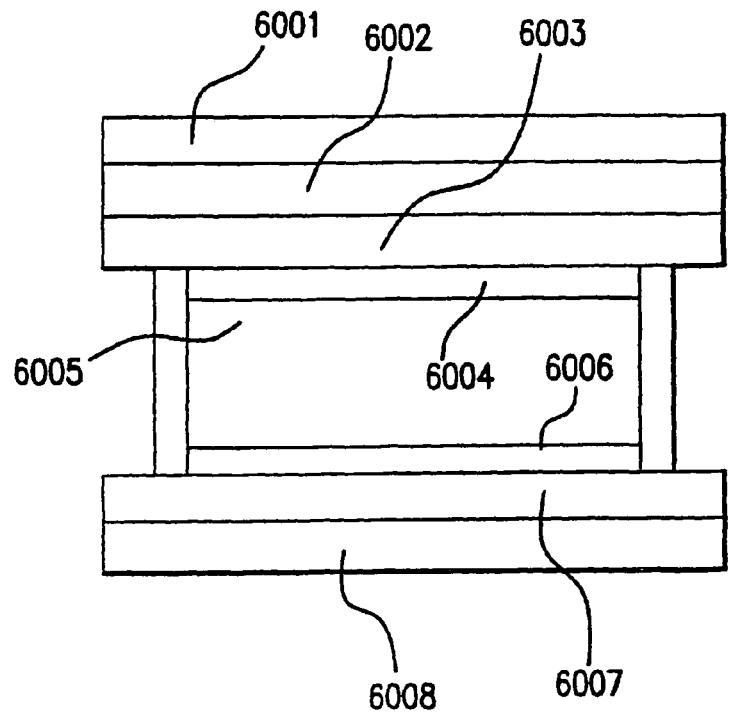
FIG. 60 is a drawing showing the essential components of the structure of a reflective type color liquid crystal device in preferred embodiment 37 of the present invention.

FIG. 60 is a cross section drawing of reflective type liquid crystal devices No. 1 to No. 3 in the second example. 6001 is the scattering plate, 6002 is the upper polarizing plate, 6003 is the upper substrate, 6004 is the upper electrodes, 6005 is the liquid crystals, 6006 is the lower electrodes, 6007 is the lower substrate, and 6008 is the mirror reflective plate.

Figure 61:
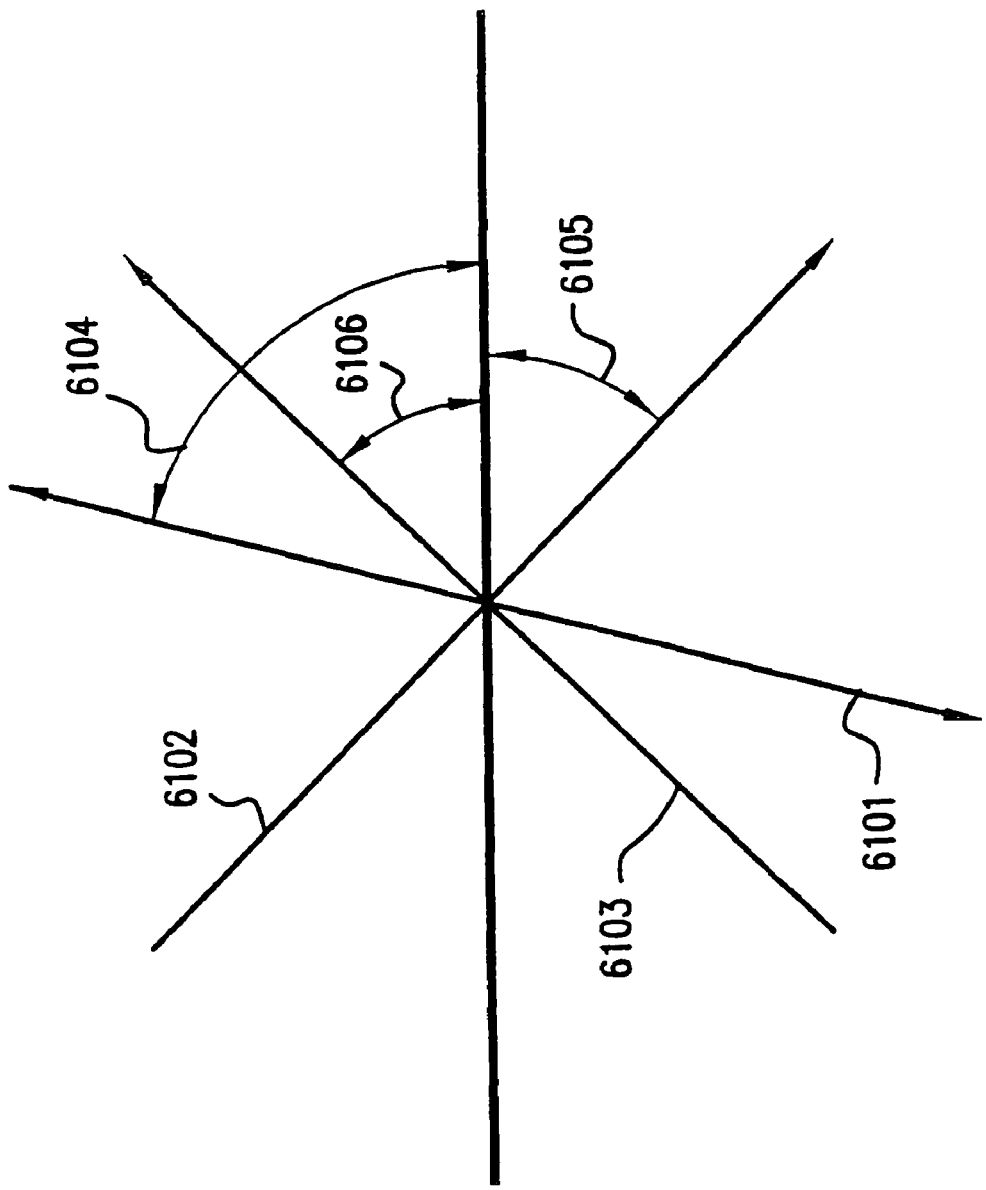
FIG. 61 is a drawing showing the relationships of each axis of a reflective type color liquid crystal device in preferred embodiments 37 and 38 of the present invention.

FIG. 61 shows the axial directions of the polarizing plates, and the like, of the reflective type liquid crystal devices No. 1 to No. 3 in the second example. 6101 is the transmissive axial direction of the upper polarizing plate 6002, 6103 is the rubbing direction of the upper substrate 6003, 6103 is the rubbing direction of the lower substrate 6007, 6104 is the angle θ1 of the transmissive axial direction 6101 of the upper polarizing plate 6002 with the horizontal level, 6105 is the angle θ2 of the rubbing direction 6102 of the upper substrate 6003 with the horizontal level, and 6106 is the angle θ3 of the rubbing direction 6103 of the lower substrate 6007 with the horizontal level. The angles are positive counterclockwise, and are shown from −180° to 180°.

Figure 62:
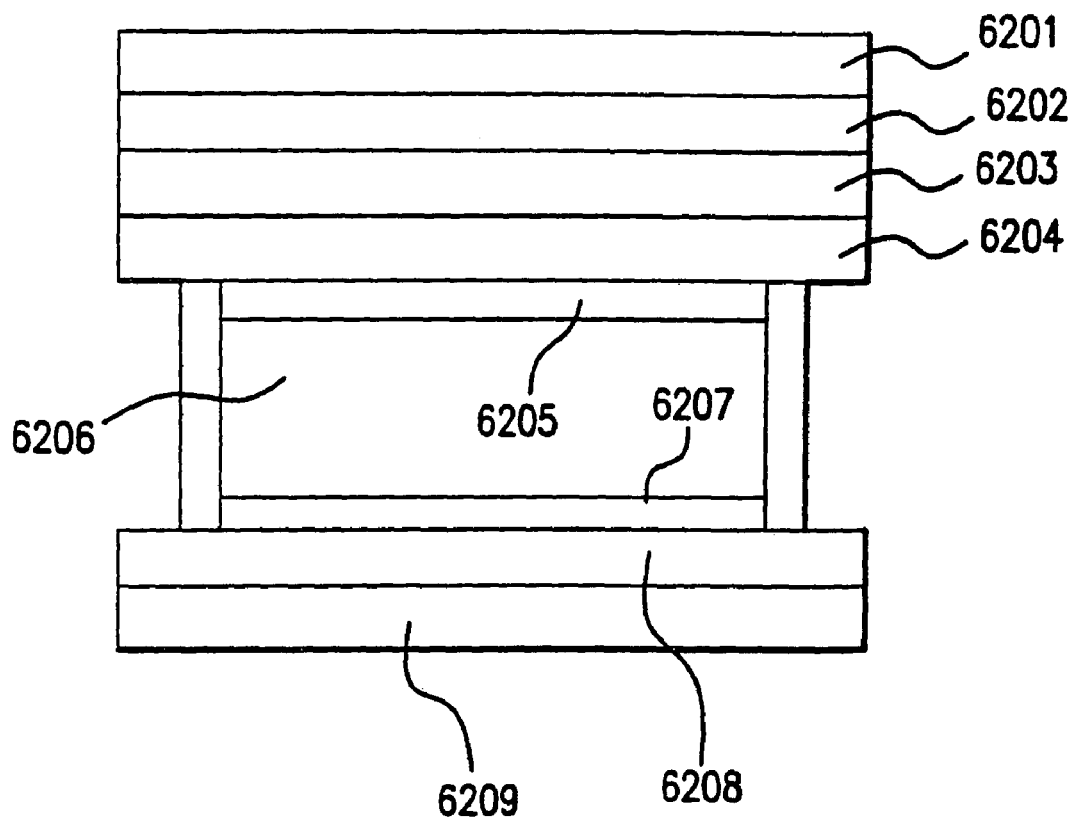
FIG. 62 is a drawing showing the essential components of the structure of a reflective type color liquid crystal device in preferred embodiment 37 of the present invention.

FIG. 62 is a cross section drawing of reflective type liquid crystal devices No. 4 to No. 6 in the second example. 6201 is the scattering plate, 6202 is the upper polarizing plate, 6203 is the phase variation plate, 6204 is the upper substrate, 6205 is the upper electrodes, 6206 is the liquid crystals, 6207 is the lower electrodes, 6208 is the lower substrate, and 6209 is the mirror reflective plate.

Figure 63:
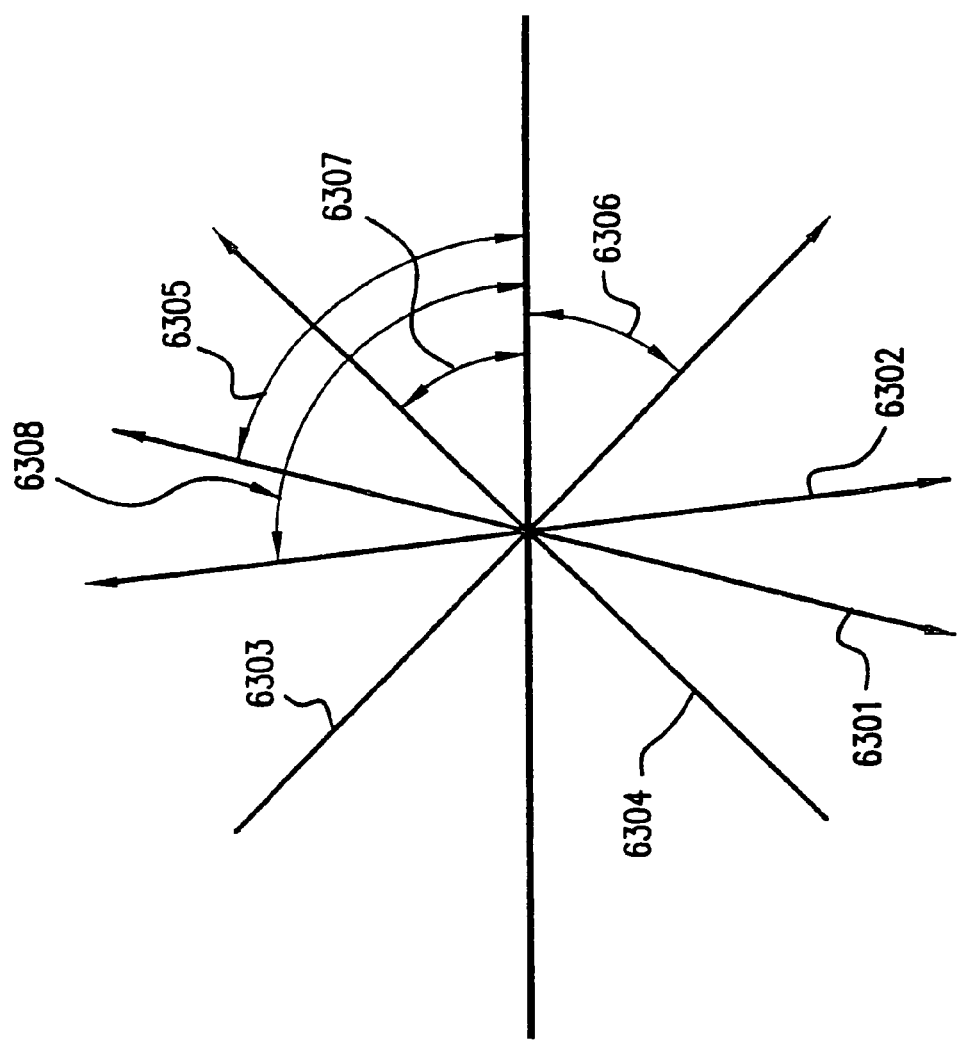
FIG. 63 is a drawing showing the relationships of each axis of a reflective type color liquid crystal device in preferred embodiments 37 and 38 of the present invention.

FIG. 63 shows the axial directions of the polarizing plates, and the like, of the reflective type liquid crystal devices No. 4 to No. 6 in the second example. 6301 is the transmissive axial direction of the upper polarizing plate 6202, 6302 is the lag phase axial direction of the phase variation plate 6203, 6303 is the rubbing direction of the upper substrate 6204, 6304 is the rubbing direction of the lower substrate 6208, 6305 is the angle B1 of the transmissive axial direction 6301 of the upper polarizing plate 6202 with the horizontal level, 6306 is the angle θ2 of the rubbing direction 6303 of the upper substrate 6204 with the horizontal level, 6307 is the angle θ3 of the rubbing direction 6304 of the lower substrate 6208 with the horizontal level, and 6308 is the angle θ4 of the lag phase axial direction 6302 of the phase variation plate 6203.

These angular conditions and the values of the Δnxd of the liquid crystal cells and the phase variation of the phase variation plates are shown in the table below. The units of the Δnxd and the phase variation are in μm.

These properties are shown in the table below.

A sufficient contrast and bright display can be obtained in the same manner as the first example.

Comparative Example of the First Example and the Second Example

Figure 64:
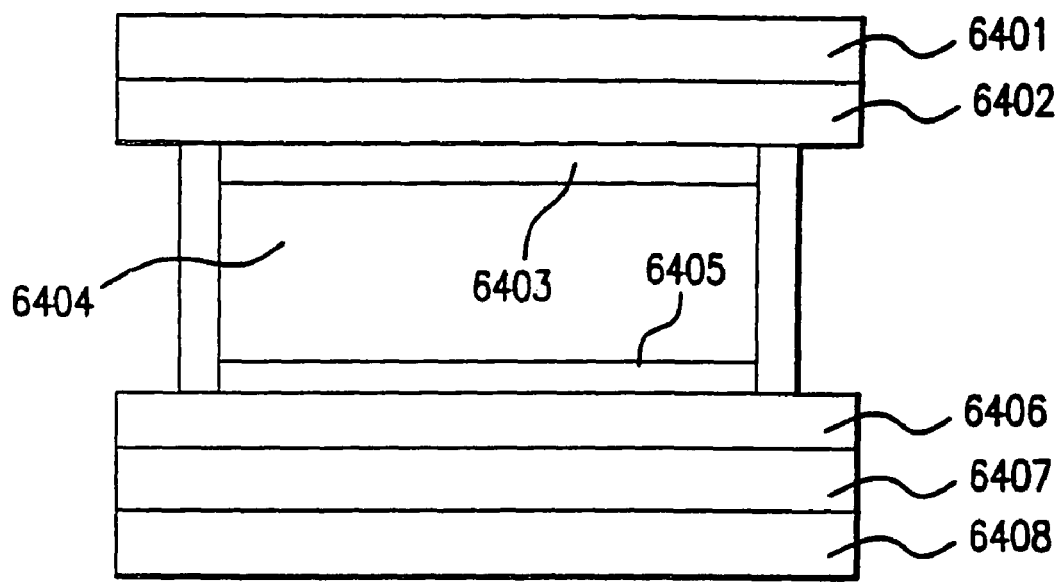
FIG. 64 is a drawing showing the essential components of the structure of a reflective type color liquid crystal device in preferred embodiment 37 of the present invention.

FIG. 64 shows a cross section of the reflective type liquid crystal device in a comparative example. 6401 is the upper polarizing plate, 6402 is the upper substrate, 6403 is the upper electrodes, 6404 is the liquid crystals, 6405 is the lower electrodes, 6406 is the lower substrate, 6407 is the lower polarizing plate, and 6408 is the scattering reflective plate. The liquid crystals 6404 are twisted 90 degrees in the cells in the same manner as the first example, and are TN mode, whereby the absorption axes of the polarizing plates 6401 and 6407 coincide with the lag phase axes of the liquid crystals 5 of the adjacent boundaries. The product Δnxd of the thickness d of the liquid crystals 6404 and the multiple refractivity Δn is 0.48 μm.

The reflective type liquid crystal device of the above configuration had a brightness of 28% and a contrast of 1:15 during white display in a room in the normal line direction of the substrates, but in the regular reflective direction of a ceiling lamp, the brightness of the white display became 62% and the contrast became 1:2 due to the reflection of the ceiling light, and it could not stand to practical use.

Third Example

Figure 65:
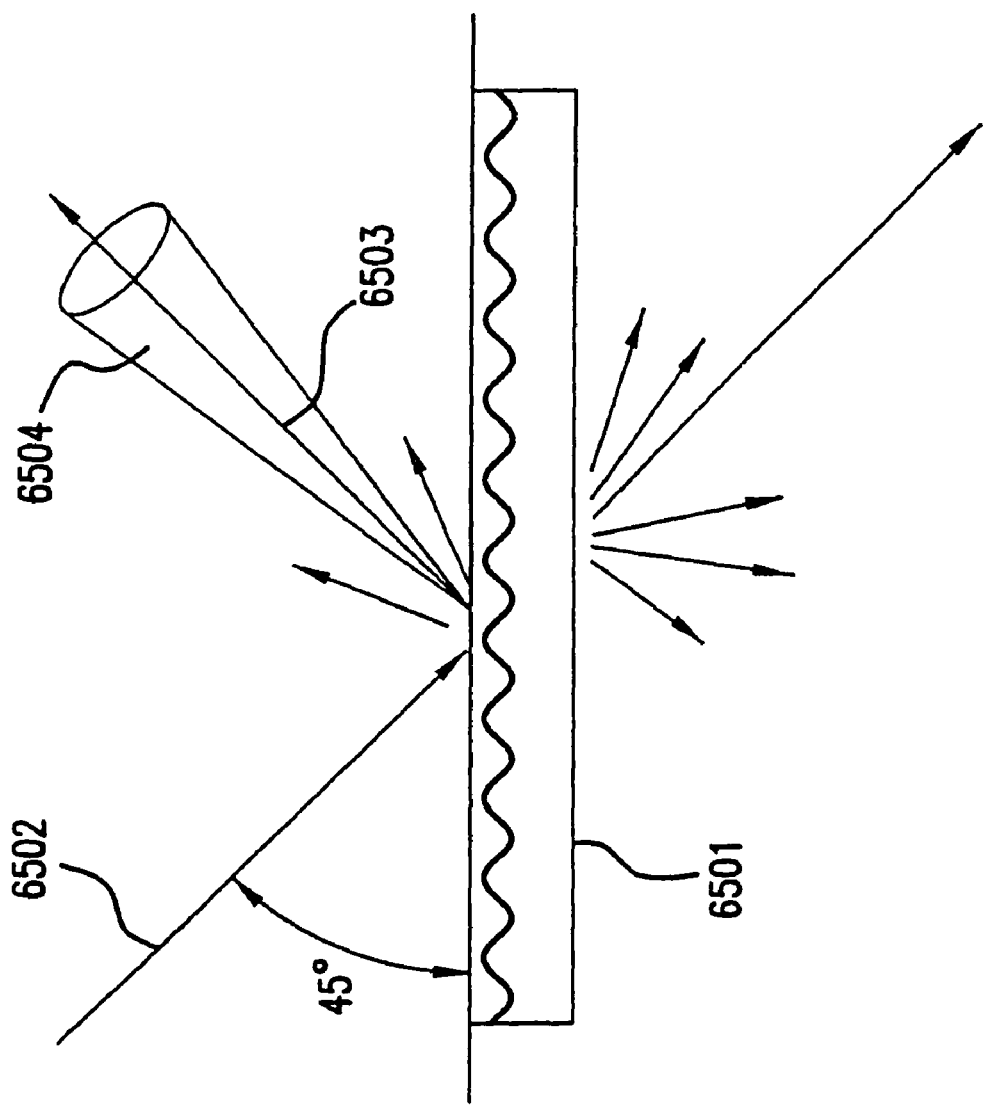
FIG. 65 is a drawing showing the scattering properties of the scattering plate of a reflective type color liquid crystal device in preferred embodiment 37 of the present invention.

FIG. 65 is a drawing showing the properties of the scattering plate of a reflective type liquid crystal device in the third example. In FIG. 65, 6501 is the scattering plate, 6502 is the introduced light, 6503 is the regularly reflected light, and

6504 is a 10° cone centered on the regularly reflected light 6503. The scattering plate 6501 of the third example has 5% of the introduced light be scattered in the 10° cone.

A scattering plate having the above properties was obtained, as in Shingaku Giho EID95-146, by creating forward scattering by mixing of particles having refractivities different from the medium, and adjusting the back scattering by providing minute irregularities on the surface. If this scattered light is greater than 10%, reflection of the light source becomes greater and the contrast decreases. Conversely, if it is less than 0.5%, fading of the display becomes too much.

Also, the configuration of the present preferred embodiment is identical to the configuration shown in FIG. 59 of the first example, the liquid crystals 5905 are twisted 90 degrees in the cells, and are TN mode, whereby the absorption axes of the polarizing plates 5902 and 5908 coincide with the lag phase axes of the liquid crystals 5905 of the adjacent boundaries. The product Δnxd of the thickness d of the liquid crystals 5905 and the multiple refractivity Δn is 0.48 μm.

The reflective type liquid crystal device above had a brightness of 26% and a contrast of 1:15 during white display in a room in the normal line direction of the substrates, and a brightness of 43% and a contrast of 1:13 in the regular reflective direction of a ceiling lamp.

Fourth Example

The scattering plate shown in FIG. 65 of the third example was applied to the configuration of FIG. 60 and FIG. 62 of the second example.

The directions of all the axes and the Δnxd and phase variation of the liquid crystals shown in FIG. 61 and FIG. 63 were set identically to the second example. The properties are shown in the table below.

A sufficient contrast and bright display can be obtained in the same manner as Preferred Embodiment 1.

Fifth Example

Figure 66:
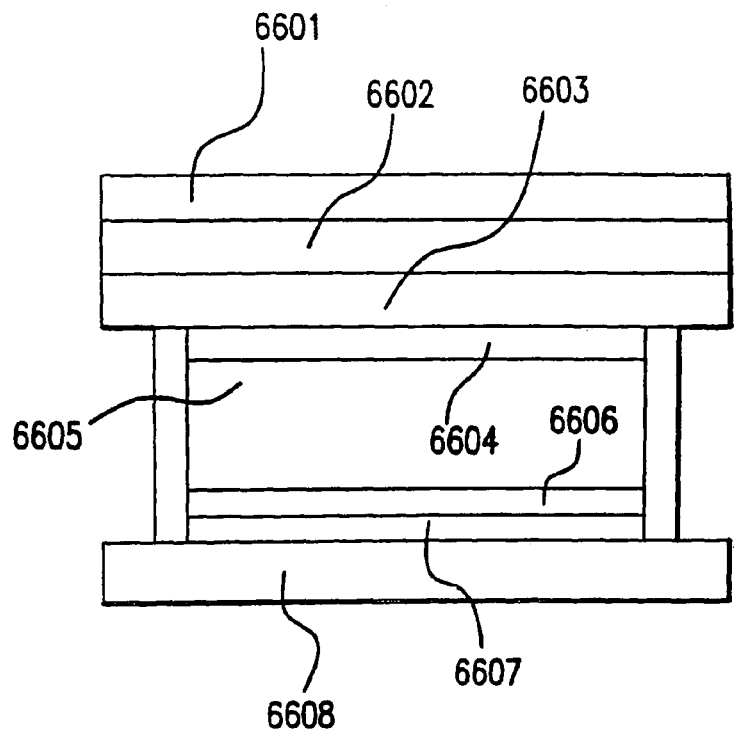
FIG. 66 is a drawing showing the essential components of the structure of a reflective type color liquid crystal device in preferred embodiment 37 of the present invention.

FIG. 66 is a cross section drawing of a reflective type liquid crystal device in the fifth example. First the configuration is explained. 6601 is the scattering plate, 6602 is the upper polarizing plate, 6603 is the upper substrate, 6604 is the upper electrodes, 6605 is the liquid crystals, 6606 is the lower polarizing plate, 6607 is the lower electrodes and mirror reflective plate, and 6608 is the lower substrate. The liquid crystals 6605 are twisted 90 degrees in the cells, and are TN mode, whereby the absorption axes of the polarizing plates 6602 and 6606 coincide with the lag phase axes of the liquid crystals 5 of the adjacent boundaries. The product Δnxd of the thickness d of the liquid crystals 6605 and the multiple refractivity Δn is 0.48 μm. On the lower electrodes was vapor deposited aluminum, and the polarizing plates were obtained by painting and orienting a crystalline polymer solution containing a black dichromatic dye on a polyimide orientation film. For the scattering plate, the same things as the third example were used.

The reflective type liquid crystal device above had a brightness of 28% and a contrast of 1:18 during white display in a room in the normal line direction of the substrates, and a brightness of 44% and a contrast of 1:16 in the regular reflective direction of a ceiling lamp.

Sixth Example

Figure 67:
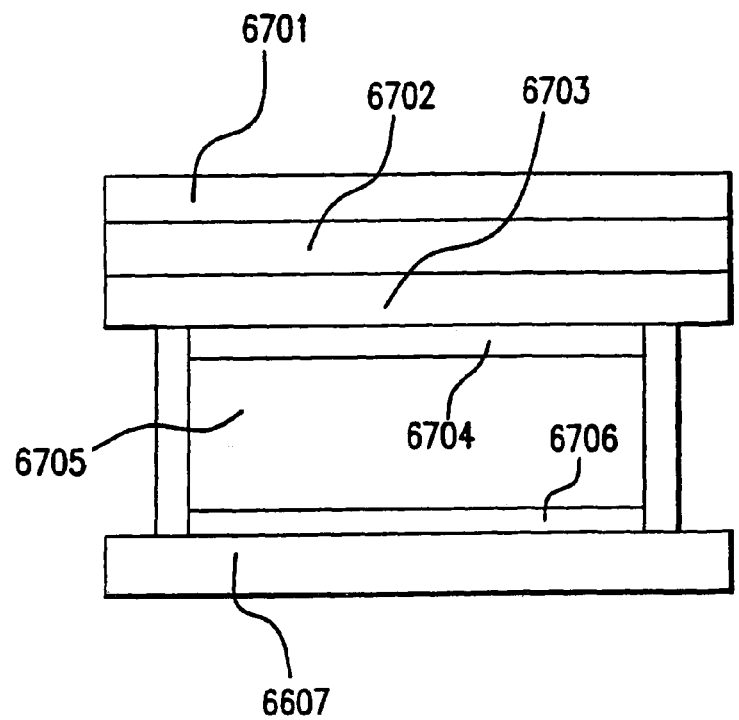
FIG. 67 is a drawing showing the essential components of the structure of a reflective type color liquid crystal device in preferred embodiment 37 of the present invention.

FIG. 67 is a cross section drawing of a reflective type liquid crystal devices No. 1 to No. 3 in the sixth example. 6701 is the scattering plate, 6702 is the upper polarizing plate, 6703 is the upper substrate, 6704 is the upper electrodes, 6705 is the liquid crystals, 6706 is the lower electrodes and mirror reflective plate, and 6707 is the lower substrate.

FIG. 61 shows the axial directions of the polarizing plates, and the like, of the reflective type liquid crystal devices No. 1 to No. 3 in the sixth example. 6101 is the transmissive axial direction of the upper polarizing plate 6002, 6103 is the rubbing direction of the upper substrate 6003, 6103 is the rubbing direction of the lower substrate 6007, 6104 is the angle θ1 of the transmissive axial direction 6101 of the upper polarizing plate 6002 with the horizontal level, 6105 is the angle θ2 of the rubbing direction 6102 of the upper substrate 6003 with the horizontal level, and 6106 is the angle θ3 of the rubbing direction 6103 of the lower substrate 6007 with the horizontal level.

Figure 68:
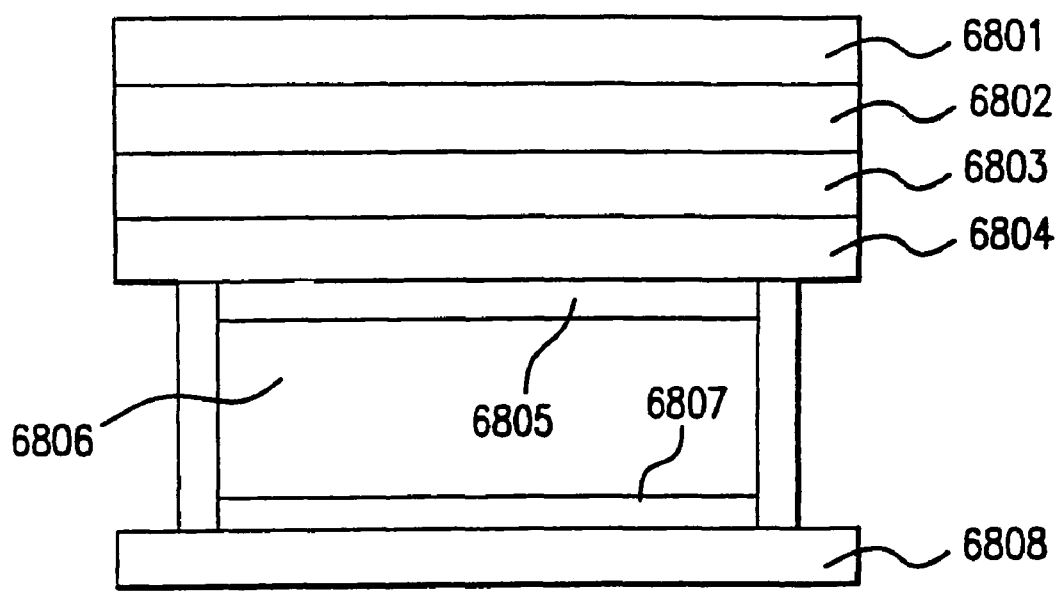
FIG. 68 is a drawing showing the essential components of the structure of a reflective type color liquid crystal device in preferred embodiment 37 of the present invention.

FIG. 68 is a cross section drawing of reflective type liquid crystal devices No. 4 to No. 6 in the sixth example. 6801 is the scattering plate, 6802 is the upper polarizing plate, 6803 is the phase variation plate, 6804 is the upper substrate, 6805 is the upper electrodes, 6806 is the liquid crystals, 6807 is the lower electrodes and mirror reflective plate, and 6808 is the lower substrate.

FIG. 63 shows the axial directions of the polarizing plates, and the like, of the reflective type liquid crystal devices No. 4 to No. 6 in the sixth example. 6301 is the transmissive axial direction of the upper polarizing plate 6202, 6302 is the lag phase axial direction of the phase variation plate 6203, 6303 is the rubbing direction of the upper substrate 6204, 6304 is the rubbing direction of the lower substrate 6208, 6305 is the angle θ1 of the transmissive axial direction 6301 of the upper polarizing plate 6202 with the horizontal level, 6306 is the angle θ2 of the rubbing direction 6303 of the upper substrate 6204 with the horizontal level, 6307 is the angle θ3 of the rubbing direction 6304 of the lower-substrate 6208 with the horizontal level, and 6308 is the angle θ4 of the lag phase axial direction 6302 of the phase variation plate 6203.

The conditions of the angles and the values of the Δnxd of the liquid crystal cells and the phase variation of the phase variation plates are the same as Table 4 shown in the second example. Also, for the scattering plate, the same things as the third example were used.

The properties of the reflective type liquid crystal device of the above configuration are shown in the table below.

A sufficient contrast and bright display can be obtained for all of these.

All of the six reflective type monochrome liquid crystal display devices shown above can be used as reflective type color liquid crystal display devices by adding color filters, but next is shown one example of them.

Figure 69:
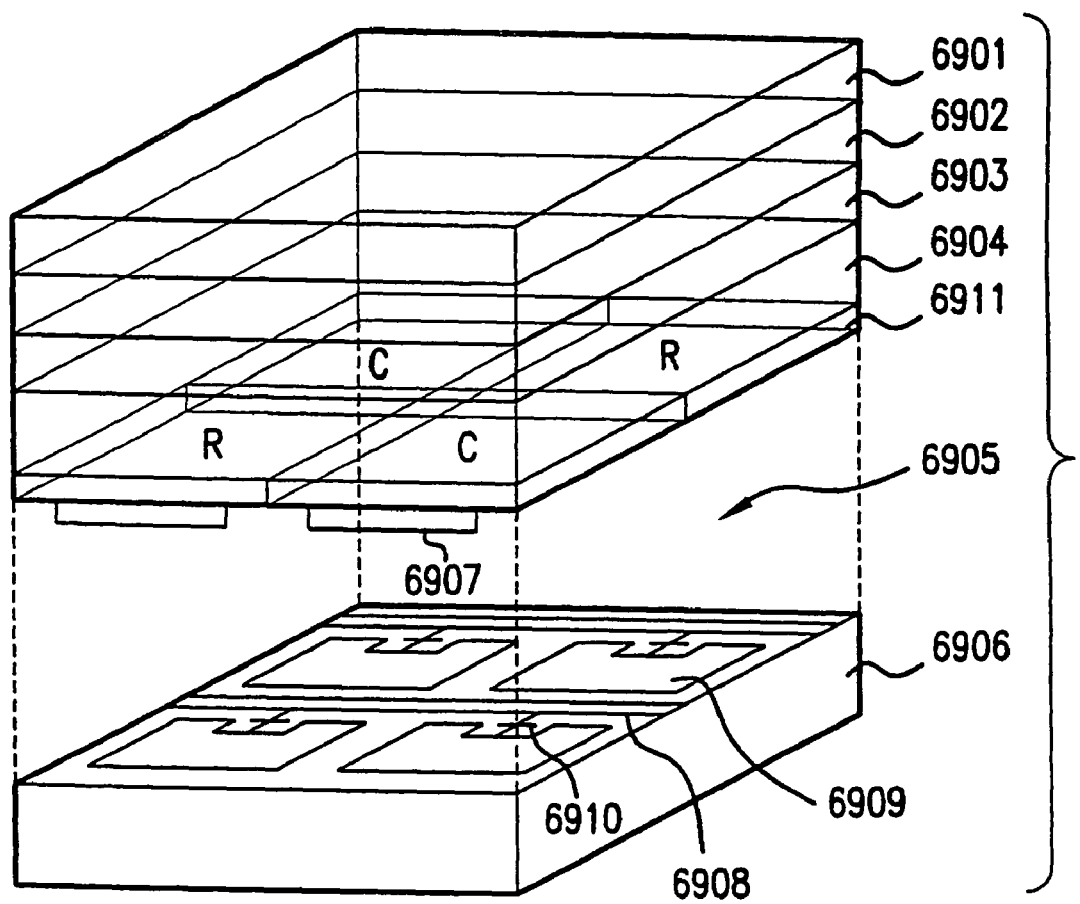
FIG. 69 is a drawing showing the essential components of the structure of a reflective type color liquid crystal device in preferred embodiment 37 of the present invention.

FIG. 69 is a drawing showing the essential components of a reflective type color liquid crystal display according to aspects of the present invention. 6901 is the scattering plate, 6902 is the upper polarizing plate, 6903 is the phase variation plate, 6904 is the upper substrate, 6905 is the liquid crystals, 6906 is the lower substrate, 6907 is the opposing electrodes (scanning wires), 6908 is the signal wires, 6909 is the pixel electrodes and mirror reflective plate, 6910 is the MIM elements, and 6911 is the color filters. The intervals between pixel and pixel were perpendicular to the signal wires and were 160 μm in both parallel directions, the width of the signal wires was 10 μm, the gaps between the signal wires and the pixel electrodes were 10 μm, and the intervals between adjacent pixel electrode and pixel electrode were 10 μm.

FIG. 63 shows the axial directions of the polarizing plates, and the like. 6301 is the transmissive axial direction of the upper polarizing plate 6202, 6302 is the lag phase axial direction of the phase variation plate 6203, 6303 is the rubbing direction of the upper substrate 6204, 6304 is the rubbing direction of the lower substrate 6208, 6305 is the angle θ1 of the transmissive axial direction 6301 of the upper polarizing plate 6202 with the horizontal level, 6306 is the angle θ2 of the rubbing direction 6303 of the upper substrate 6204 with the horizontal level, 6307 is the angle θ3 of the rubbing direction 6304 of the lower substrate 6208 with the horizontal level, and 6308 is the angle θ4 of the lag phase axial direction 6302 of the phase variation plate 6203.

The Δnxd of the liquid crystals 6905 was set to 0.33 μm, θ1 was set to −82°, θ2 was set to −74°, θ3 was set to 74°, θ4 was set to 9°, the phase variation of the phase variation plate 6903 was set to 0.31 μm, and orientation processing was applied on the signal wires 6908 in the same manner as on the mirror reflective plate 6909.

For the scattering plate was used the same thing as the scattering plate of the third example. Also, for the color filters were used cyan (C in the drawing) and red (R in the drawing) color filters having an average transmissivity of 75%.

The reflective type liquid crystal devices of the above configuration had a brightness of 30% and a contrast of 1:15 during white display in a room in the normal line direction of the substrates, and a brightness of 51% and a contrast of 1:12 in the regular reflective direction of a ceiling lamp. For all of them the display colors were x=0.39, y=0.32 for red, and x=0.28, y=0.31 for cyan. The colors can be recognized sufficiently, and they are bright colors.

Preferred Embodiment 38

Preferred Embodiment 38 relates to a reflective type color liquid crystal device according to aspects of the present invention, but first will be introduced two examples of reflective type monochrome liquid crystal devices. Either of these can be used as a reflective type color liquid crystal device by adding color filters.

First Example

Figure 70:
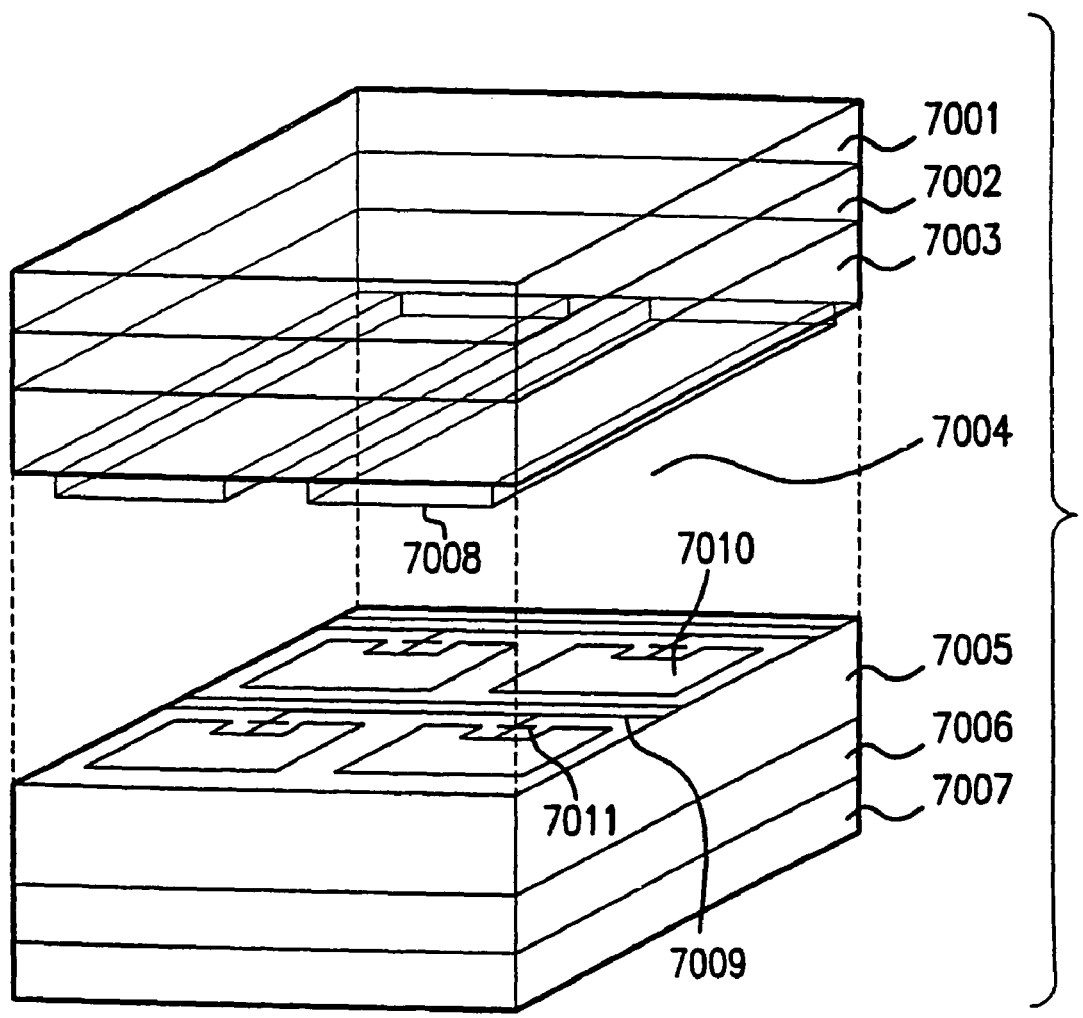
FIG. 70 is a drawing showing the essential components of the structure of a reflective type color liquid crystal device in preferred embodiment 38 of the present invention.

FIG. 70 is a drawing showing the essential components of the reflective type color liquid crystal display of the first example. 7001 is the scattering plate, 7002 is the upper polarizing plate, 7003 is the upper substrate, 7004 is the liquid crystals, 7005 is the lower substrate, 7006 is the lower polarizing plate, 7007 is the mirror reflective plate, 7008 is the opposing electrodes (scanning wires), and 7009 is the signal wires, 7010 is the pixel electrodes, and 7011 is the MIM elements. The liquid crystals 7004 are twisted 90 degrees in the cells, and are TN mode, whereby the absorption axes of the polarizing plates 7002 and 7006 coincide with the lag phase axes of the liquid crystals 7004 of the adjacent boundaries. The product Δnxd of the thickness d of the liquid crystals 7004 and the multiple refractivity Δn is 0.48 μm. For the scattering plate was used the same thing as the scattering plate of the third example.

The intervals between pixel and pixel were perpendicular to the signal wires and were 160 μm in both parallel directions, the width of the signal wires was 10 μm, the gaps between the signal wires and the pixel electrodes were 10 μm, and the intervals between adjacent pixel electrode and pixel electrode were 10 μm.

In the reflective type liquid crystal device of the above configuration, when the liquid crystals have been arranged by applying rubbing processing also to the areas other than the pixels, being the signal wires 7009 and the opposing electrodes 7008, in the same manner as the pixel electrodes 7010, it had a brightness of 23% and a contrast of 1:14 during white display in a room in the normal line direction of the substrates, and a brightness of 43% and a contrast of 1:11 in the regular reflective direction of a ceiling lamp.

By the way, because the paintability on metallic electrodes differs from that of the ITO of the pixel electrodes, even when painting an orientation film, it often comes off. In such a case, that is, when orientation processing was not applied on the signal wires 7009, it had a brightness of 19% and a contrast of 1:14 during white display in a room in the normal line direction of the substrates, and a brightness of 40% and a contrast of 1:11 in the regular reflective direction of a ceiling lamp.

In either case, a high contrast and bright display could be obtained, and a brighter display could be obtained by orientation processing on the metallic wiring.

Second Example

Figure 71:
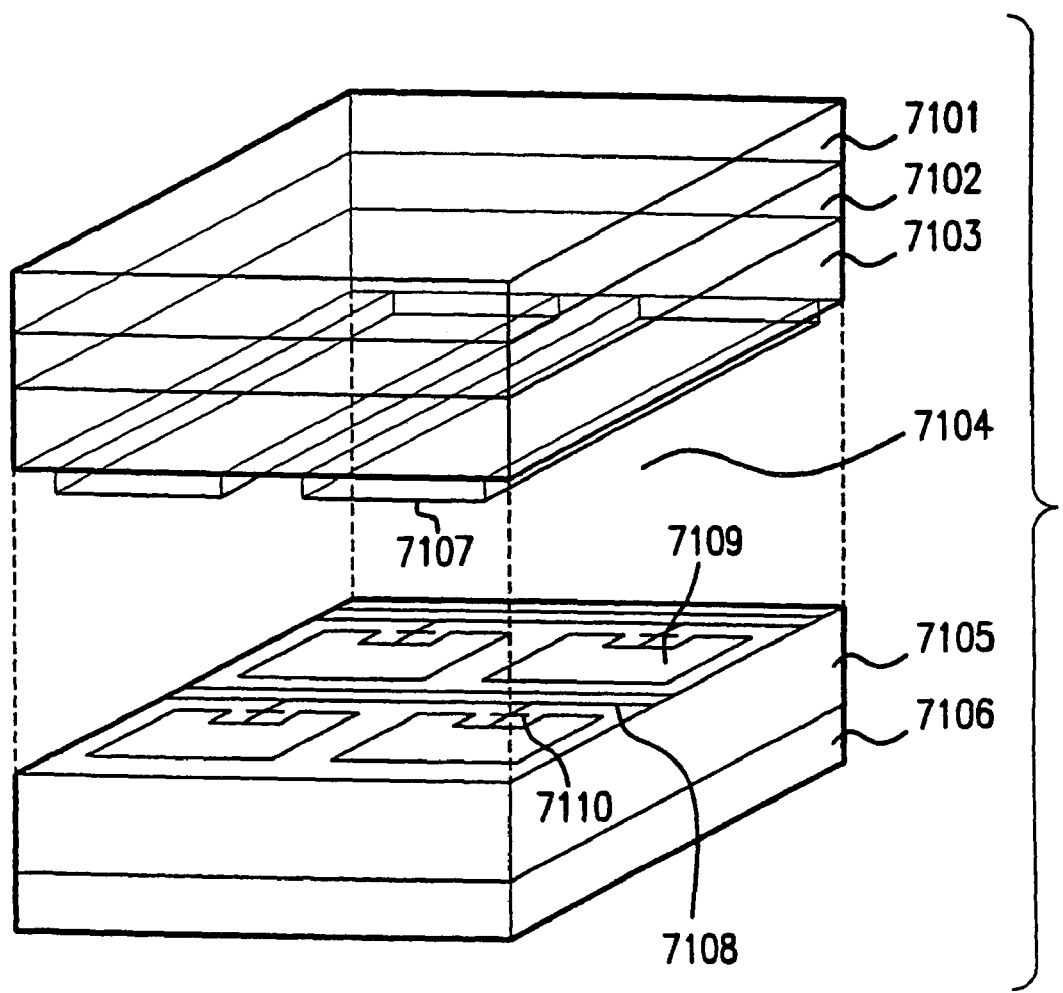
FIG. 71 is a drawing showing the essential components of the structure of a reflective type color liquid crystal device in preferred embodiment 38 of the present invention.

FIG. 71 is a drawing showing the essential components of the reflective type liquid crystal devices No. 1 and No. 3 in the second example. 7101 is the scattering plate, 7102 is the upper polarizing plate, 7103 is the upper substrate, 7104 is the liquid crystals, 7105 is the lower substrate, 7106 is the mirror reflective plate, 7107 is the opposing electrodes (scanning wires), 7108 is the signal wires, 7109 is the pixel electrodes, and 7110 is the MIM elements. The intervals between pixel and pixel were perpendicular to the signal wires and were 160 μm in both parallel directions, the width of the signal wires was 10 μm, the gaps between the signal wires and the pixel electrodes were 10 μm, and the intervals between adjacent pixel electrode and pixel electrode were 10 μm.

FIG. 61 shows the axial directions of the polarizing plates, and the like, of the reflective type liquid crystal devices No. 1 to No. 3 in the second example. 6101 is the transmissive axial direction of the upper polarizing plate 6002, 6103 is the rubbing direction of the upper substrate 6003, 6103 is the rubbing direction of the lower substrate 6007, 6104 is the angle θ1 of the transmissive axial direction 6101 of the upper polarizing plate 6002 with the horizontal level, 6105 is the angle θ2 of the rubbing direction 6102 of the upper substrate 6003 with the horizontal level, and 6106 is the angle θ3 of the rubbing direction 6103 of the lower substrate 6007 with the horizontal level.

Figure 72:
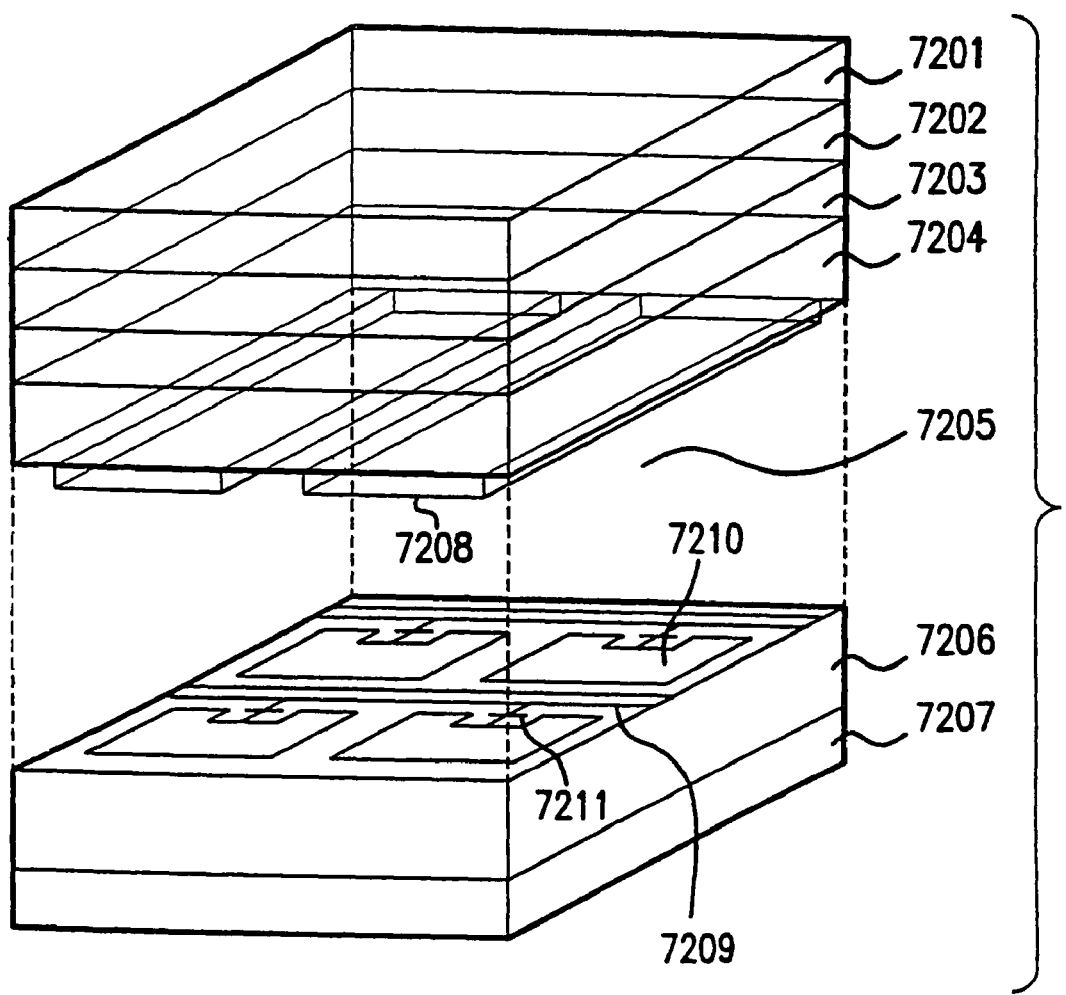
FIG. 72 is a drawing showing the essential components of the structure of a reflective type color liquid crystal device in preferred embodiment 38 of the present invention.

FIG. 72 is a drawing showing the essential components of the reflective type liquid crystal devices No. 2 and No. 4 in the second example. 7201 is the scattering plate, 7202 is the phase variation plate, 7203 is the upper polarizing plate, 7204 is the upper substrate, 7205 is the liquid crystals, 7206 is the lower substrate, 7207 is the mirror reflective plate, 7208 is the opposing electrodes (scanning wires), 7209 is the signal wires, 7210 is the pixel electrodes, and 7211 is the MIM elements. The intervals between pixel and pixel were perpendicular to the signal wires and were 160 μm in both parallel directions, the width of the signal wires was 10 μm, the gaps between the signal wires and the pixel electrodes were 10 μm, and the intervals between adjacent pixel electrode and pixel electrode were 10 μm.

FIG. 63 shows the axial directions of the polarizing plates, and the like, of the reflective type liquid crystal devices No. 4 to No. 6 in the second example. 6301 is the transmissive axial direction of the upper polarizing plate 6202, 6302 is the lag phase axial direction of the phase variation plate 6203, 6303 is the rubbing direction of the upper substrate 6204, 6304 is the rubbing direction of the lower substrate 6208, 6305 is the angle θ1 of the transmissive axial direction 6301 of the upper polarizing plate 6202 with the horizontal level, 6306 is the angle θ2 of the rubbing direction 6303 of the upper substrate 6204 with the horizontal level, 6307 is the angle θ3 of the rubbing direction 6304 of the lower substrate 6208 with the horizontal level, and 6308 is the angle θ4 of the lag phase axial direction 6302 of the phase variation plate 6203.

For the scattering plate was used the same thing as the scattering plate of the third example of Preferred Embodiment 37.

In the reflective type liquid crystal device of the above configuration, No. 1 and No. 2 had orientation processing applied also to the areas other than the pixels, and No. 3 and No. 4 had orientation processing only to the pixels.

The Δnxd of the liquid crystals 7205, the angles of the polarizing plates, and the like, and the phase variation of the phase variation plate are shown in the table below.

Also, their properties are shown in the table below.

In both examples, a high contrast and bright display could be obtained, and a brighter display could be obtained by orientation processing in the areas other than the pixels.

Preferred Embodiment 39

Preferred Embodiment 39 relates to a reflective type color liquid crystal device according to aspects of the present invention, but first will be introduced an example of a reflective type monochrome liquid crystal device. This can be used as a reflective type color liquid crystal device by adding color filters.

FIG. 59 is a cross section drawing of reflective type liquid crystal devices No. 1 and No. 2 according to aspects of the present invention. First the configuration is explained. 5901 is the scattering plate, 5902 is the upper polarizing plate, 5903 is the upper substrate, 5904 is the upper electrodes, 5905 is the liquid crystals, 5906 is the lower electrodes, 5907 is the lower substrate, 5908 is the lower polarizing plate, and 5909 is the mirror reflective plate. The liquid crystals 5905 are twisted 90 degrees in the cells, and are TN mode, whereby No. 1 has the absorption axes of the polarizing plates 5902 and 5908 coincide with the lag phase axes of the liquid crystals 5905 of the adjacent boundaries, and No. 2 has the absorption axis of the polarizing plate 5902 and the absorption axis of the polarizing plate 5908 coincide with the lag phase axes of the liquid crystals 5905 of the respectively adjacent boundaries. The product Δnxd of the thickness d of the liquid crystals 5905 and the multiple refractivity Δn is 0.48 μm.

For the scattering plate was used the same thing as the scattering plate of the third example of Preferred Embodiment 37.

Figure 73:
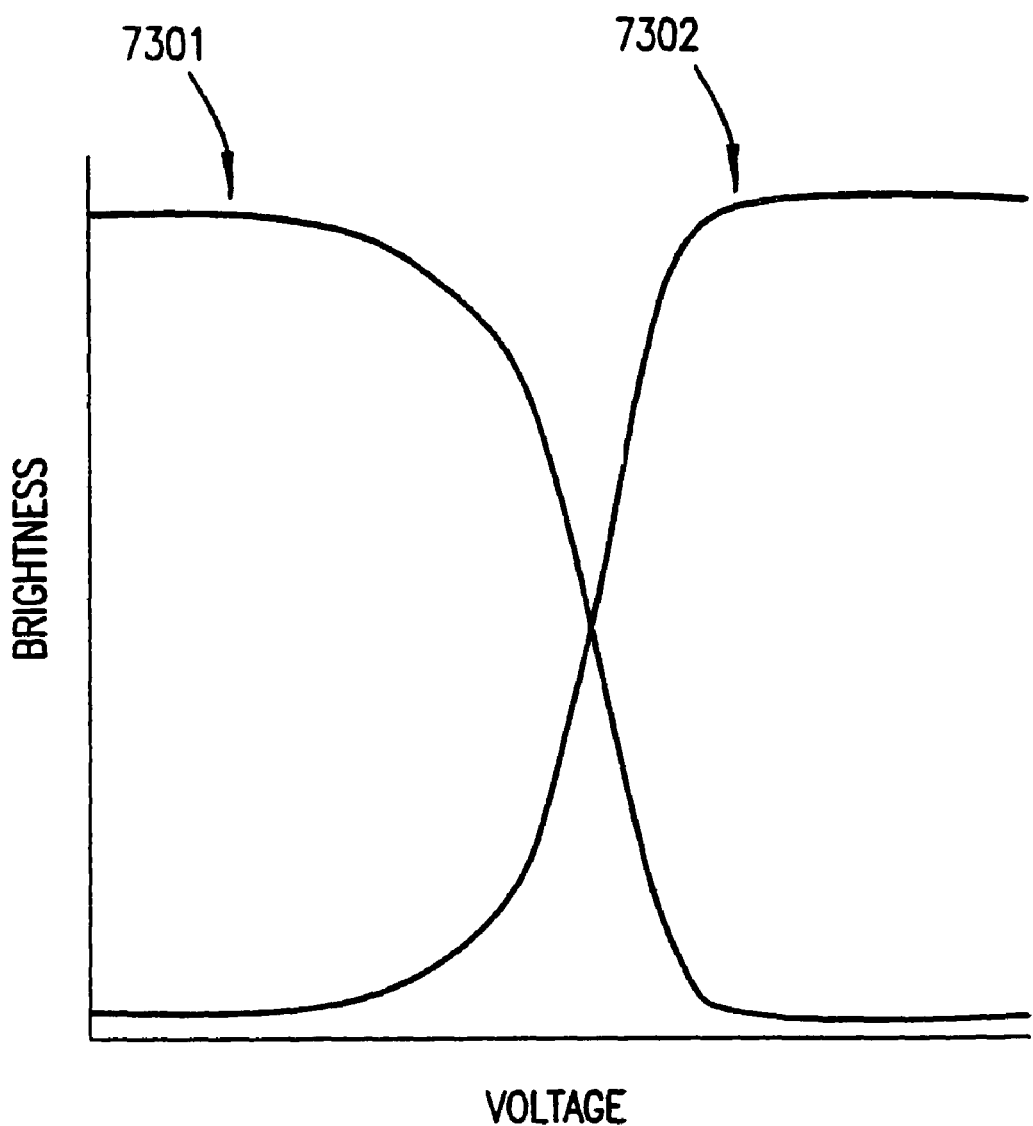
FIG. 73 is a drawing showing the voltage transmissivity of a reflective type color liquid crystal device in preferred embodiment 39 of the present invention.

FIG. 73 is a drawing showing the voltage transmissivity properties of a reflective type liquid crystal device according to aspects of the present invention. Here, 7301 is the manner of the change of transmissivity in relation to voltage of No. 1, and 7302 is the manner of the change of transmissivity in relation to voltage of No. 2. No. 1 is normally white, and No. 2 is a normally black display.

For the reflective type liquid crystal devices of the above configuration, No. 1 had a brightness of 25% and a contrast of 1:15 during white display in a room in the normal line direction of the substrates, and a brightness of 45% and a contrast of 1:12 in the regular reflective direction of a ceiling lamp. No. 2 had a brightness of 23% and a contrast of 1:15 during white display in a room in the normal line direction of the substrates, and a brightness of 42% and a contrast of 1:13 in the regular reflective direction of a ceiling lamp.

Both could obtain a sufficient contrast and bright display, but the normally white one could obtain a brighter display. This is because the areas outside the pixels contribute to the brightness, and also because it has visual angle properties whereby the light introduced from diagonal directions is easily transmitted.

Preferred Embodiment 40

When performing display with a reflective type color liquid crystal device in Preferred Embodiments 1 to 39 above, there occurs a problem which did not exist with the conventional transmissive type color liquid crystal device. That is the fact that it does not show enough color with a single dot, and in order to display color, it is necessary to display the same color across an area of a certain width. The causes of this are that the colors of the color filters are pale, there is a distance between the liquid crystal layer and the reflective plate (excepting Preferred Embodiments 36 to 39), and the colors of the neighboring dots mix easily.

Consequently, rather than a method of use such as displaying red characters on a white background, a method of use such as displaying black characters on a white background and making a part of the background red, that is, a method of use such as a marker, is more appropriate. Nevertheless, the fact that it does not show enough color with a single pixel means also that, conversely, while it is a color liquid crystal device, it can display black and white easily.

Preferred Embodiment 40 is a reflective type color liquid crystal device according to aspects of the invention, and is characterized by one pixel being composed of one dot. A pixel is the minimum unit capable of realizing the function necessary for display, and in the usual color liquid crystal device, one pixel is composed of a total of three dots, each dot being red, green, or blue. Consequently, in order to perform a 480× 640 VGA display, 480×640×3 dots was necessary. When using two colors of color filters, being cyan and red, 480× 640×2 dots was necessary. However, Preferred Embodiment 40 can perform VGA display with 480×640 pixels in a color liquid crystal device.

Figure 74A:
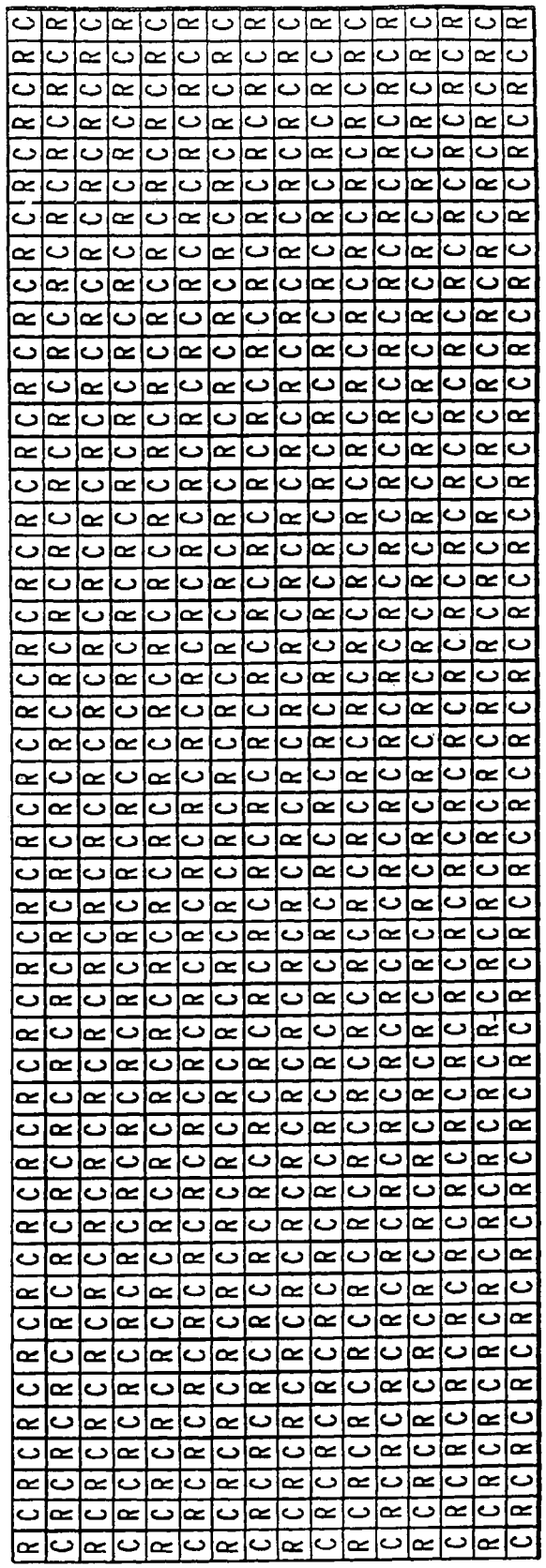
FIG. 74 is a drawing showing an example of the display method of a reflective type color liquid crystal device in preferred embodiment 40 of the present invention.
Figure 74B:
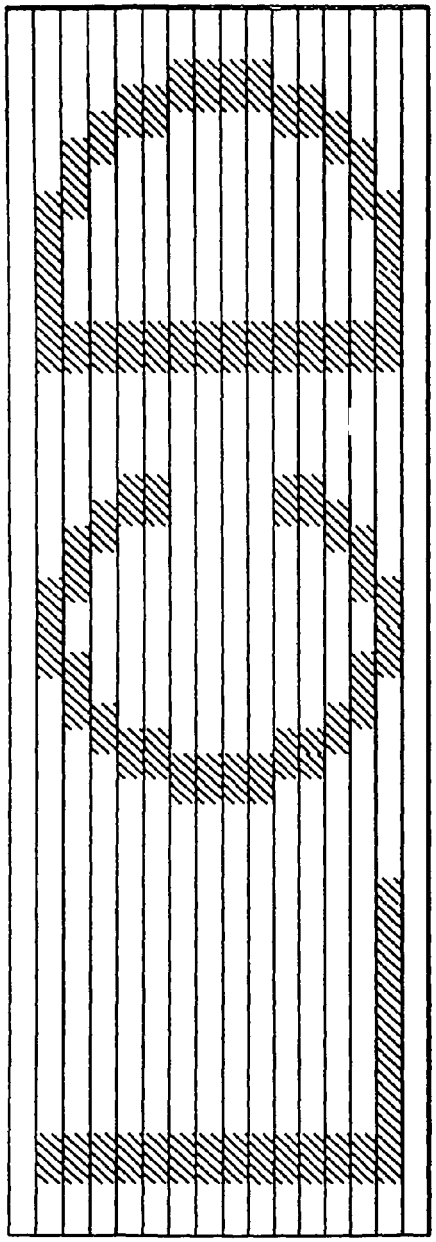
Figure 74C:
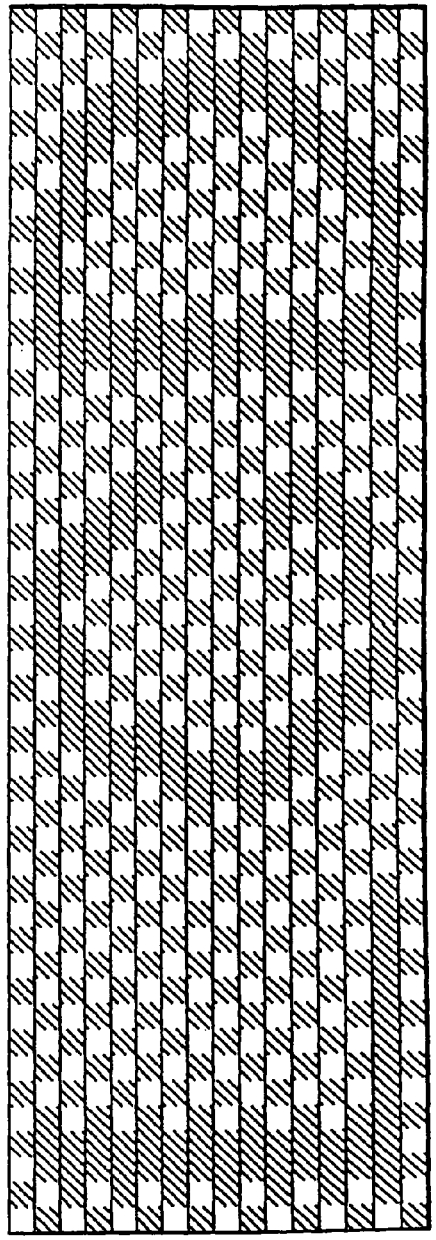

The configuration of Preferred Embodiment 40 is identical to, for example, Preferred Embodiment 5. Only the following efforts are made when performing display. An example is shown in FIG. 74, so it is explained following this drawing. Here, 16×48 pixels are illustrated. (a) is a drawing showing the arrangement of the color filters, and red (shown as "R") and cyan (shown as "C") are arranged in a mosaic pattern. Also, (b) and (c) are drawings showing the distribution of on dots and off dots. Because the on dots are dark, they are shown with hatching. The (b) display turns on the pattern of "LCD" ignoring the arrangement of the color filters, but as described before, because this reflective type color liquid crystal device does not show colors sufficiently with a single dot, "LCD" appears displayed in black on a white background. Consequently, black and white display is possible at the resolution of VGA. Meanwhile, because the (c) display turned on only the cyan-colored dots of the background of (b), "LCD" appears displayed in black on a red background. When displaying in this manner the same color across an area of ten dots or wider than that, it becomes possible to display colors.

In addition to such a method of use as a marker, for example, when displaying map information, it becomes possible to color only the specified routes if the widths of the roads are several dots. Also, because the icons on a PC screen are of a certain extent of area, their color display is possible.

Preferred Embodiment 41

A reflective type color liquid crystal device of Preferred Embodiments 1 to 40 above was selected as the display of an electronic apparatus.

Figure 75:
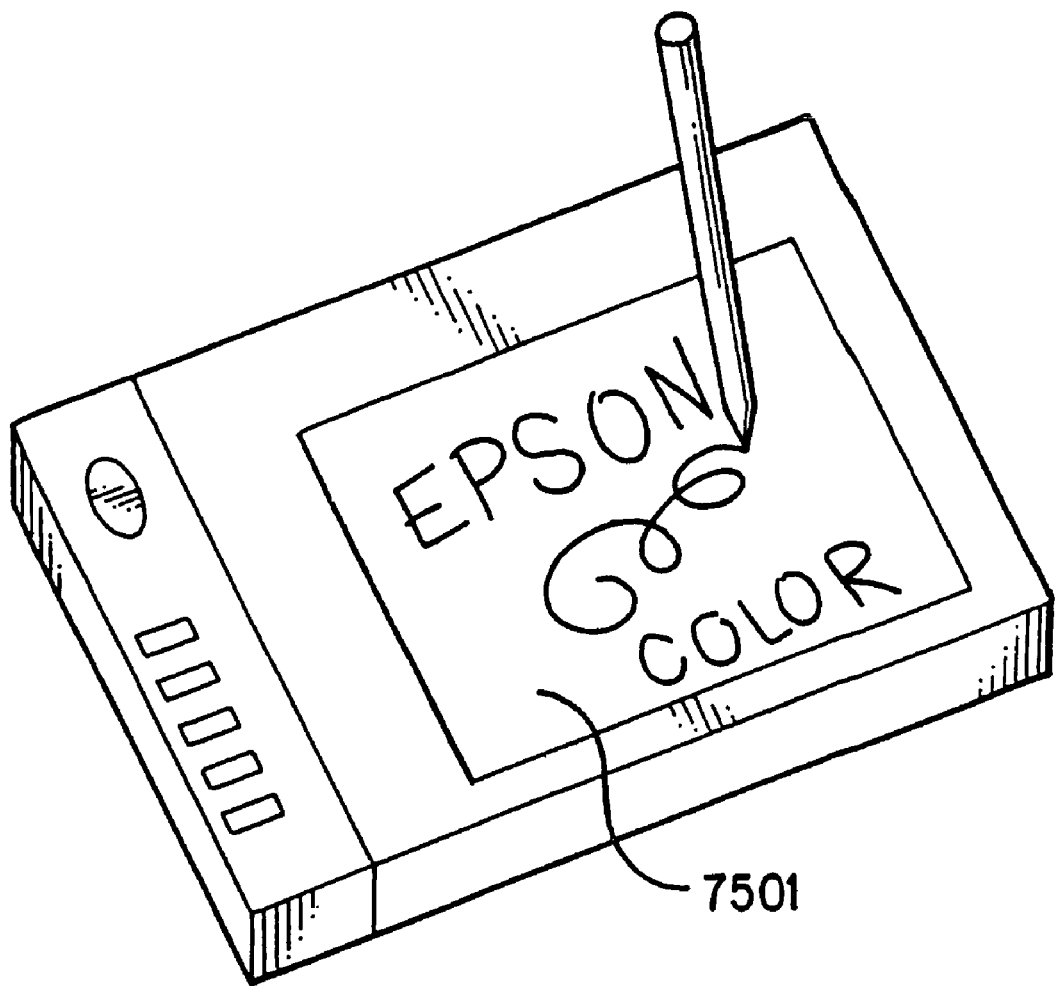
FIG. 75 is a drawing showing an example of an electronic apparatus using a reflective type color liquid crystal device in preferred embodiment 41 of the present invention.

FIG. 75 is a drawing showing one example of an electronic apparatus according to aspects of the invention. This is a so-called PDA (Personal Digital Assistant), and it is a type of portable information terminal. 7501 is the reflective type color liquid crystal device, and on its front is attached a tablet for pen input. For the PDA display, a conventional reflective type monochrome liquid crystal device or a transmissive type color liquid crystal device was used. By exchanging these with a reflective type color liquid crystal device, it has the merit that the amount of information by color display increases by leaps compared with the former. Also, it has the merits of extension of battery life and miniaturization.

Figure 76:
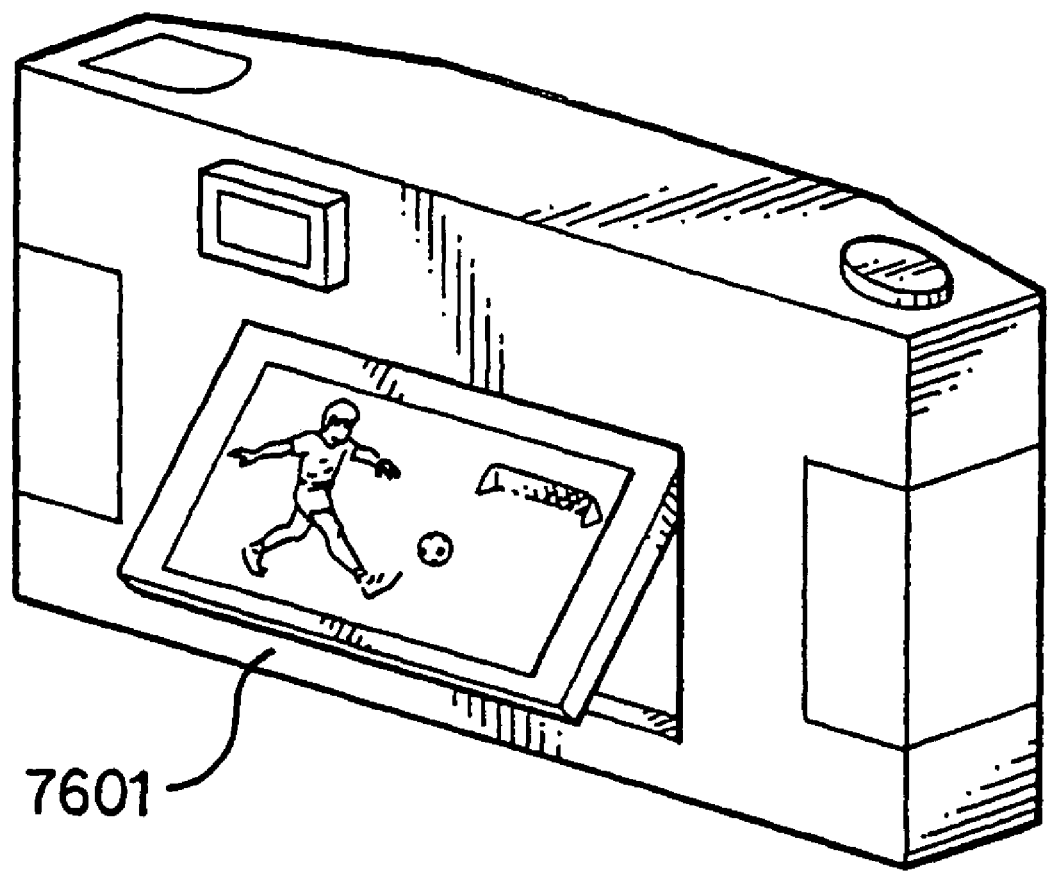
FIG. 76 is a drawing showing an example of an electronic apparatus using a reflective type color liquid crystal device in preferred embodiment 41 of the present invention.
Figure 77A:
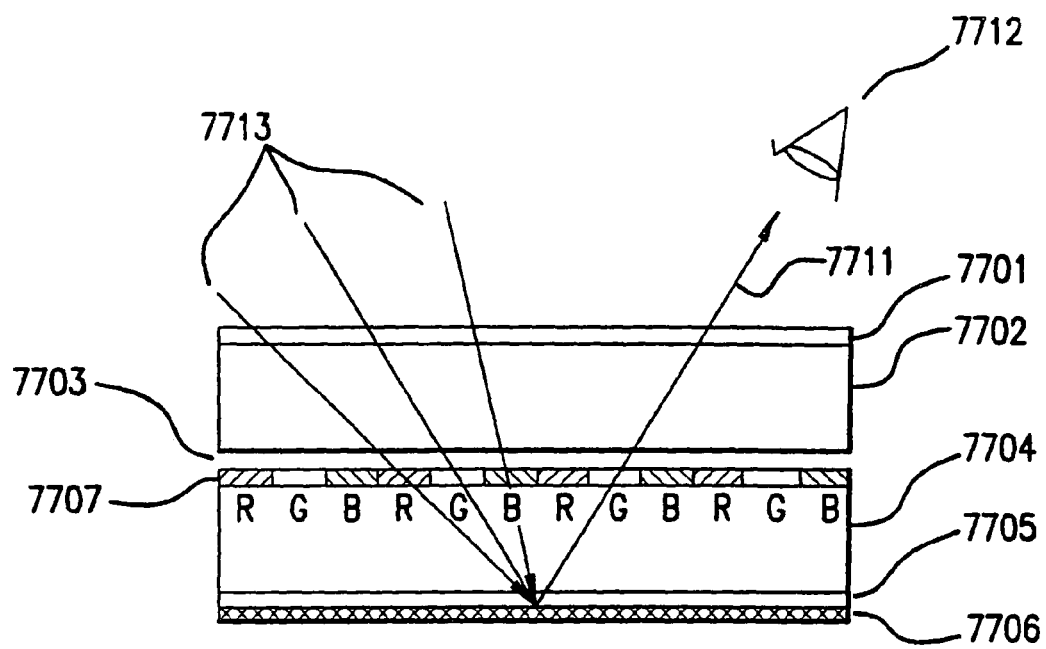
FIG. 77 is a drawing explaining the problems of parallax inherent in reflective type color liquid crystal devices.
Figure 77B:
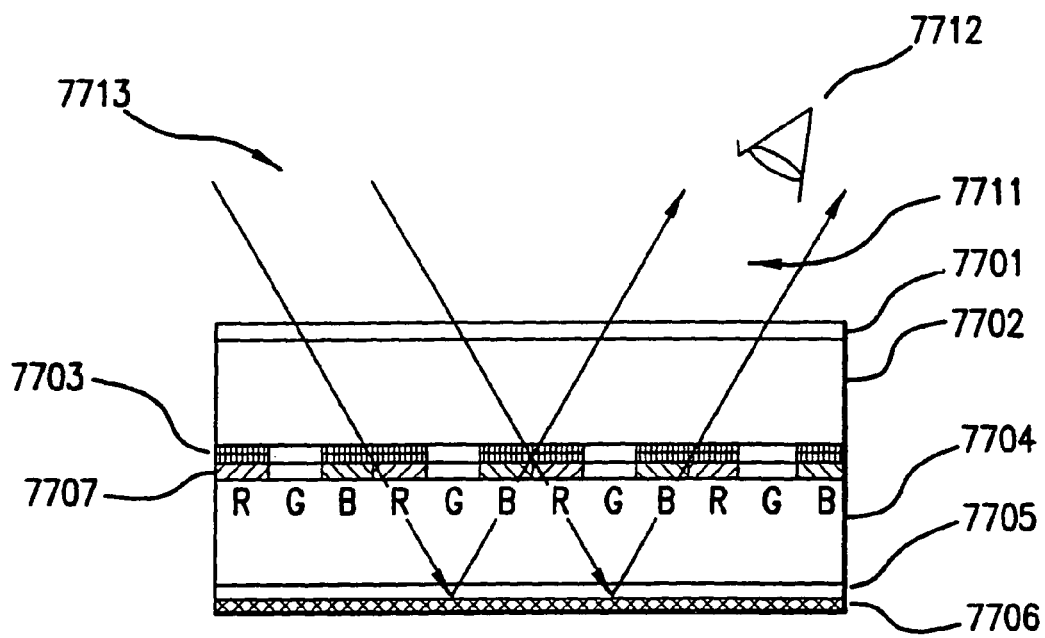
Figure 78:
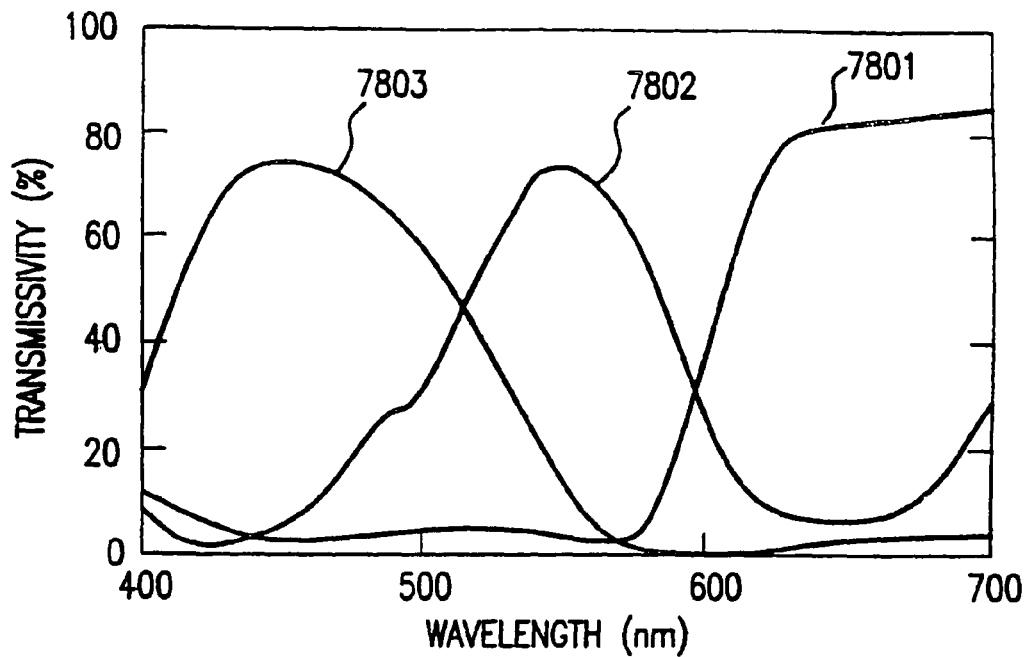
FIG. 78 is a drawing showing the spectral properties of the color filters of a conventional transmissive type color liquid crystal device.
Figure 79:
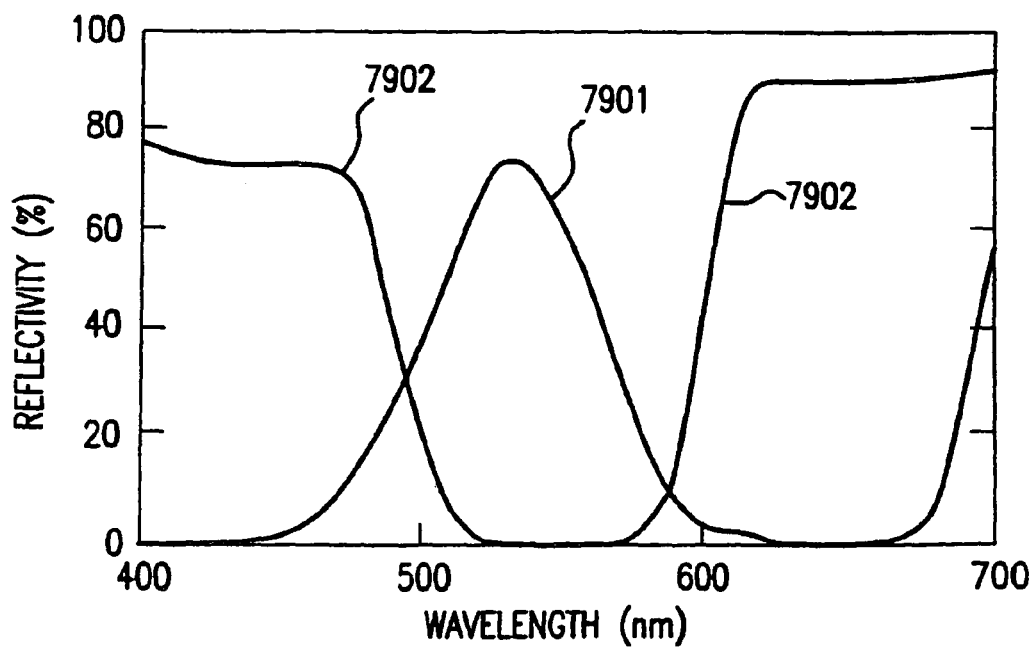
FIG. 79 is a drawing showing the spectral properties of the color filters proposed in FIG. 8 of the article by Mr. Tatsuo UCHIDA, et al. (IEEE Transactions on Electron Devices, Vol. ED-33, No. 8, pp. 1207-1211 (1986)).
Figure 80:
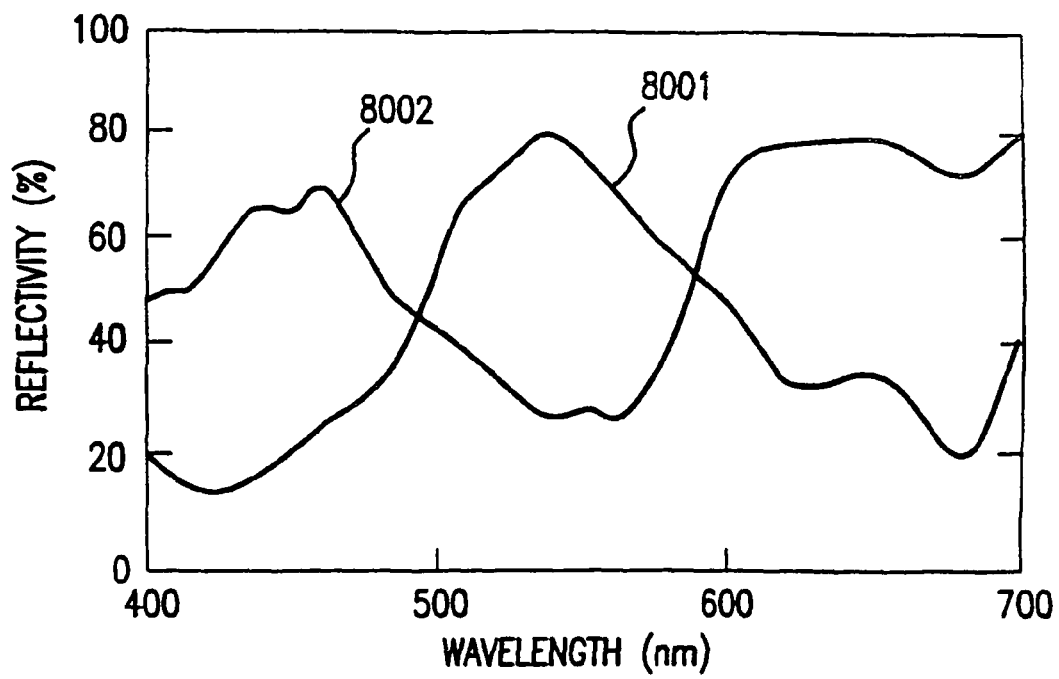
FIG. 80 is a drawing showing the spectral properties of the color filters proposed in FIG. 2 of the article by Mr. Seiichi MITTSUI, et al. (SID92 Digest, pp. 437-440 (1992)).
Figure 81:
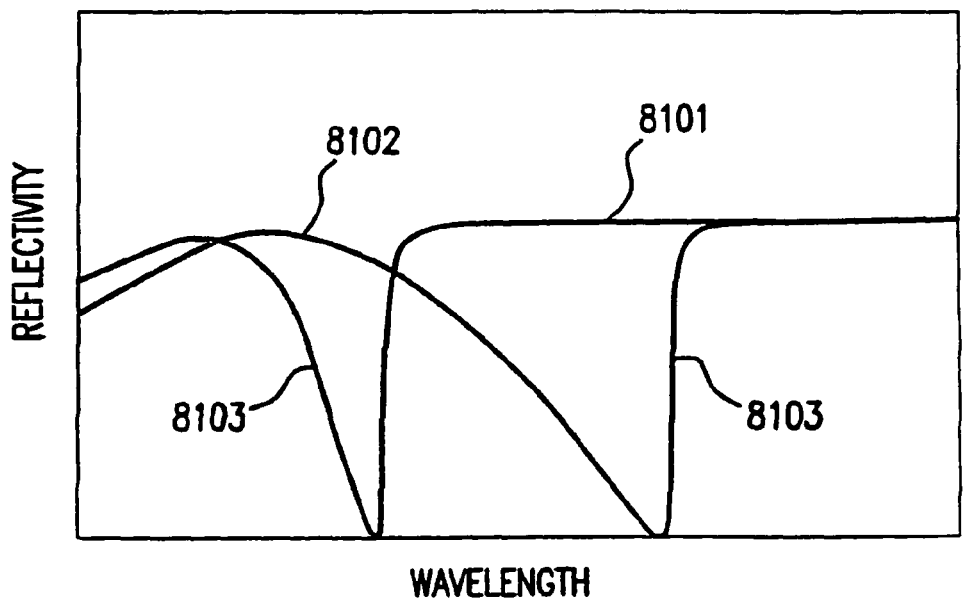
FIG. 81 is a drawing showing the spectral properties of the color filters proposed in FIG. 2(*a*), (*b*), and (*c*) of the publication of Japanese Laid-Open Patent No. 5-241143.

FIG. 76 is a drawing showing an example of an electronic apparatus according to aspects of the invention. This is a so-called digital still camera. 7601 is the reflective type color liquid crystal device, and it is installed such that its angle can be changed in relation to the body. Also, not illustrated, there is a lens inside this reflective type color liquid crystal device attachment. For the display of a digital still camera, a conventional transmissive type color liquid crystal device was used. By replacing this with a reflective type color liquid crystal device, not to mention the extension of battery life and miniaturization, the visual recognition under direct sunlight was improved dramatically. The reason is that, because a transmissive type color liquid crystal device is limited in the brightness of the backlights, it becomes hard to see when the surface reflection under direct sunlight becomes greater, but for a reflective type color liquid crystal device, the display also becomes brighter as the ambient light becomes brighter. Also because this ambient light is used efficiently, it is effective to be installed such that the angle of the liquid crystal device can be changed.

A reflective type color liquid crystal device can be applied to various electronic apparatuses emphasizing portability in addition to the electronic apparatuses mentioned above, such as palmtop PCs and sub-notebook PCs, notebook PCs, handy terminals, camcorders, liquid crystal TVs, game machines, electronic notebooks, portable telephones, and pagers.

Utility in the Industry

As described above, according to the present invention, by having a TN or STN liquid crystal display mode using polarizing plates, and by combining this with bright color filters, it is possible to provide a reflective type color liquid crystal device capable of displaying colors brighter and more brilliantly than the conventional, and also it is possible to provide electronic apparatuses using this.

TABLE 1

| Difference in Levels Between Color Filters And Transmissive Layer | 1.0 μm | 0.5 μm | 0.3 μm | 0.1 μm | 0.05 μm |
|---|---|---|---|---|---|
| Image Quality | x | ○ | ○ | ◎ | ◎ |
| Contrast | 1:5.2 | 1:10.4 | 1:14.0 | 1:15.4 | 1:19.2 |

Image Quality: 0 ... very bad, 1 ... bad, 2 ... good, 3 ... very good.

TABLE 2

| Transmissive Layer | None | Acryl | Polyimide | Polyvinyl Alcohol |
|---|---|---|---|---|
| Contrast | 1:8.1 | 1:20.2 | 1:19.6 | 1:17.9 |
| Image Quality | x | ◎ | ◎ | ◎ |

Image Quality: 0 ... very bad, 1 ... bad, 2 ... good, 3 ... very good.

TABLE 3

| | Δnxd (μm) | Reflectivity (%) |
|---|---|---|
| Comparative Example | 0.30 | 20.8 |
| | 0.32 | 22.2 |
| | 0.34 | 23.2 |
| Preferred Embodiment | 0.36 | 23.7 |
| | 0.38 | 24.1 |
| | 0.40 | 24.3 |
| | 0.42 | 24.3 |
| | 0.44 | 24.2 |
| | 0.46 | 24.0 |
| | 0.48 | 23.9 |
| | 0.50 | 23.5 |
| Comparative Example | 0.52 | 23.2 |
| | 0.54 | 22.9 |
| | 0.56 | 22.7 |

TABLE 4

| No. | Δnxd | θ1 | θ2 | θ3 | θ4 | Phase Retardation | Twist Orientation |
|---|---|---|---|---|---|---|---|
| 1 | 0.40 | 32.5 | −67.5 | 67.5 | | | Right 45° |
| 2 | 0.64 | 32.0 | −68.0 | 68.0 | | | Right 45° |
| 3 | 0.80 | −22.5 | −37.5 | 37.5 | | | Left 255° |
| 4 | 0.33 | −82.0 | −74.0 | 74.0 | 9.0 | 0.31 | Right 32° |
| 5 | 0.45 | 27.5 | −67.5 | 67.5 | 27.5 | 0.65 | Right 45° |
| 6 | 0.70 | −8.0 | −30.0 | 30.0 | 70.0 | 0.35 | Left 240° |

TABLE 5

| | Normal Line Direction Of Substrate | | Direction of Mirror Reflection | |
|---|---|---|---|---|
| No. | Reflectivity (%) | Contrast | Reflectivity (%) | Contrast |
| 1 | 29 | 1:12 | 50 | 1:10 |
| 2 | 27 | 1:13 | 48 | 1:11 |
| 3 | 27 | 1:06 | 49 | 1:04 |
| 4 | 30 | 1:15 | 52 | 1:12 |
| 5 | 27 | 1:15 | 48 | 1:12 |
| 6 | 29 | 1:08 | 50 | 1:06 |

TABLE 6

| | Normal Line Direction Of Substrate | | Direction of Mirror Reflection | |
|---|---|---|---|---|
| No. | Reflectivity (%) | Contrast | Reflectivity (%) | Contrast |
| 1 | 30 | 1:12 | 49 | 1:10 |
| 2 | 28 | 1:13 | 47 | 1:11 |
| 3 | 28 | 1:06 | 47 | 1:04 |
| 4 | 31 | 1:15 | 51 | 1:12 |
| 5 | 28 | 1:15 | 46 | 1:12 |
| 6 | 30 | 1:08 | 49 | 1:06 |

TABLE 7

| | Normal Line Direction Of Substrate | | Direction of Mirror Reflection | |
|---|---|---|---|---|
| No. | Reflectivity (%) | Contrast | Reflectivity (%) | Contrast |
| 1 | 32 | 1:14 | 54 | 1:11 |
| 2 | 29 | 1:15 | 50 | 1:13 |
| 3 | 30 | 1:08 | 51 | 1:06 |
| 4 | 35 | 1:19 | 55 | 1:15 |
| 5 | 30 | 1:19 | 51 | 1:15 |
| 6 | 31 | 1:10 | 52 | 1:08 |

TABLE 8

| No. | Δnxd | θ1 | θ2 | θ3 | θ4 | Phase Retardation | Twist Orientation |
|---|---|---|---|---|---|---|---|
| 1, 3 | 0.40 | 32.5 | −67.5 | 67.5 | | | Right 45° |
| 2, 4 | 0.33 | −82.0 | −74.0 | 74.0 | 9.0 | 0.31 | Right 32° |

TABLE 9

| No. | Normal Line Direction of Substance Reflectivity (%) | Contrast | Direction of Mirror Reflection Reflectivity (%) | Contrast | Orientation Processing Outside Pixel Area |
|---|---|---|---|---|---|
| 1 | 29 | 1:12 | 50 | 1:10 | Yes |
| 2 | 27 | 1:13 | 48 | 1:11 | Yes |
| 3 | 27 | 1:06 | 49 | 1:04 | No |
| 4 | 29 | 1:08 | 50 | 1:06 | No |

What is claimed is:

1. A color liquid crystal device comprising:
a pair of opposing substrates;
a liquid crystal layer between the substrates;
a plurality of dots capable of independently applying voltage to the liquid crystal layer;
a color filter located in at least one of the dots; and
a substantially transparent layer located in a section of the at least one of the dots where the color filter is not located.

2. The color liquid crystal device according to claim 1, the substantially transparent layer including acryl.

3. The color liquid crystal device according to claim 1, the substantially transparent layer including polyimide.

4. The color liquid crystal device according to claim 1, the substantially transparent layer extending across an area between adjacent dots.

5. The color liquid crystal device according to claim 1, the substantially transparent layer extending from one side of the at least one of the dots to the other side of the one of the dots.

6. The color liquid crystal device according to claim 1, the plurality of dots comprising a display face, the color filter including a plurality of color filters in a one-to-one correspondence with the dots, a surface area ratio of all the color filters to the entire display face being 15% or more.

7. The color liquid crystal device according to claim 6, the surface area ratio of all the color filters to the entire display face being 25% or more.

8. The color liquid crystal device according to claim 6, the surface area ratio of all the color filters to the entire display face being 45% or more.

9. The color liquid crystal device according to claim 1, the substantially transparent layer being located at least at two separate locations within the at least one of the dots where the color filter is not located.

10. The color liquid crystal device according to claim 1, the substantially transparent layer surrounding the color filter within the at least one of the dots.

11. A color liquid crystal device comprising:
a pair of opposing substrates;
a liquid crystal layer between the substrates;
a plurality of dots capable of independently applying voltage to the liquid crystal layer;
a color filter located in at least one of the dots; and
at least one non-colored layer located in a section of the at least one of the dots where the color filter is not located.

12. The color liquid crystal device according to claim 11, the non-colored layer including acryl.

13. The color liquid crystal device according to claim 11, the non-colored layer including polyimide.

14. The color liquid crystal device according to claim 11, the non-colored layer extending across an area between adjacent dots.

15. The color liquid crystal device according to claim 11, the non-colored layer extending from one side of the at least one of the dots to the other side of the one of the dots.

16. The color liquid crystal device according to claim 11, the plurality of dots comprising a display face, the color filter including a plurality of color filters in a one-to-one correspondence with the dots, a surface area ratio of all the color filters to the entire display face being 15% or more.

17. The color liquid crystal device according to claim 16, the surface area ratio of all the color filters to the entire display face being 25% or more.

18. The color liquid crystal device according to claim 16, the surface area ratio of all the color filters to the entire display face being 45% or more.

19. The color liquid crystal device according to claim 11, at least two separate non-colored areas being located within sections of the at least one of the dots where the color filter is not located.

20. The color liquid crystal device according to claim 11, the non-colored layer surrounding the color filter within the at least one of the dots.

* * * * *